(12) United States Patent
Göktepe et al.

(10) Patent No.: US 11,773,516 B2
(45) Date of Patent: Oct. 3, 2023

(54) ACTUATING TEXTILES CONTAINING POLYMER FIBER MUSCLES

(71) Applicant: BOARD OF REGENTS, THE UNIVERSITY OF TEXAS SYSTEM, Austin, TX (US)

(72) Inventors: Özer Göktepe, Istanbul (TR); Fatma Göktepe, Istanbul (TR); Na Li, Dallas, TX (US); Shaoli Fang, Richardson, TX (US); Ray H. Baughman, Dallas, TX (US); Marcio Dias Lima, Richardson, TX (US); Carter S. Haines, Murphy, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1041 days.

(21) Appl. No.: 16/087,540

(22) PCT Filed: Mar. 21, 2017

(86) PCT No.: PCT/US2017/023438
§ 371 (c)(1),
(2) Date: Sep. 21, 2018

(87) PCT Pub. No.: WO2017/165435
PCT Pub. Date: Sep. 28, 2017

(65) Prior Publication Data
US 2021/0198817 A1    Jul. 1, 2021

Related U.S. Application Data

(60) Provisional application No. 62/371,744, filed on Aug. 6, 2016, provisional application No. 62/311,274, filed on Mar. 21, 2016.

(51) Int. Cl.
*D02G 3/26* (2006.01)
*D03D 15/567* (2021.01)
*F03G 7/06* (2006.01)

(52) U.S. Cl.
CPC .............. *D02G 3/26* (2013.01); *D03D 15/567* (2021.01); *F03G 7/06* (2013.01); *D10B 2401/02* (2013.01); *D10B 2401/046* (2013.01)

(58) Field of Classification Search
CPC ................... D02G 3/26; D10B 2401/02; D10B 2401/046; D10B 2403/021; D03D 15/567
See application file for complete search history.

(56) References Cited

U.S. PATENT DOCUMENTS

| | | |
|---|---|---|
| 3,222,016 A | 12/1965 | Boone |
| 4,517,715 A | 5/1985 | Yoshida et al. |

(Continued)

FOREIGN PATENT DOCUMENTS

| | | |
|---|---|---|
| CN | 104769834 A | 7/2015 |
| CN | 105003405 A | 10/2015 |

(Continued)

OTHER PUBLICATIONS

Haines et al. "Artificial Muscles from Fishing Line and Sewing Thread" Science vol. 343, Issue 6173. pp. 868-872. Feb. 21, 2014. https://science.sciencemag.org/content/343/6173/868/tab-pdf (Year: 2014).*

(Continued)

*Primary Examiner* — Andrew T Piziali
(74) *Attorney, Agent, or Firm* — Dickinson Wright PLLC; Ross Spencer Garsson

(57) ABSTRACT

A smart (intelligent) textile that can control its porosity, shape, texture, loft, stiffness, or color by temperature change or moisture absorption by using polymer fiber torsional and tensile actuators. This temperature change can be due to a (Continued)

change in ambient temperature or by an external stimulus, such as electrothermal heating. Mechanisms to accomplish this include (a) direct actuation (contraction or expansion) of polymer fiber actuators in a textile structure (b) rotation of polymer fiber actuators helically wrapped around warp and/or weft yarns in a textile structure; (c) rotation of chenille type or ribbon-like warp (or weft) ends by polymer fiber torsional actuators; (d) contraction or expansion of piles or loops in a chenille type fancy yarn produced by using mandrel actuators as pile or loop part of the yarn; (e) buckling of warp (or weft) yarns by contraction of tensile polymer fiber actuators; (f) decrease in yarn diameter by a twisting effect of polymer fiber actuators; (g) contraction or expansion of segmented mandrel actuators with core filament, wire or yarns; or (h) rotation of differentially dyed polymer fiber actuators for color changing textiles.

14 Claims, 62 Drawing Sheets

(56) References Cited

U.S. PATENT DOCUMENTS

| | | | |
|---|---|---|---|
| 6,514,362 | B1 | 2/2003 | Zuckerman et al. |
| 6,627,673 | B2 | 9/2003 | Topolkaraev et al. |
| 7,437,774 | B2 | 10/2008 | Baron et al. |
| 7,820,571 | B2 | 10/2010 | Kuroda et al. |
| 8,192,824 | B2 * | 6/2012 | Rock ............... D04B 21/04 428/97 |
| 8,555,414 | B2 | 10/2013 | Davis et al. |
| 9,896,788 | B2 * | 2/2018 | Kapsali ............ D01F 8/06 |
| 2005/0204448 | A1 * | 9/2005 | Wise ............... D03D 15/49 2/69 |
| 2005/0208857 | A1 | 9/2005 | Baron et al. |
| 2008/0057809 | A1 | 3/2008 | Rock |
| 2008/0132133 | A1 * | 6/2008 | Yasui ............... A41B 17/00 442/200 |
| 2011/0039088 | A1 * | 2/2011 | Lee ............... A61F 13/42 428/222 |
| 2011/0092121 | A1 * | 4/2011 | Kapsali ............ D03D 15/567 442/181 |
| 2011/0209557 | A1 | 9/2011 | Burns et al. |
| 2015/0073319 | A1 | 3/2015 | Holschuh et al. |
| 2015/0247267 | A1 | 9/2015 | Corey |
| 2016/0340814 | A1 * | 11/2016 | Ridley ............ B32B 15/04 |
| 2018/0361704 | A1 * | 12/2018 | Jin ............... B23K 20/002 |
| 2021/0198817 | A1 | 7/2021 | Goktepe et al. |

FOREIGN PATENT DOCUMENTS

| | | |
|---|---|---|
| CN | 109154282 B | 3/2021 |
| WO | 2014022667 A2 | 2/2014 |
| WO | 2017165435 A2 | 9/2017 |

OTHER PUBLICATIONS

Haines et al. Supplementary Materials from https://science.sciencemag.org/content/suppl/2014/02/19/343.6173.868.DC1 (Year: 2014).*

Examiner Cited Figures from Haines et al. Movie S5. Movie described in Haines et al. and Haines et al. SM and available at https://science.sciencemag.org/highwire/filestream/595468/field_highwire_adjunct_files/4/1246906smovs5.mov (Year: 2014).*

Zhang "The Evolving Roles of Nonwovens in Technical Textiles" from https://www.nonwovens-industry.com/issues/2008-03/view_features/the-evolving-roles-of-nonwovens-in-technical- (Year: 2008).*

Moghazy. Ch 9-Structure and Types of Yarn for Textile Product Design. Engineering Textiles: Integrating the Design and Manufacture of Textile Products. Woodhead Publishing. pp. 240-270. (Year: 2009).*

Collins Dictionary. Definition of "Twist" (Year: 2022).*

Baier, H., et al., "Active and Morphing Aerospace Structures—A Synthesis between Advanced Materials, Structures and Mechanisms", Int. Journal of Aeronautical & Space Science, 12 (3), 225-240 (2011) ("Bairer 2011"). 17 pages.

Foroughi, J., et al., "Torsional Carbon Nanotube Artificial Muscles", Science, vol. 334, No. 6055, Oct. 28, 2011 (Oct. 28, 2011), pp. 494-497; 6 pages.

Foroughi, J., et al., "Artificial Muscles from Carbon Nanotube and Nylon Fibres" The Fiber Society Spring 2015 Conference in Conjunction with the 2015 International Conference on Advanced Fibers and Polymer Materials: Functional Fibers and Textiles, Jan. 1, 2015, pp. 29-30.

Havenith, G., "The Interaction of Clothing and Thermoregulation, Loughborough University", http://www. I born. ac.uk/media/wwwl boroacuk/ content/lds/downloads/research/researchgroups/environmentalergonomics/clothing-thermoregulation.pdf; 2002 ("Havenith"). 32 pages.

Hu, J. "Adaptive and Functional Polymers, Textiles and Their Applications," Imperial College Press, UK (2011) Section 5.1.3, pp. 147-148 ("Hu 2011").7 pages.

Hu, J., et al., "A Review of Stimuli Responsive Polymers for Smart Textile Applications,"Smart Mater. Struc., 21, (2012) ("Hu 2012"). 24 pages.

ISO7730: "Moderate Thermal Environments-Determination of the PMV and PPD Indices and Specification of the Conditions for Thermal Comfort", International Standardization Organization, 1984 ("ISO7730 1984"). 24 pages.

Kim, S., et al., "Bio-inspired, Moisture-Powered Hybrid Carbon Nanotube Yarn Muscles," Sci. Rep., 6, 23016 (2016) ("Kim 2015"). 8 pages.

Langer, R., et. al., "Designing Materials for Biology and Medicine", Nature 428:487-92 (2004) ("Langer 2004"). 6 pages.

Lee, D., et al., "Characteristics of chemo-mechanically driven polyacrylonitrile fiber gel actuators",Materials Science and Engineering C,Elsevier Science S.A, CH, vol. 28, No. 2, Jan. 18, 2008 (Jan. 18, 2008), pp. 294-298.

Leng, J., et. al., "Shape Memory Polymers and Their Composites: Stimulus Methods and Applications", Progress in Materials Science, 56, 1077-1135 (2011) ("Leng 2011") 59 pages.

Lima, M., et al., "Biscrolling Nanotube Sheets and Functional Guests into Yarns", Science, vol. 331, No. 6013, Jan. 6, 2011 (Jan. 6, 2011), pp. 51-55. 7 pages.

Liu, X., et al., "Elasticity and Shape Memory Effect of Shape Memory Fabrics," Textile Res. J, 78(12) (2008) ("Liu 2008"). 10 pages.

Madden, J., et al., "Twisted Lines: Artificial Muscle and Advanced instruments can be formed from Nylon threads and fabric", IEEE Pulse, IEEE, USA, vol. 6, No. 1, Jan. 1, 2015, pp. 32-35. 5 pages.

Meng, Q., et al., "An Electro-active Shape Memory Fiber by Incorporating Multi-walled Carbon Nanotubes," Smart Mater. Struct., 16, (2007) ("Meng 2007"). 8 pages.

Meng, Q., et al., "A Smart Hollow Filament with Thermal Sensitive Internal Diameter," J Appl. Polym. Sci., 113, (2009) ("Meng 2009"). 10 pages.

Peel, L., et al., "Development of a Simple Morphing Wing Using Elastomeric Composites as Skins and Actuators", J of Mechanical Design, vol. 131, 091003-1-4, (2009). 10 pages.

Romeo, V., et al., "Development of Nanostructured Thermoregulating Textile Materials," J of Nanoscience and Nanotechnology, 8 (9), (2008) ("Valentina 2008") 5 pages.

Serra, M., "Adaptable Skin-hydrogel Gives Wetsuit Protection," Smart Mater. Bull., (8), (2002) ("Serra 2002"). 2 pages.

Shin, Y., et al., "Development of Thermoregulating Textile Materials with Microencapsulated Phase Change Materials," J of Applied Polymer Science, 97 (3), (2005) ("Shin 2005"). 6 pages.

Sloan, M., et.al., "The Helical Auxetic Yarn—A Novel Structure for Composites and Textiles; Geometry, Manufacture and Mechanical Properties," Mechanics of Materials, 43, (2011) ("Sloan 2011"). 11 pages.

Vigo, T., et al. "Temperature-adaptable Hollow Fibers Containing Polyethylene Glycols," J. of Coated Fabrics, 12 (4), (1983) ("Vigo 1983"). 12 pages.

(56) References Cited

OTHER PUBLICATIONS

Vili, Y. "Investigating Smart Textiles Based on Shape Memory Materials," Textile Res. J 77 (5), (2007) ("Vili 2007"). 11 pages.
Wright, J., et al., "On the Design and Characterization of Low-Stiffness Auxetic Yarns and Fabrics," Textile Research Journal, 82 (7), (2012) ("Wright 2012"). 10 pages.
Wright, J., et al., "Tensile properties of helical auxetic structures: A numerical study," J of Applied Physics, 108, 044905, (2010) ("Wright 2010"). 9 pages.
China National Intellectual Property Administration, Office Action for Application No. 201780031313.5, dated Dec. 26, 2019; 6 pages.
China National Intellectual Property Administration, Second Office Action for Application No. 201780031313.5, dated Aug. 18, 2020; 8 pages.
International Searching Authority, International Search Report and Written Opinion of PCT/US2013/053227 dated Aug. 1, 2013, 15 pages.
International Searching Authority, International Search Report and Written Opinion of PCT/US2017/023438 dated Nov. 30, 2017, 30 pages.
Patent Cooperation Treaty, International Preliminary Report on Patentability for PCT/US2013/053227 dated Feb. 3, 2015, 10 pages.
European Patent Office, Office Action for EP Application No. 17715853.2, dated Jun. 3, 2022; 5 pages.

\* cited by examiner

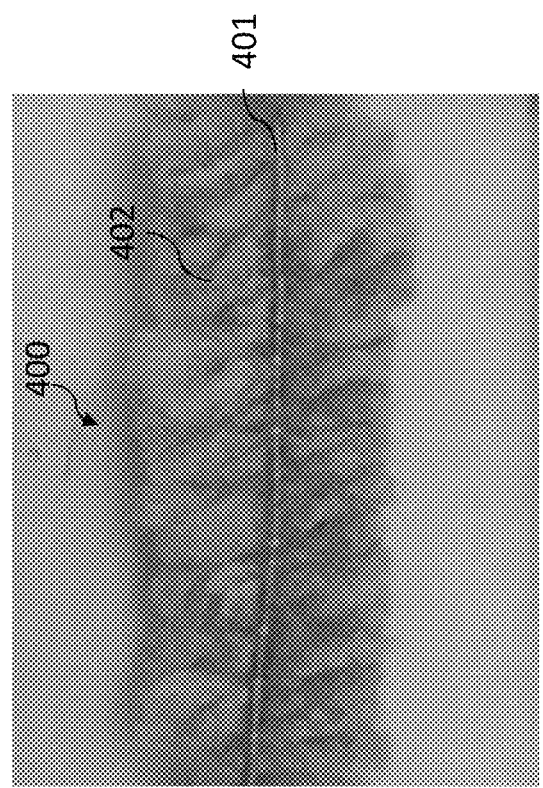
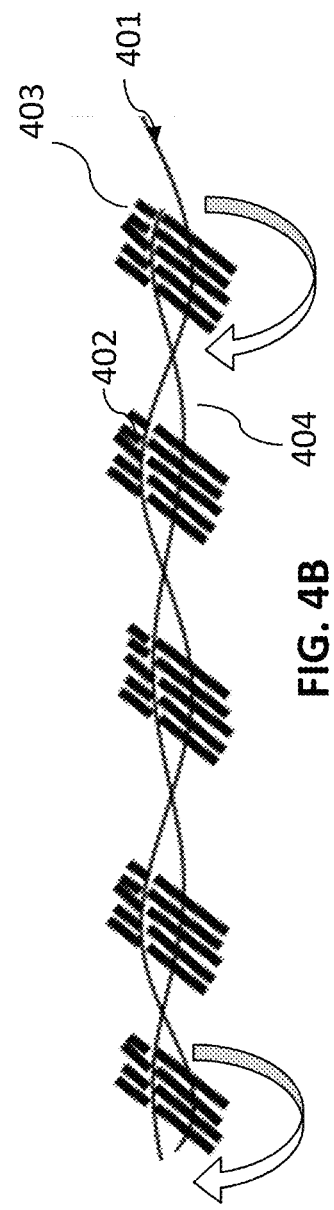
FIG. 4A
FIG. 4B

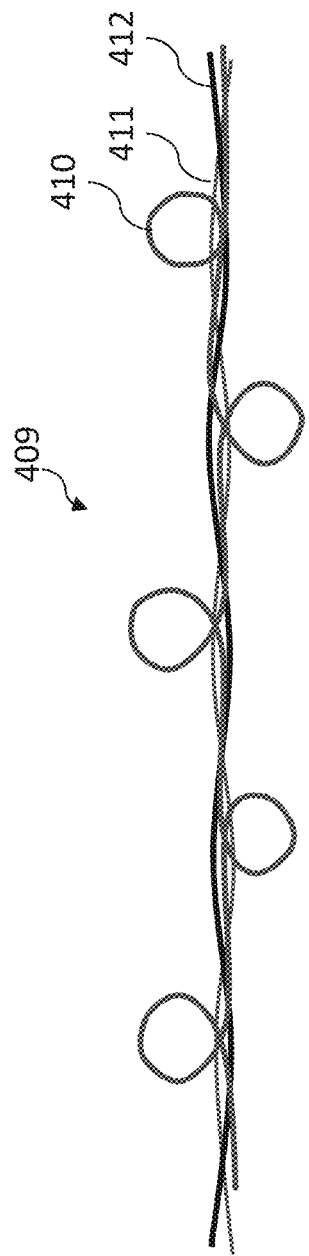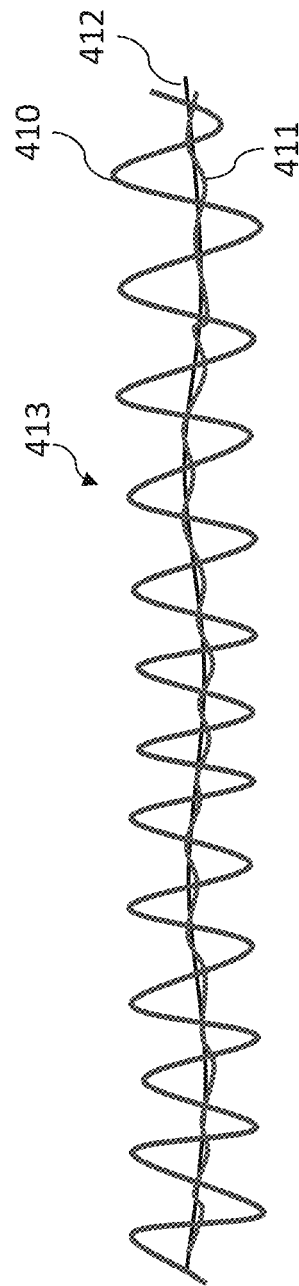

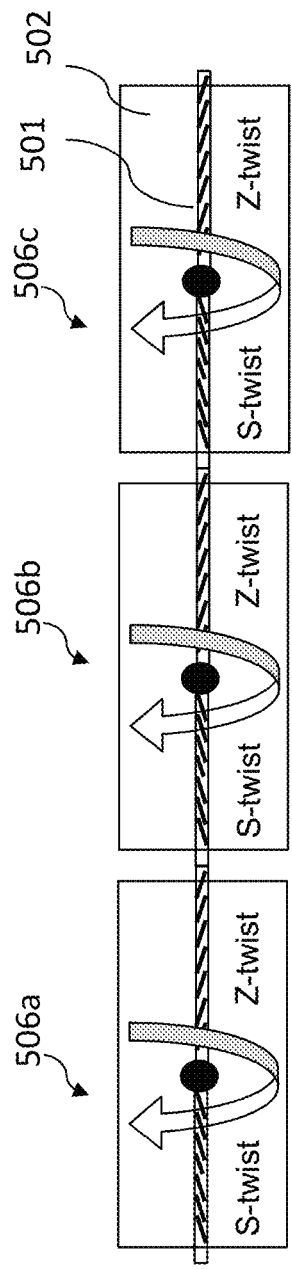
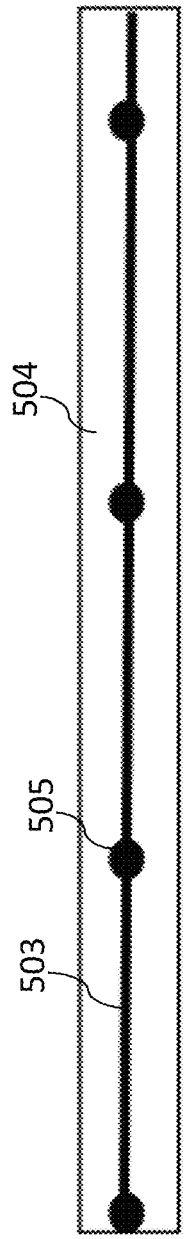
FIG. 5A
FIG. 5B

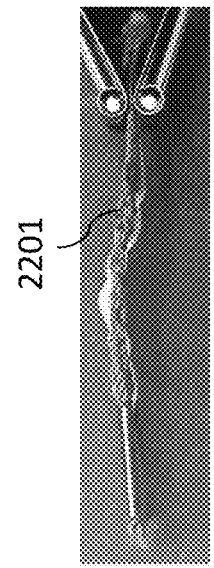
FIG. 22B
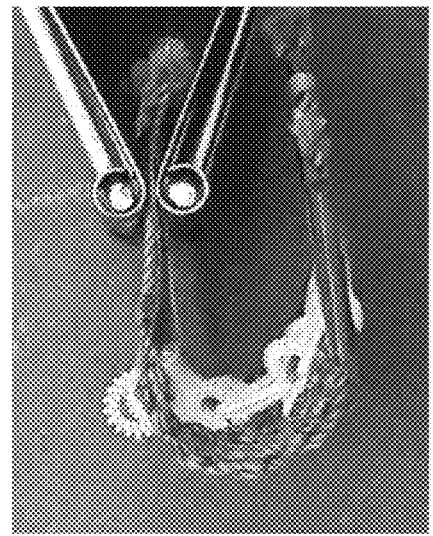
FIG. 22D
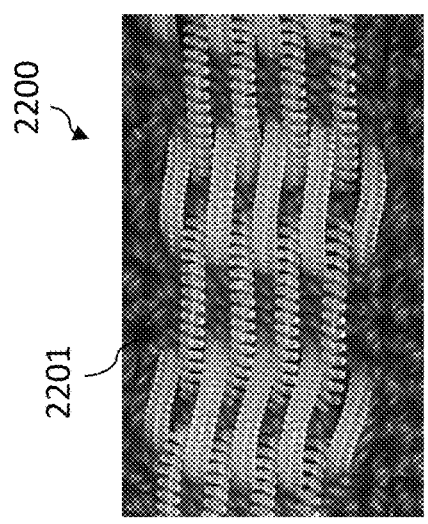
FIG. 22A
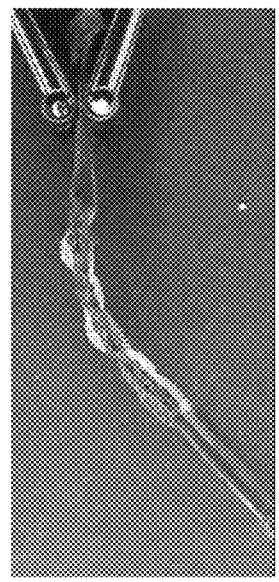
FIG. 22C
FIG. 22E

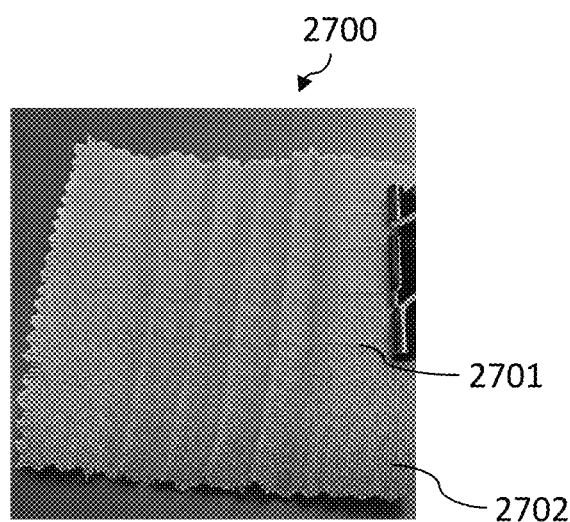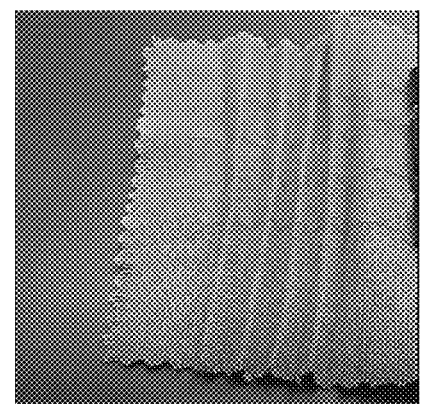
FIG. 27A     FIG. 27B

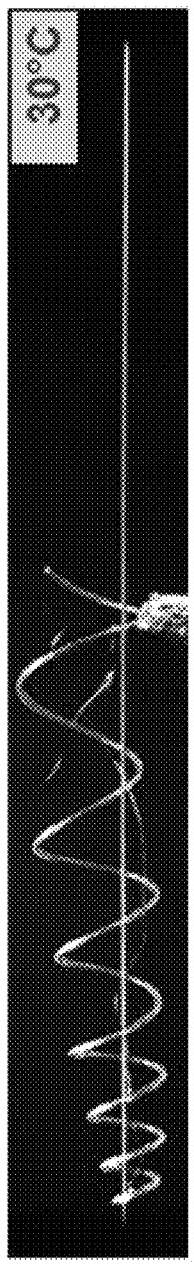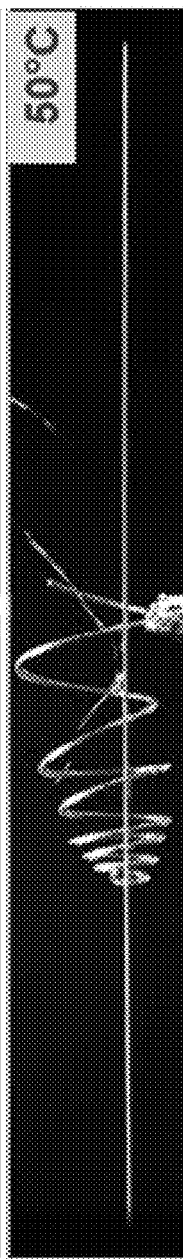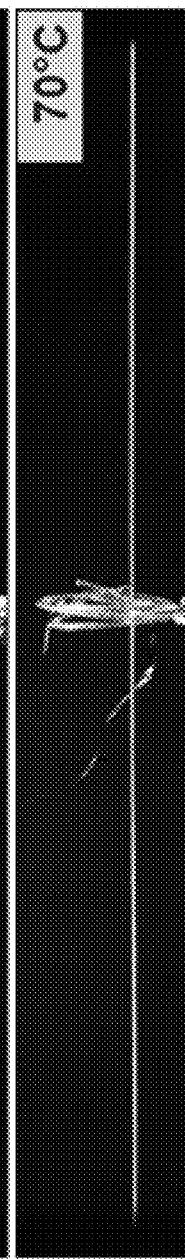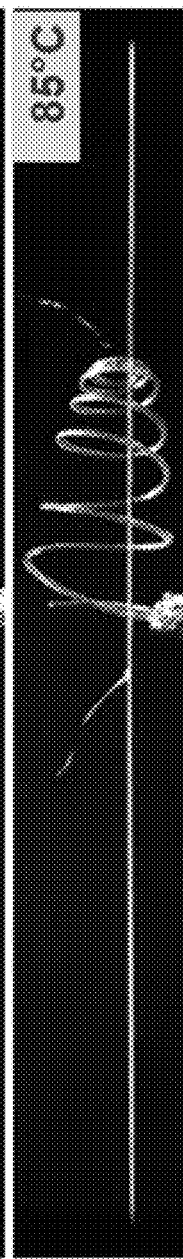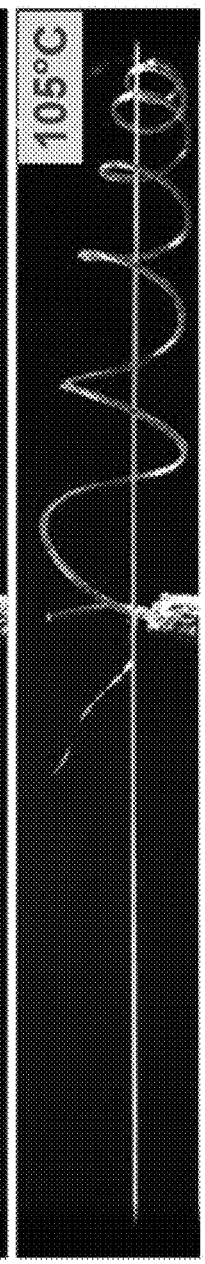

ACTUATING TEXTILES CONTAINING POLYMER FIBER MUSCLES

CROSS-REFERENCE TO RELATED PATENT APPLICATIONS

This application is the 35 U.S.C. § 371 national application of International Application Number PCT/US17/23438, entitled "Actuating Textiles Containing Polymer Fiber Muscles," filed on Mar. 21, 2017, which designated the United States, claiming priority to (i) provisional U.S. Patent Application Ser. No. 62/311,274, filed Mar. 2, 2016, entitled "Actuating Textiles Containing Polymer Fiber and Polymer Yarn Actuators," and (ii) provisional U.S. Patent Application Ser. No. 62/371,744, filed Aug. 6, 2016, entitled "Twisted, Plied, Uniformly Coiled, And Non-Uniformly Coiled Artificial Muscles For Textile Applications," which provisional patent applications are commonly owned by the Applicant of the present invention. These applications are hereby incorporated herein by reference in their entirety for all purposes.

This application is related to PCT Patent Appl. Publ. No. WO2014/022667, "Coiled And Non-Coiled Twisted Nanofiber Yarn And Polymer Fiber Torsional And Tensile Actuators," filed Aug. 1, 2013 to N. Li et al., ("Li '667 PCT Application") and is commonly owned by the owner of the present invention. The Li '667 PCT Application is hereby incorporated by reference in its entirety for all purposes.

GOVERNMENT INTEREST

This invention was made with government support under grant FA9550-12-1-0211 and grant FA9550-15-1-0089 awarded by the Air Force Office of Scientific Research, grant FA2386-13-4119 awarded by the Asian Office of Aerospace Research and Development, and Robert A. Welch Foundation grant AT-0029. The government has certain rights in the invention.

FIELD OF INVENTION

An actuating textile containing torsional or tensile polymer fiber actuators (artificial muscles) that can change its porosity, shape, loft, texture or color when exposed to a stimulus, such as a temperature change or the uptake of moisture. Advances include artificial muscles made by non-uniform twisting or coiling of polymer fibers, and coiled polymer fibers actuators that are annealed at high temperature to enable reversible actuation even when non-tethered. Especially, useful textile structures incorporating artificial muscles are described that enable changes in porosity, shape, loft, texture or color without significantly changing either textile width or length.

BACKGROUND OF INVENTION

The emergence of new and innovative technologies and changes in life-style in the modern world have generated an upsurge in development and production of multifunctional and smart (intelligent) textiles and clothing. Nevertheless, an actuating textile that can change its porosity, shape, loft, texture and color by reacting to environmental conditions or when stimulated by thermal, electrical or chemical sources is still undeveloped, although much needed for such areas as comfort-adjusting clothing, protective clothing, smart packaging, and intelligent filters that can regulate flow rate by changing their porosity.

Environmentally responsive textiles that respond to environmental temperature changes or the presence of sweat are needed for comfort-adjusting clothing. Phase change materials (PCMs) that help maintain temperatures by absorbing heat have been coated onto textiles to provide thermo-regulating textiles [Zuckerman '362 patent; Shin 2005]. Such new types of textiles have been commercialized for clothing applications, e.g., Mitsui Corporation uses PEG coated fabrics for ski and sportswear [Hu 2011]. There has also been efforts to fill hollow rayon fibers and polypropylene fibers with PCMs, but applications in clothing have been hampered by the high phase transition temperatures of the PCMs, defects in fiber walls that enable leakage of the PCMs, and undesirable effects of the PCMs on textile mechanical properties and durability [Vigo 1983]. Additionally, a commercial coating material and associated textiles (named Adaptive by HeiQ materials), has been in the market as a unique hydrofunctional polymer, which captures and distributes moisture in order to keep the wearer cool and dry.

Thermally-responsive textiles based on shape memory polymers (SMPs), mostly polyurethanes (SMPUs), have also been of interest. Thermal-responsive SMPU film can be coated, laminated, or interlined with conventional fabrics, so that a textile can be trained to undergo shape changes in response to temperature changes [Li 2004; Liu 2008]. SMPUs, with a glass transition at around human body temperature, have also been used to create breathable fabrics that help maintain a stable body temperature [Hu 2012].

Moisture-responsive SMPs have also been used for the combined thermal and moisture management. One example is a smart shirt named as 'Sphere React Shirt', whose rear vents can open up to allow perspiration and heat to escape when the wearer sweats [Hu 2012].

Hydrogels have also been used to provide environmentally-responsive thermal and moisture management in textiles. Fabrics modified with thermally responsive polymer gels (TRPGs) display swelling/deswelling or hydration/dehydration behavior in response to environmental temperature. For example, Mide Technology Corporation (USA) uses TRPG as the inner layer of a wetsuit fabric (Smart-Skin™) in order to maintain a constant temperature for divers [Serra 2002].

Shape memory fibers, which have lower shape fixity, higher shape recovery and higher recovery stress compare to SMP coatings, have also been used to make shape changing textiles. They have advantages over shape memory alloy (SMA) wires, since they can be easily applied to textiles, are inexpensive, and are highly flexible. SMP fibers produced on the laboratory scale can have tailorable switching temperatures of 5-60° C. and shape fixity ratios of 20-90% [Hu 2012].

Shape memory alloy wires have been used to provide thermally-protective clothing for firefighters. Between the two layers of a fire-fighter's coat, reversibly actuating shape memory alloy springs, with a switching temperature of 50° C., were installed. During high-temperature exposure, the shape memory alloy springs expand, thereby increasing the loft of the two-layer textile, and increasing its thermal insulation ability. Shape memory wires have also been used for fabricating smart shirts, which can automatically roll sleeves up or down depending upon the temperature. Two-way shape memory alloy springs have also been used for intelligent window curtains, which automatically open and close depending upon the temperature [Hu 2012].

In another attempt to create an apparel that includes zones with a textile having a structure that change or otherwise modified by a physical stimulus, such as the presence of water or a temperature change to modify the property of the textile, different types of textiles are described [Baron '774 patent; Davis '414 patent; Wise '448 application].

Mitsubishi Rayon Textile Co. Ltd. have described textiles based on yarns containing crimped fibers. When dry, the crimped fibers inhibit air permeation. However, when wet by perspiration, the crimping decreases to thereby decrease the fiber diameter and increase yarn porosity, thereby providing ventilation. [Mitsubishi Rayon Textile Co. Ltd., VENT-COOL™ http://mrtx.cop/en/kinou/ventcool.html].

A patent application of Kimberly-Clark, Inc. [Lee '088 application] describes the use of moisture-sensitive polymers to cause changes in textile porosity in response to moisture. The actuating textile comprises moisture-responsive yarns that are helically wrapped on parallel non-actuating yarns, so as to interconnect these non-actuating yarns.

However, most of the textile structures described do not maintain both textile width and length during exposure to moisture or temperature changes. This problem of maintaining textile width and length, while changing textile porosity, is challenging, and one which present invention embodiments address. Invention embodiments will address another important problem, which is the difficulty of realizing large changes in textile porosity or loft using the small temperature changes that affect individual comfort. Additionally, while numerous chemical processes are known that can affect textile coloration (such as by using thermally responsive or moisture sensitive dyes), there is a need for physical processes based on actuation that provide even more diverse types of visual changes to textile appearance. Finally, textile response to thermal or moisture exposures is often irreversible or poorly reversible. Methods will be described that enable highly-reversible mechanical actuation in textiles without the need to torsionally or positionally tether component fibers.

SUMMARY OF INVENTION

The present invention relates to a smart (intelligent) textile that can control its porosity, shape, texture, loft, stiffness, or color by temperature change or moisture absorption by using polymer fiber torsional or tensile actuators. This can be due to a change in the environment, such as a change in the ambient temperature or the humidity, or by an external stimulus such as electrothermal heating. These changes are enabled by actuating fibers, which actuate by torsion and/or tension upon temperature change or moisture uptake due to a high degree of helical arrangement within the fiber. This helical arrangement can occur in highly-twisted fibers, such as for the reversible torsional actuation produced by fibers that have been highly twisted to near the point at which the fiber would spontaneously form coils. This helical arrangement is also found in actuating coiled fibers, wherein a highly-twisted fiber is formed into a coil such that the coiled fiber can actuate to reversibly contract or expand. Mechanisms for using this actuation to enable smart textiles include (a) tensile actuation (contraction or expansion) of polymer fiber actuators in a textile structure (b) torsional actuation of polymer fibers to rotate textile elements; (c) contraction or expansion of the wings in a wing-type yarn; (d) buckling of yarns by contraction of tensile polymer fiber actuators; (e) yarns or ribbons that change diameter or width due to embedded torsional or tensile fiber actuators; (f) contraction or expansion of segmented mandrel actuators around a core fiber; (g) rotation of differentially-dyed polymer fiber actuators for color changing textiles; (h) tensile actuation of fiber actuators between fabric layers to change the loft between fabric layers; (i) actuation to shift the relative positions of multiple fabric layers to open and close porosity or change color; or (j) incorporation of actuating composites, which comprise actuating fibers and an elastomeric matrix, into textile structures.

Actuators that are non-uniformly coiled can provide essentially limitless stroke, non-linear stiffness, or other functional properties. Coiled muscles with variable diameter and/or pitch can provide giant strokes not otherwise achievable by uniform coils, and enable actuators with variable stiffness. This is particularly applicable to comfort-adjusting textiles that change thickness in response to temperature, and next-generation robotics. A simple twisting process can also be used to convert contracting fibers into expanding fibers.

Annealed coils made from polymer fibers thermally actuate when heated, and can be set into different shapes that are capable of reversible actuation without the need for a torsional or translational tether when annealed at a sufficiently high temperature.

Textile fabrics are broadly considered as two-dimensional surfaces made from fibers. Woven and knitted fabrics are produced from interlacing yarns while non-woven fabrics are produced directly from fibers. The present invention includes actuating woven (conventional, multiaxial, malimo, 3D or any other woven fabrics), knitted (weft and warp knitting) or non-woven fabrics that can control their porosity, shape, loft, texture or color by temperature change or a change in moisture absorption by using polymer fiber torsional and tensile actuators or their composite/hybrid forms with conventional wires/filaments/yarns. This temperature change can be due to a change in ambient temperature or by an external stimulus such as thermoelectric or thermochemical.

Of particular interest are smart textile structures that can control porosity, shape, texture, loft, stiffness, or color by temperature change or moisture absorption, without causing either the overall textile width or length to change during actuation. This can be accomplished by incorporating actuating fibers or ribbons which actuate to change their diameter or width, without substantially changing their length during temperature change or moisture absorption. The rotation of actuators or passive non-actuating elements, such as by using wing-type yarn structures, can also be used adjust porosity and other textile properties without changing either overall textile width or length. Further embodiments utilize (a) textile regions that actuate synchronously by having expanding and contracting regions, such that the overall textile width and length are preserved; (b) textile regions that actuate to change in dimension, while other non-actuating textile regions prevent the overall textile from changing either width or length; or (c) actuating regions that actuate in directions orthogonal to the direction which gives the overall textile its structure, which is typically the length direction of the region, and wherein this structural direction does not change length with actuation such that the overall textile does not change either width or length.

The possible applications of the present invention include:

The present invention can be used to regulate thermal properties to improve comfort in clothes.

The invention can be used in parachutes to control airflow during opening shock and descend which follows.

This invention can also be used to control flow-rate of fluids in technical applications such as filter fabrics or smart hoses and pipes.

This invention can be used for automatic (self) control of sun light such as for smart green house, smart curtains, smart agricultural coverings, smart sunshades and smart architectural textiles (canopies, awnings, and tarpaulins).

This invention can be used in protective clothes.

This invention can also be used in spacer fabrics to regulate the fabric loft.

This invention can be used to produce morphing textiles.

This invention can be used controllable pressure garments.

This invention can also be used for producing color changing textiles.

In general, in one aspect, the invention features a textile that includes at least one twisted or coiled polymer fiber actuator that is operable to reversibly change either (1) the porosity of at least one single layer of the textile, (2) textile coloration, or (3) combinations thereof, in response to a change in temperature or moisture absorption, without substantially changing either overall textile width or length. As used herein, "without substantially changing" a measured amount, such as width or length, means a change of less than 5%

Implementations of the invention can include one or more of the following features:

The textile may be a single-layer textile.

The polymer fiber actuator can include a fiber having a degree of twist in which the product of (a) the degree of twist per unit length multiplied by (b) the average diameter of the fiber is at least 50°.

The product of (a) the degree of twist per unit length multiplied by (b) the average diameter of the fiber can be at least 90°.

The textile can be selected from the group consisting of (a) woven structures, (b) warp-knitted structures, (c) weft-knitted structures, (d) braided structures, and (e) combinations thereof.

The textile can include a non-woven structure.

The textile can include a mechanically-stable woven core fiber structure. The fiber elements of the core fiber structure can be coaxially positioned inside the coils of a coiled polymer fiber actuator. The coiled polymer fiber actuators can be predominately either homochiral or heterochiral in structure. As used herein, "predominately" means more than 50%. In some embodiments, the coiled fiber actuators can be 75% or more either homochiral or heterochiral in structure.

The textile can include a large plurality of coiled fiber actuator surrounding a core yarn. The inner diameter of the coiled fiber actuators can be sufficiently large to allow the coiled fiber actuators to change length, largely independent of the length of the core yarn. As used herein, "sufficiently large" means at least large enough to function as described, i.e., in this instance, the inner diameter of the coiled fiber actuator is at least large enough to allow the coiled fiber to change length, largely independent of the length of the core yarn. As used herein, "largely independent" shall mean the length of change of the coiled fiber occurs with no more than a 5% change in the length of the core yarn.

The textile can include a chenille-type yarn structure that includes at least one actuating core fiber and at least one pile fiber. The pile fibers can be locked into a yarn body by the at least one actuating core fiber. The at least one actuating core fiber can include a torsional polymer fiber actuator. The pile fibers can be operable to rotate to change the textile structure.

The textile can include a wing-type yarn structure that includes at least one core fiber and at least one actuating pile fiber. The pile fibers can be locked into a yarn body by the at least one core fiber. The actuating pile fibers can include polymer fiber actuators. The pile fibers can be operable to actuate to change the textile structure.

The textile can include at least one fiber that is operable to rotate in response to a change in temperature or moisture absorption. The rotation can produce a change in porosity, color, or combinations thereof.

The polymer fiber torsional actuator can be operable to reversibly cause a change of rotational angle of the yarn of at least 10°.

The polymer fiber actuator can be operable for reversibly causing an increase or decrease in the porosity of the textile of at least 10%.

The textile can be an article of clothing.

The article of clothing can be selected from the group consisting of (a) comfort-adjusting clothing, (b) protective clothing, (c) athletic apparel, (d) morphing clothing for aesthetic purposes, and (e) combinations thereof.

The textile can be selected from a group consisting of (a) parachutes, (b) smart filters, (c) spacer fabrics, (d) smart curtains, (e) smart architectural textiles, (f) smart packaging, and (g) textiles that control the transmission of light.

The textile can include at least two fabric layers that are connected by the polymer fiber actuator. The actuator can be operable to shift the relative positions of the layers in response to a change in temperature or moisture absorption in order to change the textile porosity, coloration, or combinations thereof.

The temperature change can be provided by one or more of electrothermal heating, photothermal heating, chemothermal heating, and heat generated by electronic components.

The color change can be achieved by torsional actuation of the dual-colored or multi-colored actuating polymer fiber.

The color change can be achieved by a combination of the actuating polymer fiber and a color change element. The actuating polymer fiber can be selected from a group consisting of (i) actuating polymer fibers that operate by torsion to rotate a multi-colored element, and (ii) actuating polymer fibers that operate by tensile actuation and are joined to an element that changes color with stretch.

The color change element can be selected from a group consisting of (a) a synthetic film or fiber onto which a metallic layer has been deposited, (b) a fiber which derives its optical properties from structural coloration, and (c) combinations thereof.

There can be at least two connected actuating polymer fibers or actuating polymer fiber segments that are operable to torsionally actuate in opposite chiral directions such that, at the point of connection, the connected actuating polymer fibers or actuating polymer fiber segments cooperatively rotate an element in the same rotation direction.

The reversible change can be operable to occur without substantially causing bending of the textile. As used herein "without substantially causing bending" means that bending is not changed by more than 5 degrees.

In general, in another aspect, the invention feature a fiber that is operable to reversibly change at least one fiber thickness direction in response to temperature. The fiber includes a constituent fiber material and at least one twisted or coiled polymer fiber actuator. The fiber has a coefficient of thermal expansion in the fiber thickness that is at least 2 times greater in magnitude than the thermal expansion coefficient of the constituent fiber material.

Implementations of the invention can include one or more of the following features:

The fiber diameter can be operable to decrease with increasing temperature.

The polymer fiber actuator can include a fiber having a degree of twist in which the product of (a) the degree of twist per unit length multiplied by (b) average diameter of the fiber is at least 50°.

The product of (a) the degree of twist per unit length multiplied by (b) the average diameter of the fiber can be at least 90°.

The fiber can include a core fiber which is helically wrapped by the polymer fiber actuator The polymer fiber actuator can be tightly wrapped around the core fiber.

The polymer fiber actuator can be loosely wrapped around a high-porosity yarn,

The high-porosity yarn can have a density of below 30% of the density of the constituent fibers in the high-porosity yarn.

The fiber can further include a plurality of polymer fiber actuators that are plied together in a first twist direction and the polymer fiber actuators are twisted in a second twist direction. The first and second twist directions can be opposite.

The fiber can further include a plurality of polymer fiber actuators that are plied together. At least one polymer fiber actuator can be twisted in the opposite direction of at least one other polymer fiber actuator.

In general, in another aspect, the invention features a textile that includes at least one of the above-described fibers that is operable to reversibly change at least one fiber thickness direction in response to temperature.

In general, in another aspect, the invention features a textile structure that includes at least one twisted or coiled polymer fiber actuator. The textile is operable to reversibly change either (1) the porosity of the textile, (2) textile coloration, or (3) combinations thereof, in response to a change in temperature or moisture. The textile structure further includes one of the following:
  (a) Two or more actuating regions that change dimensions such that a first region subset of the two or more actuating regions increases in width or length in response to changes in temperature or moisture absorption. The increase in width or length of the first region subset is compensated by a second region subset of the two or more actuating regions that decrease in width or length in response to changes in temperature or moisture absorption, such that both the overall width and overall length of the textile does not substantially change.
  (b) At least one actuating region that is operable to change dimension in response to a change in temperature or moisture absorption and at least one non-actuating region, such that the non-actuating regions prevent the textile from substantially changing either overall width or overall length.
  (c) At least one actuating region that is operable to change its area in response to a change in temperature or moisture. The actuating region includes at least one coiled polymer fiber actuator, and does not substantially change dimension along at least one direction, such that the overall textile does not substantially change either width or length.

Implementations of the invention can include one or more of the following features:

The polymer fiber actuator can include a fiber having a degree of twist in which the product of (a) the degree of twist per unit length multiplied by (b) average diameter of the fiber is at least 50°.

The product of (a) the degree of twist per unit length multiplied by (b) the average diameter of the fiber can be at least 90°.

At least one non-actuating region can include an elastomeric material.

In general, in another aspect, the invention features an actuating composite structure that includes an elastomeric polymer matrix and at least one twisted polymer fiber actuator or coiled polymer fiber actuator operable for reversibly actuating in response to a change in temperature or moisture uptake. The composite is operable for reversibly changing porosity, shape, texture, color, or combinations thereof, upon exposure to a change in temperature or moisture. The twist-spun polymer fiber actuator operates by an actuation mechanism selected from a group consisting of: (A) torsional actuation, (B) tensile actuation, and (C) combinations thereof. The actuation mechanism is operable to cause a deformation of the composite structure selected from a group consisting of: (A) torsion, (B) linear dimension change, (C) bending, and (D) combinations thereof.

Implementations of the invention can include one or more of the following features:

The composite structure can be incorporated between two or more layers of fabric, such that the structure is operable to actuate in response to a change in temperature or moisture absorption to change the separation between two or more layers of fabric.

The composite structure can be part of a textile layer that is operable to reversibly change one or both of (i) porosity of the textile and (ii) appearance of the textile, in response to a change in temperature or moisture absorption.

The composite structure can be operable to function as a flap that is operable to reversibly open or close in response to a change in temperature or moisture absorption.

There can be at least two connected actuating polymer fibers or actuating polymer fiber segments that are operable to torsionally actuate in opposite chiral directions such that, at the point of connection, the connected actuating polymer fibers or actuating polymer fiber segments cooperatively rotate an element in the same rotation direction.

In general, in one aspect, the invention feature a coiled, twisted polymer fiber that is operable to reversibly actuate without being torsionally or positionally tethered.

Implementations of the invention can include one or more of the following features:

The coiled, twisted polymer fiber can be homochiral. The coiled, twisted polymer fiber can have space between adjacent coils of the coiled, twisted polymer fiber such that the coiled, twisted polymer fiber is operable to actuate by contracting when heated.

The coiled, twisted polymer fiber can be heterochiral. The coiled, twisted polymer fiber can be operable to actuate by expanding when heated.

The coiled, twisted polymer fiber can be operable to increase stiffness in response to a temperature increase or an increase in absorbed moisture by realizing inter-coil contact.

In general, in another aspect, the invention features a twisted or coiled polymer fiber actuator. The twisted or coiled polymer fiber actuator is operable to reversibly actuate by changing length, twist or combinations thereof in response to a change in temperature or moisture absorption. The twisted or coiled polymer fiber actuator has a variable property that varies over the length of the actuator. The variable property is selected from a group consisting of coil diameter, coil pitch, fiber diameter, fiber twist direction, amount of fiber twist, fiber composition, coiling direction, and combinations thereof.

Implementations of the invention can include one or more of the following features:

The actuator can include at least two coils. The at least two coils can be operable to telescope through one another during actuation.

The actuator can be operable to reverse the coil chirality of at least one coil during actuation.

The actuator can be operable to reverse the chirality of all coils during actuation.

The actuator can be a tensile actuator that has a variable stiffness that is a function of displacement of the actuator.

The actuator can be a tensile actuator that has a variable stiffness that is a function of temperature of the actuator.

The actuator can be operable to actuate by electrothermal heating, photothermal heating, or a combination thereof.

The actuator can be operable to operate in response to a change in temperature. The maximum reversible change in actuator strain can be greater than 1% per degree Celsius change in temperature.

The polymer fiber actuating element can include nylon.

The can be operable to change the thermal conductivity of a packaging material in response to the environmental temperature or humidity.

The thermal conductivity of the packaging material can be maximum at an upper temperature limit and can be minimum at a lower temperature limit.

In general, in another aspect, the invention features a textile that includes at least one of the above-described twisted or coiled polymer fiber actuator.

Implementations of the invention can include one or more of the following features:

The can be operable to regulate thermal properties in response to temperature by a method selected from a group consisting of: (a) a change in textile porosity, (b) a change in overall textile thickness, (c) a change in the separation between two or more fabric layers within the textile, and (d) combinations thereof.

The textile can include two or more fabric layers. The polymer fiber actuator can be attached to at least one of the fabric layers. The polymer fiber actuator can be operable to change the spacing between two or more fabric layers in response to a change in temperature.

In general, in another aspect, the invention features a textile that includes two or more layers of fabric. Twisted or coiled polymer fiber actuators are included as a filler material between the two or more layers of fabric. The textile is operable to change thickness as a consequence of dimensional changes of the filler material in response to a change in temperature or moisture absorption.

Implementations of the invention can include one or more of the following features:

The change in thickness can be operable to occur without substantially changing either overall textile width or length.

The change in thickness can be operable to occur without substantially causing bending of the textile.

In general, in another aspect, the invention features a textile that includes at least two actuating textile elements. The actuating textile elements include coiled polymer fiber actuators. The coiled polymer fiber actuators are incorporated in the width direction of the textile element such that the actuating textile elements are operable to reversibly change in width, without substantially changing length, in response to a change in temperature or moisture absorption, to reversibly change textile porosity without substantially changing either the width or length of the textile.

Implementations of the invention can include one or more of the following features:

The actuating textile elements can form a woven, knitted, or braided structure.

The actuating textile elements can form a woven structure. The actuating textile elements can be connected at one or more intersection points between warp and weft elements.

The actuating textile elements can be ribbons.

The ribbons can include woven, knitted, or braided fabrics.

The polymer fiber actuators can be incorporated into the weft direction of the woven fabric ribbons.

In general, in another aspect, the invention features a method of making a heterochiral coiled actuator having opposite twist and coiling directions. The method includes the step of making a homochiral coiled actuator by twisting a polymer fiber in a first direction. The method further includes the step of reversing the coil direction of the homochiral coiled actuator by twisting in a second direction opposite to the first direction to make the heterochiral coiled actuator.

Implementations of the invention can include one or more of the following features:

The method can further include adding additional twist to the heterochiral coiled actuator in the first direction after the step of reversing.

The step of adding additional twist can improve performance of the heterochiral coiled actuator as compared to the performance of the heterochiral coiled actuator before the step of adding additional twist.

The method can further include the step of annealing the heterochiral coiled actuator after the step of reversing.

The method can be conducted without the use of a mandrel.

In general, in another aspect, the invention features a method for making a coiled polymer fiber that reversibly actuates without being positionally or torsionally tethered. The method includes the step of positionally and torsionally tethering a coiled polymer fiber. The method further includes the step of, while maintaining the positional and torsional tethering of the coiled polymer fiber, thermally annealing the coiled polymer fiber at a temperature that is above 150 C and below the melting temperature of the polymer. The method further includes the step of, after annealing, removing the positional and torsional tethering of the annealed coiled polymer fiber. The annealed coiled polymer fiber can reversibly actuate without being positionally or torsionally tethered.

Implementations of the invention can include one or more of the following features:

The coiled polymer fiber can include a polyamide.

The polymer can be nylon 6. The temperature during the step of thermal annealing can be above 160 C.

The polymer can be nylon 6,6. The temperature during the step of thermal annealing can be above 180 C.

The step of annealing can be conducted in a vacuum or in an inert atmosphere.

The annealing can be conducted in an atmosphere containing a vapor that is absorbed by the polymer.

The coiled polymer fiber can be homochiral. The structural confinement can be applied during the step of annealing to result in a coiled polymer actuator in which there is spacing between adjacent coils at room temperature to allow contractile actuation.

The structural confinement applied to produce the spacing can be such that there is little or no spacing between adjacent coils during the step of annealing.

The coiled polymer fiber can be heterochiral. The structural confinement applied during the step of annealing can result in a coiled polymer actuator in which there is little or no spacing between adjacent coils at room temperature.

The coiled polymer fiber that reversibly actuates without being torsionally or positionally tethered can include a plied coiled fiber or a coiled fiber that is part of a secondary coiled structure.

At least one of diameter, amount of fiber twist, spacing between adjacent coils, and the direction of coiling of the coiled polymer fiber can vary along the coil length of the coiled polymer fiber.

The confinement applied to produce such spacing can be such that adjacent coils are well-separated during annealing.

In general, in another aspect, the invention features a coiled polymer fiber made by at least one of the above-described methods for making a coiled polymer fiber that reversibly actuates without being positionally or torsionally tethered. The increasing temperature can be operable to cause tensile modulus of the coiled fiber to decrease by a factor of at least 2 times.

In general, in another aspect, the invention features a textile including a polymer fiber made by at least one of the above-described methods for making a coiled polymer fiber that reversibly actuates without being positionally or torsionally tethered.

In general, in another aspect, the invention features a textile that includes at least two fabric layers. Each of the fabric layers includes at least one twisted or coiled polymer fiber actuator. The at least one twisted or coiled polymer fiber actuator is operable to reversibly change either (1) the porosity of at least one single layer of the textile, (2) textile coloration, or (3) combinations thereof, in response to a change in temperature or moisture absorption.

Implementations of the invention can include one or more of the following features:

The actuating fibers do not substantially migrate between the fabric layers. Fibers that connect the fabric layers are substantially non-actuating fibers. As used herein "not substantially migrate" means that there is less than 10% of actuating fibers migrating between the fabric layers. "Substantially non-actuating fibers" means that at least 90% are non-actuating fibers.

The textile can include a plurality of twisted or coiled polymer fiber actuators. The plurality of twisted or coiled polymer fiber actuators can be connected by bonding and can be not interlaced.

The reversible change can be operable to occur without substantially causing bending of the textile.

In general, in another aspect, the invention features a textile that includes two or more layers of fabric. A twisted or coiled polymer fiber actuator connects at least two layers so that less than 10% of the length of the polymer actuator is in a fabric layer. Separation between fabric layers is operable to change in response to a change in temperature or moisture absorption.

Implementations of the invention can include one or more of the following features:

The separation change can occur without substantially changing either overall textile width or length.

The separation change can occur without causing bending of the fabric layers. As used herein, "without causing bending" means that bending is not changed by more than 5 degrees.

Filler material can be between at least two fabric layers.

The polymer fiber actuator can be a homochiral coiled polymer fiber actuator. The separation between fabric layers can be operable to decrease in response to a change in temperature or moisture absorption.

The polymer fiber actuator can be a heterochiral coiled polymer fiber actuator. The separation between fabric layers can be operable to increase in response to a change in temperature or moisture absorption.

The textile can further include at least one twisted or coiled polymer fiber actuator that is predominately contained within a fabric layer. In some embodiments, the textile can further include at least one twisted or coiled polymer fiber actuator that is at least 90% contained within the fabric layer.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

It is also to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

FIGS. 3A, 3C, and 3E are the yarns in the initial state. FIGS. 3B, 3D, and 3F are the yarns of FIGS. 3A, 3C, and 3E, respectively, in the actuated state.

FIG. 4A shows a wing-type yarn structure that is a fancy yarn named chenille yarn where the core yarn twisted to incorporate the wing yarns, which are pile (or effect) yarns that can be any natural or man-made fibers.

FIG. 4B is an illustration of a wing-type yarn that can be rotated by torsional actuation to open or close pores.

FIG. 4E is an illustration of a wing-type fiber structure, in which the wings include fiber loops that actuate in response to temperature changes or moisture uptake.

FIG. 4F is an illustration of a related embodiment to FIG. 4E in which the fiber wings are actuating to produce changes in wing dimensions and/or wing rotations.

FIGS. 5A-5D are illustrations of wing-type composite fibers made by combining torsional or tensile actuators together with ribbon fibers by fusing, sewing or using any other suitable methods.

FIG. 10A shows the initial state and FIG. 10B shows the actuated state.

FIG. 10C shows the initial state and FIG. 10D shows the actuated state.

FIGS. 22A-22E show a morphing woven fabric produced by homochiral and heterochiral mandrel-coiled actuators. FIG. 22A shows a surface view of this morphing woven fabric. FIGS. 22B-22D show morphing stages of this fabric. FIG. 22E shows the pattern report of the woven fabric.

FIGS. 27A-27B show folding stages of morphing fabric. This fabric is produced by integrating polymer actuators onto fabric surface by suitable techniques such as sewing, bonding, fusing or embroidery.

FIGS. 34A-34E show pictures of the thermal actuation of the coil in FIG. 33 at (A) 30° C., (B) 50° C., (C) 70° C., (D) 85° C., and (E) 105°.

DETAILED DESCRIPTION

Figure 2:
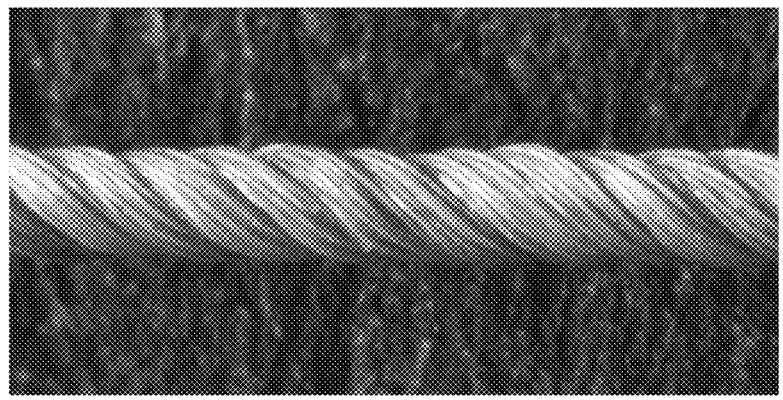
FIG. 2 shows a polymer fiber torsional actuator made by highly twisting and annealing mono or multifilament polymers such as nylon 6, nylon 6,6, polyethylene, PVDF, aromatic polyamide, polyester, etc., to just below the point where twisting causes the spontaneous formation of coils in the fiber.

The present invention includes actuating woven, knitted and non-woven fabrics that can control their porosity, shape, texture, loft, or color in response to temperature change or humidity change by using polymer fiber or polymer hybrid fiber torsional and tensile actuators. For the purposes of this invention, the term 'fibers' includes both fibers and assemblies of fibers such as those found in yarns. However, the term 'yarn' retains its ordinary definition as an assembly of fibers. A 'twisted' fiber is defined as a fiber that is twisted, but not coiled. A 'twisted fiber actuator' is defined as a twisted fiber that is capable of reversibly undergoing a torsional rotation in response to a change in temperature or moisture that provides a torsional index of at least $T_R D=0.2°$, wherein $T_R$ is the torsional actuation in degrees per meter and D is the average fiber diameter. In some embodiments, the twisted fiber actuator includes a fiber having a degree of twist in which the product of (a) the degree of twist per unit length multiplied by (b) the average diameter of the fiber is at least 50°, and, in some further embodiments, at least 90°.

A 'coiled' fiber is defined as a fiber that comprises a fiber that is twisted and which is arranged in a helical structure. A 'coiled fiber actuator' is defined as a coiled fiber which is capable of reversibly undergoing a change in length in response to a change in temperature or moisture that exceeds 8% of its non-actuated coiled length. In some embodiments, the coiled fiber actuator includes a twisted fiber, which twisted fiber includes a fiber having a degree of twist in which the product of (a) the degree of twist per unit length multiplied by (b) the average diameter of the fiber is at least 50°, and, in some further embodiments, at least 90°.

'A 'self-coiled' fiber is a coiled fiber which is produced by inserting twist into a twisted fiber under tension, without the use of a mandrel. A 'mandrel-coiled' fiber is herein defined as a coiled fiber produced by wrapping a twisted fiber around a mandrel to form a coil. A 'homochiral' coiled fiber is a coiled fiber in which the chirality of fiber twist and coil helicity are of the same handedness, and a 'heterochiral' coiled fiber is a coiled fiber in which the chirality of fiber twist and coil helicity are of the opposite handedness. A 'hybrid yarn' and a 'hybrid fiber' are herein defined as a twisted yarn or fiber (as the case may be) that is infiltrated with an actuating guest material. A 'twisted hybrid yarn actuator' is a hybrid yarn that produces torsional actuation in response to a change in temperature or moisture that provides a torsional index of at least $T_R D=0.1°$. A 'coiled hybrid yarn' is defined as a yarn that comprises a twisted hybrid yarn that is arranged in a helical structure. A 'coiled hybrid yarn actuator' is defined as a coiled hybrid yarn that is capable of reversibly undergoing a change in length in response to a change in temperature or moisture that exceeds 4% of its non-actuated coiled length.

It should be understood that in these invention embodiments, the actuating fiber can be either a hybrid yarn (i.e., a twisted yarn that is infiltrated with an actuating guest material), or a twisted or coiled fiber that need not contain an actuating guest.

We start from low cost, high-strength fibers—most often those used as fishing line or sewing thread. Commercially-produced polyethylene and nylon fibers are important muscle precursors, since they combine reversible fiber-direction thermal contraction, large volumetric thermal expansion, and large anisotropy in thermally-induced dimension changes to provide enhanced muscle stroke.

Twist is inserted into these polymer fibers to make them chiral, which enables them to function as torsional muscles. Most importantly, we greatly amplify tensile stroke by inserting such a large amount of twist that some twist converts to fiber coiling, called writhe. By completely coiling the fibers, tensile contractions exceeding the maximum in vivo stroke of human skeletal muscles (~20%) are obtained. This coiling is more compact than used to amplify the stroke of shape memory metal wires, thereby providing contraction against higher applied stress (19 MPa for nylon) than reported for NiTi coils (~1.6 MPa), where stress is obtained by normalization to the non-actuated coil's cross-sectional area. The spring index (C), the ratio of mean coil diameter to the fiber diameter, for such polymer muscles can be less than 1.7, whereas for NiTi coils this ratio exceeds 3.0.

The weight applied during self-coiling (i.e. mandrel-free coiling) is important, and is adjustable over a narrow range for a given fiber—too little weight and the fiber snarls during twist insertion and too much weight and the fiber breaks. For example, the load during coiling can be varied between 10 and 35 MPa for a 127 μm diameter, nylon 6,6 sewing thread, yielding coils with spring indices between 1.7 and 1.1, respectively.

Immediately after self-coiling (which results in homochiral fibers if the inserted twist is exclusively in one direction), adjacent coils are in contact, limiting contraction during actuation, and must be separated by increasing tensile load or reducing twist. Additionally, as-fabricated heterochiral coiled polymer fiber actuators must be under compressive load in order to provide useful actuation by fiber expansion. The inventors have found that by thermally annealing self-coiled homochiral fibers above a critical temperature, while both positionally and torsionally tethered, the resulting polymer fiber has well-separated coils at room temperature. This means that the annealed self-coiled homochiral fiber muscle can provide large stroke, reversible actuation in a textile without the need to apply any load to the textile. Also, using thermal annealing conditions as for homochiral fiber muscles, the inventors discovered that a compressive load need not be applied to a heterochiral coiled polymer fiber muscle that has been suitably annealed.

This thermal annealing process additionally eliminates another important problem that restricts the use of polymer fiber muscles as actuating elements in textiles: the as-fabricated twisted or coiled polymer fiber muscles must be torsionally tethered in order to provide reversible actuation. This thermal annealing process should be conducted above a critical temperature, and below the melting temperature of the polymer, in order to realize large stroke actuation for coiled muscles, as well as to eliminate the need for torsional tethering. The critical temperature needed to achieve these benefits depends upon the polymer used for the polymer fiber actuator. For example, this critical temperature is 160 C for nylon 6 and 180 C for nylon 6,6. Based on knowledge of this discovery that homochiral coiled polymer fibers can provide large contractile strokes without the application of a tensile load, and that heterochiral coiled polymer fibers can usefully actuate without an applied compressive load, individuals skilled in the art will be able to apply this technology to other polymers.

It is expensive to insert twist into individual fibers if twist insertion is from a fiber end. However, the inventors have discovered that they can use false twist to fabricate artificial muscle fibers that contain fiber segments having large amounts of twist in opposite chiralities. To accomplish this, twist can be inserted in one or more positions along the length of the fiber. Fiber lengths on one side of this twist insertion point have left-handed twist and those on the other side have right-handed twist. Unless something special is done, the left and right handed twist will largely cancel during or after fabrication. This special processing is to combine false twist insertion with thermal annealing during actuator fabrication.

It has been previously impossible to make heterochiral coiled polymer fibers using a self-coiling process (i.e. without the use of a mandrel). Such heterochiral coiled polymer fiber muscles are especially useful for increasing textile porosity during temperature increase. Additionally, use of mandrel coiling for the fabrication of heterochiral coiled polymer fiber muscles is expensive and limiting with respect to the structure of the resulting coiled polymer fiber muscles. More specifically, the spring index of a coiled polymer fiber muscle is important for determining actuator properties, and the small spring indexes needed for generating high mechanical forces during actuation are not obtainable using mandrel coiling. The inventors have discovered that they can use self-coiling to make small spring index heterochiral coiled polymer fiber muscles. To accomplish this, they used the following process: (1) twist is inserted into a polymer fiber until either partial or complete coiling occurs; (2) the resulting structure is thermally annealed at a temperature that can be either above or below the above described critical temperatures, while positionally and torsionally tethered; and (3) twist in the reverse direction is inserted into the annealed polymer fiber until at least partial conversion of homochiral coils to heterochiral coils occurs. Thereafter, the resulting polymer fiber actuator can be optionally thermally annealed at a temperature either above or below the critical temperature while positionally and torsionally tethered.

Hybrid yarn actuators are also important for invention embodiments. These hybrid yarn actuators comprise a twisted yarn or coiled yarn that contains volume-changing guest. The yarn fibers can be polymeric or non-polymeric, such as carbon nanotubes. The methods for twisting and coiling these muscles are analogous to those described for the twisted and coiled fiber muscles. The choice of guest is critically important for determining the muscle response. For example, thermal actuation over a broad or narrow temperature ranges can be accomplished by selecting a polymer guest that has a volume change that varies little with temperature or one that changes volume at one or more phase transitions, respectively. Similarly, high stroke actuation in response to water or perspiration results from suitable selection of the yarn guest [Kim 2015]. Examples of particularly useful yarn guests for moisture-responsive indicators include guests that form hydrogels and hygroscopic materials.

Depending upon the application, a textile should increase or decrease porosity with increasing temperature or exposure to moisture. For example, a comfort-adjusting textile can usefully respond to increasing temperature by increasing porosity. Similarly, a perspiration-responsive textile can usefully increase porosity as a result of moisture uptake. On the other hand, a textile used to protect emergency workers against chemical or fire hazards can usefully decrease porosity when a chemical or thermal hazard is present. Similarly, a technical textile used for agricultural purposes can usefully decrease porosity to hinder water evaporation when heated by the sun. As another example, an electrothermally-heated textile in a parachute can be engineered to either increase or decrease porosity when heated.

Homochiral fiber actuators contract when heated and heterochiral fibers expand. The inventors will describe textile structures that increase porosity with increasing temperature by using polymer fiber muscles that either increase or decrease length with increasing temperature. Similarly, the inventors have obtained textile structures that decrease porosity with increasing temperature by using polymer fiber muscles that either increase or decrease length with increasing temperature.

Fabrics that undergo color changes are well known, but commonly utilize thermochromic or moisture-responsive pigments. The inventors will here describe means by which the actuation of polymer fiber muscles can provide color changes, as well as other changes in textile appearance and texture.

Textile Structures

Textile structures of the present invention are disclosed, including those that can change porosity, shape, texture, loft, or coloration in response to temperature or moisture changes. Invention embodiments are applicable for diverse textile structures, including woven, knitted, braided, non-woven textile structures. Additionally, these textile structures can be made using a combination of processes, such as those including embroidery, sewing, and bonding. However, for all of these invention embodiments, actuation in response to changing temperature or moisture is provided by either a polymer fiber actuator or a hybrid fiber actuator whose preparation has been described above.

Figure 1C:
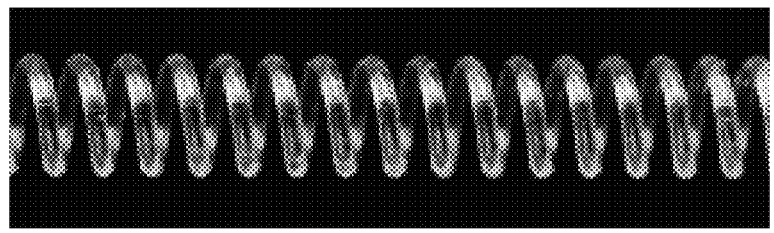
FIG. 1C shows a specific type of tensile actuator: a mandrel-coiled polymer fiber actuator.
Figure 1B:
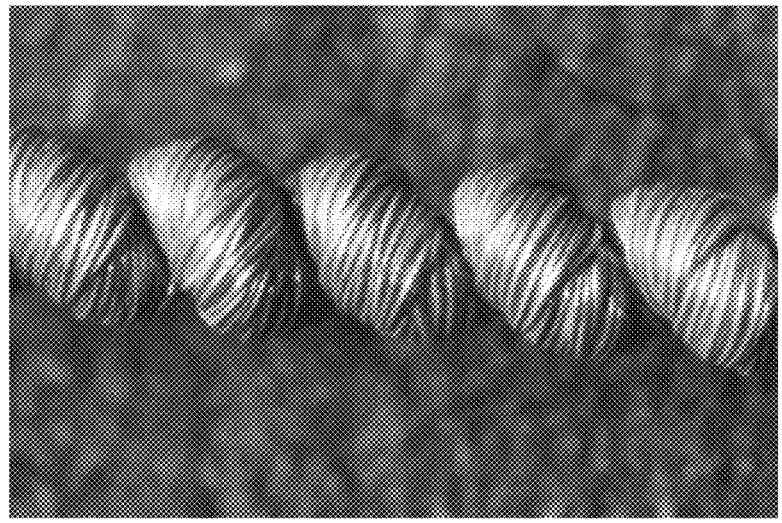
FIG. 1A-1B show polymer fiber tensile actuators made by coiling and annealing mono or multifilament polymers respectively, such as nylon 6, nylon 6,6, polyethylene, PVDF, aromatic polyamide, polyester, etc.
Figure 1A:
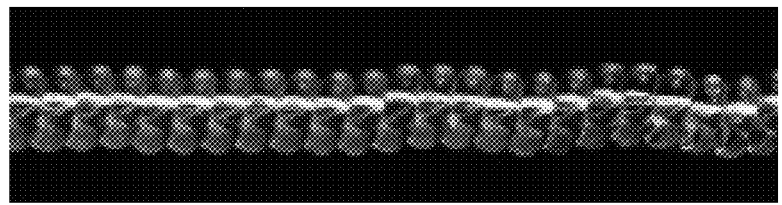

FIG. 1A shows a tensile artificial muscle made by self-coiling a nylon 6,6 monofilament. FIG. 1B shows a tensile artificial muscle made by self-coiling a silver-coated nylon 6,6 yarn. This tensile polymer fiber actuator can contract up to 20% when heated. Hence, if this polymer fiber actuator is woven in both weft and warp direction in a plain weave textile, this actuation would reduce textile porosity by up to 36%.

FIG. 1C shows a mandrel-coiled artificial muscle fiber, which was made by wrapping a highly twisted nylon 6,6 monofilament on a mandrel and then annealing this coiled polymer fiber.

FIG. 2 shows a torsional artificial muscle made by highly twisting a nylon 6,6 yarn to just below the point where self-coiling is initiated.

Figure 3A:
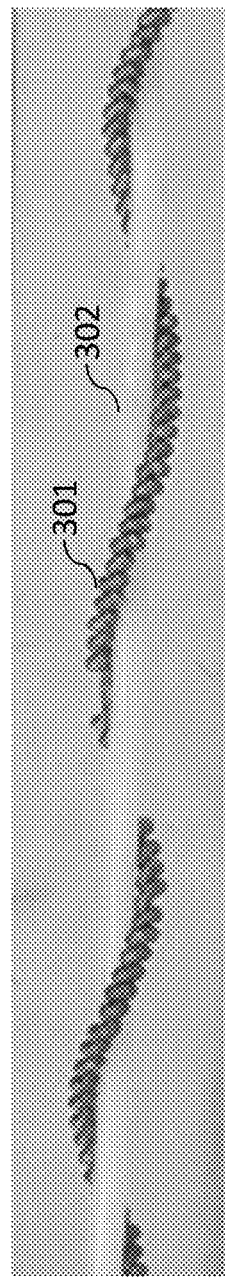
FIGS. 3A-3F show a composite yarn made by wrapping tensile or torsional actuator helically around a straight core yarn, such as elastomeric yarn.
Figure 3B:
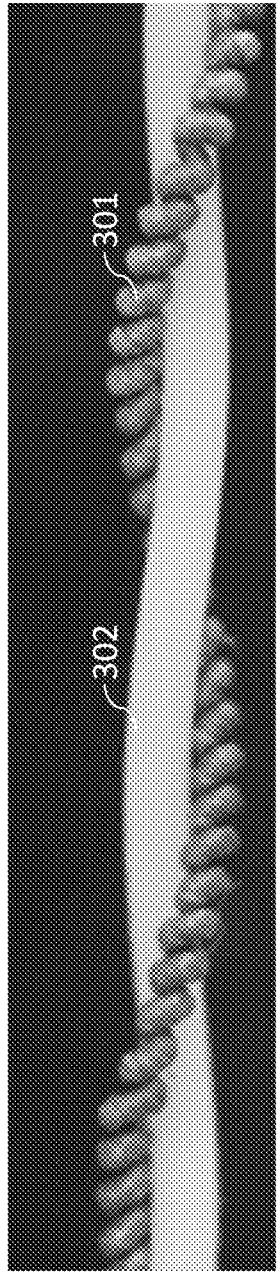
Figure 3C:
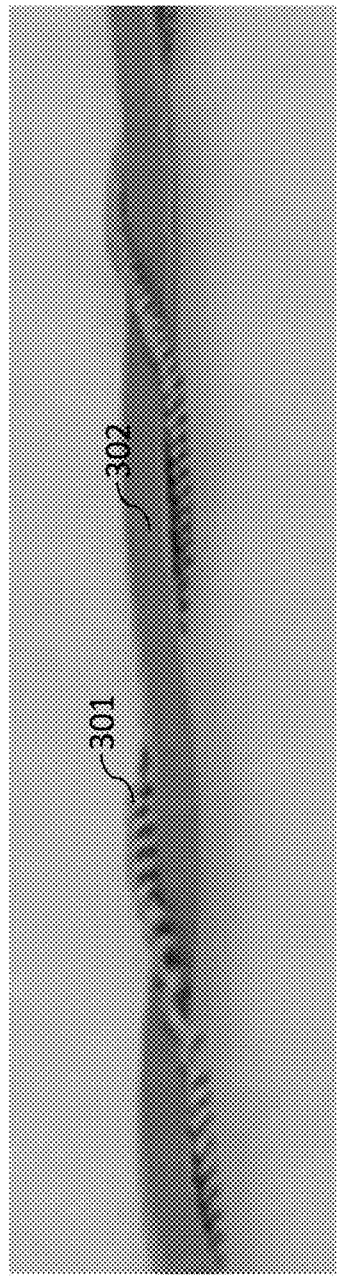
Figure 3D:
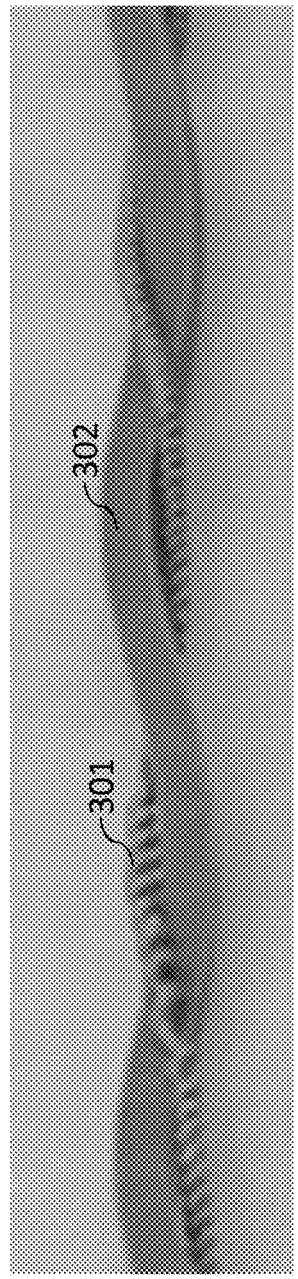
Figure 3E:
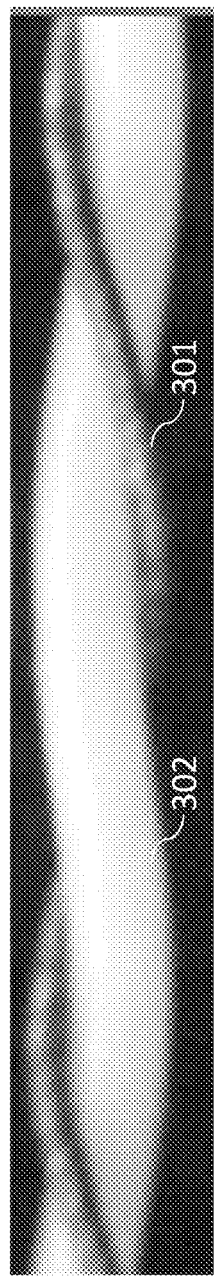
Figure 3F:
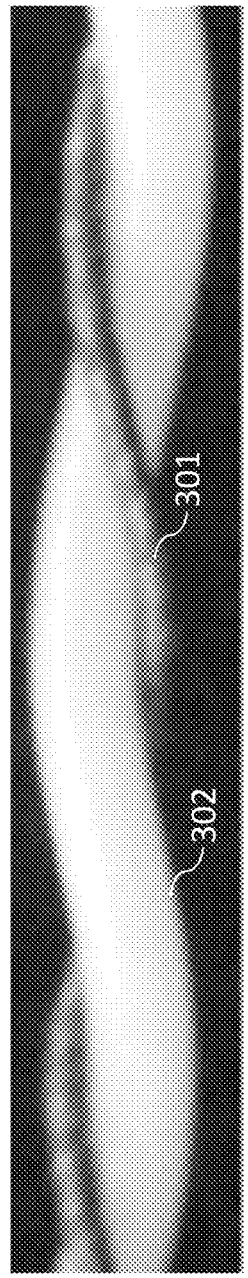
Figure 3G:
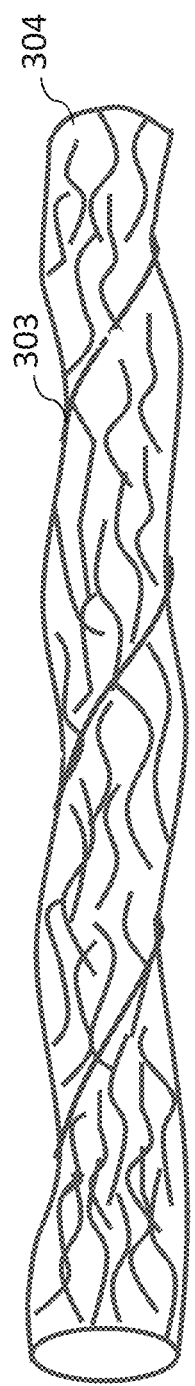
FIG. 3G is an illustration of thermal contraction of an actuating fiber operable to densify a core yarn.

FIGS. 3A-3F show exemplary embodiments of composite fibers in initial and in thermally actuated states, respectively. FIGS. 3A, 3C, and 3E are the fibers in the initial state. FIGS. 3B, 3D, and 3F are the fibers of FIGS. 3A, 3C, and 3E, respectively, in the actuated state. The polymer fiber actuator 301 is helically wrapped around a straight elastomeric (core) fiber 302. Actuation of the helically wrapped polymer fiber actuator causes the core fiber to buckle. If this fiber structure were incorporated into a textile, this buckling will increase textile porosity. Correspondingly, a decrease in textile temperature would decrease textile porosity. In the examples of FIGS. 3A and 3B, as well as FIGS. 3C and 3D, the actuating fiber is self-coiled. The comparative example pictured in FIGS. 3E and 3F shows that the same buckling process results when the actuating fiber is highly twisted but not coiled. FIG. 3G illustrates that thermal contraction of an actuating fiber (polymer fiber actuator 303) is operable to densify a core yarn (high porosity core yarn 304). If this core yarn were incorporated into a textile, yarn densification would increase textile porosity.

FIG. 4A shows one exemplary embodiment of a yarn structure that can be used for porosity control of a fabric without substantially changing either the overall width or length of this fabric. In this example, a core actuating yarn supports the wings (piles) of a chenille structure. However, in more general embodiments, the actuating yarn need not be the core yarn of the chenille structure, but could instead actuate to rotate a passive chenille yarn to change porosity. While a chenille structure is normally defined as a yarn that is manufactured by placing short lengths of pile yarns between two core yarns, and then twisting the yarn together, in this invention embodiment a chenille structure (or, equivalently, a wing-based structure) is defined as any yarn-supported structure that contains wings, whether or not these wings are yarn structures. Moreover, in this more general definition, the wings need not extend on both sides of the yarn.

An example of this chenille yarn structure in FIG. 4A-B consists of a core yarn 401 that is produced by twisting a polymer fiber torsional actuator 403 together with a monofilament yarn 404 while the wing (or pile) yarns 402, which are locked into the yarn body by the core yarn 401, are situated in a way that they are placed perpendicular to the yarn axis. In response to a temperature change, the actuators rotate around the yarn axis, turning pile yarns to open porosity.

The above mentioned core actuating yarn rotates the wings of the chenille structure to open or close porosity depending upon the temperature. The porosity of the chenille structure should be minimized at temperatures where the highest degree of thermal insulation is desired. Upon increasing temperature above these temperatures, the wings of the chenille structure rotate to open porosity. So that decreasing temperature does not also open porosity, the textile weave is selected to prohibit wing rotation beyond the fully-closed state. Additionally, in some embodiments, the actuating core yarn contains thermally set segments having opposite handedness, so that they rotate in opposite directions during thermal or moisture driven actuation.

The above described blocking of undesired wing rotation need not be used for some categories of applications. One example of such applications is the use of an actuating chenille structure to control thermal insulation of a package containing pharmaceutical products, which should neither be frozen nor exposed to too high a temperature. The pile yarns of FIG. 4A-B can be positioned vertically to provide maximum porosity, corresponding to minimum insulation, at the desired temperature. Higher or lower temperature provides decreased porosity by rotating these pile yarns to increase insulation. In a variation of this embodiment, the pile yarns can be incorporated so that wings extend asymmetrically from the core yarn, and adjacent pile yarns are positioned at intervals less than the wing length, such that the flaps block in a closed position beyond both a low and a high temperature. At temperatures between these extremes, the flaps rotate to open porosity. In further embodiments, the chirality of rotation of wings for adjacent chenille yarns can be opposite, so that oppositely directed rotations provide blocking in either the opened or the closed position when the temperature either exceeds or is lower than a targeted temperature.

The schematic wing-type yarn of FIG. 4B can be a non-actuating chenille yarn which is rotated by the torsional actuation of a fiber which responds to temperature changes or moisture uptake. Alternatively, if the core yarns are made from torsional actuating fibers which untwist in response to temperature increase, the yarn will not rotate when subjected to a uniform change in temperature, but individual segments will be operable to rotate in response to non-uniform heating of the yarn. When it is desirable for the core fibers of a wing-type yarn to rotate in response to uniform temperature changes, the core fibers can be incorporated using non-uniform twist, such as by using alternating S and Z chirality fiber segments.

Figure 4C:
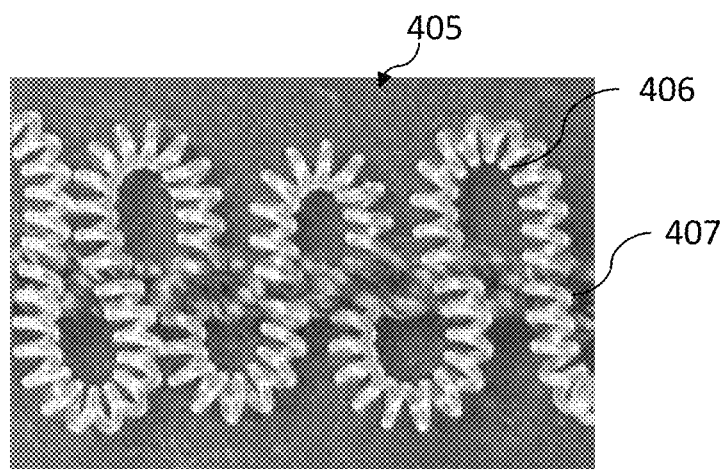
FIG. 4C shows a wing-type yarn made by incorporating mandrel-coiled as the wings.
Figure 4D:
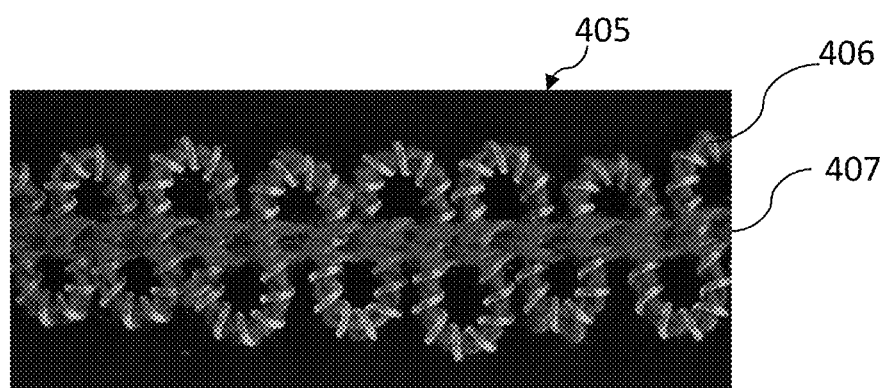
FIG. 4D shows a similar wing-type yarn to that shown in FIG. 4C that additionally contains core yarn within the mandrel-coiled wings.

FIGS. 4C-4D show wing-type fiber structures in which thermally-induced or moisture-induced actuation of the wings causes the desired change in textile porosity without necessitating changes in either textile width or length. In this invention embodiment, the wings of the fiber 405 undergo dimensional change in response to temperature change or moisture uptake, and the core part of the fiber 405 can optionally be non-actuating. For cosmetic purposes, the wings can include both actuating fibers 406 and non-actuating fibers 407. In FIG. 4C, the actuating fiber 406 is a homochiral mandrel actuator and the non-actuating fiber 407 is ordinary yarn. In FIG. 4D, the actuating fiber 406 is a homochiral mandrel actuator with ordinary core yarn and the non-actuating fiber 407 is ordinary yarn.

FIG. 4E illustrates a wing-type fiber structure 409 that has a polymer actuator 410, binding yarn 411, and core yarn 412, in which the wings include fiber loops that actuate in response to temperature changes or moisture uptake. This actuation to change the porosity of a textile can involve both changes in loop dimensions and/or loop rotations. FIG. 4F illustrates a related embodiment of a wing-type fiber structure 413 (that has a polymer actuator 410, binding yarn 411, and core yarn 412) in which the fiber wings are actuating to produce changes in wing dimensions and/or wing rotations, thereby changing the porosity of a textile into which the wing-type fiber structure is incorporated.

FIG. 5A shows a wing-type composite fiber in which a torsional fiber actuator 501 is periodically attached to a ribbon fiber' 502. The torsional fiber actuator 501 is segmented so that neighboring ribbon segments have opposite chirality (S and Z), and the attachment points between the ribbon fiber and the actuating chirality-segmented fiber are made at either all S-Z connections or all Z-S connections, but not mixtures thereof. As a result of this attachment structure and the opposite chirality of neighboring actuator segments, the ribbon rotates uniformly in one direction during temperature change or moisture absorption, thereby opening or closing porosity in a textile. The use of a segmented ribbon consisting of several wings along the length of the warp actuating fiber allows this structure to be woven into a textile with weft yarns intersecting between the wings. Without the use of blocking mechanisms, like described in the discussion of FIG. 4, increased porosity results from increasing or decreasing temperature with respect to the temperature that results in all ribbons in the textile being parallel. While such operation can be useful for maintaining a product at a fixed temperature, it is more generally desirable for porosity to change in opposite directions for increasing and decreasing temperatures. Hence, for these embodiments, such as for comfort-adjusting or protection-providing textiles, it is desirable to use blocking mechanisms for ribbon rotation that are like those described for chenille yarns. Like for other methods described herein for using torsional rotation to change textile porosity, the rotations of the present fibers in a textile can be used to change textile color and overall appearance.

Figure 5C:
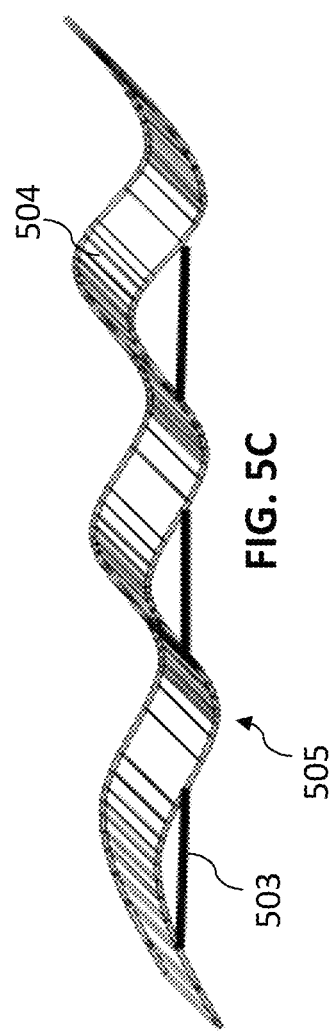
Figure 5D:
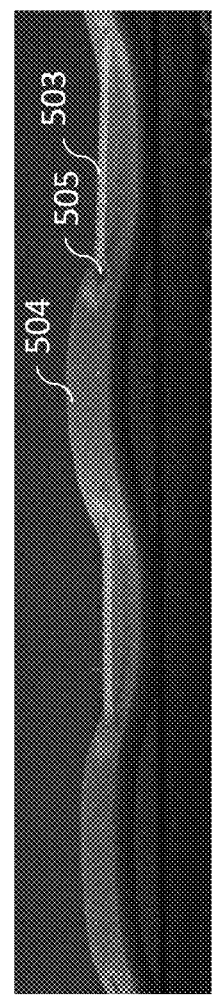

FIGS. 5B-5D show a composite yarn made by combining a polymer fiber tensile actuator 503 with an elastomer yarn 504. In this example, the actuator is bonded to the elastomer yarn at regular intervals 505. The actuator contracts when temperature increases to cause buckling of the elastomer yarn to open the pores in the fabric, or change the thickness of the fabric.

Figure 14A:
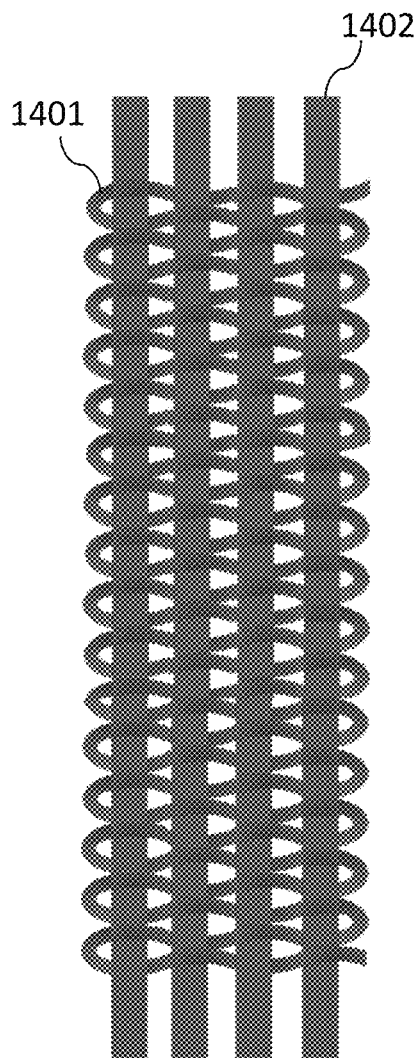
FIGS. 14A-14B illustrate a narrow woven fabric (a ribbon), wherein mandrel-coiled polymer fiber actuators are woven in the weft direction of the ribbon so that the width and area of the ribbon can change in response to changes in temperature or moisture absorption without changing the length of the ribbon.
Figure 14B:
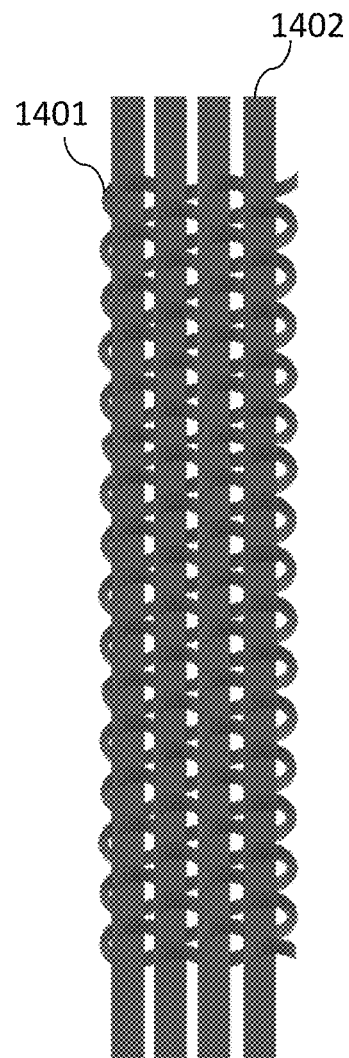

FIGS. 14A-14B show a yarn type that can be referred to as ribbon (or tape yarn). Such narrow woven fabrics (i.e., the ribbon in FIGS. 14A-14B) can respond to changes in temperature or moisture absorption to control textile porosity. FIG. 14A shows a woven ribbon in the non-actuated state, where homochiral coiled polymer fiber actuators (polymer fiber actuators 1401) are woven into the non-actuating material (passive fibers 1402) of the ribbon across such materials width (weft direction). When heated, these coiled actuators contract as shown in FIG. 14B, reversibly decreasing the width of the ribbon while leaving its length unchanged.

The ribbon of FIGS. 14A-14B is itself a woven structure produced by narrow weaving machines. The ribbon includes homochiral actuators as weft yarns (1401) that causes decrease in ribbon width without changing ribbon length upon heath application. That corresponds to diameter decrease in the conventional yarns having circular cross-section. No change in ribbon length is expected as the actuators are laid only in weft direction in the ribbon. This provides an increase in porosity of resulting fabric without changing its overall dimensions.

In a fabric, such actuating ribbons can be used together with or without non-actuating ribbons in weft or/and warp directions. As discussed below, FIGS. 16A-16D show the use of the actuating ribbon of FIGS. 14A-14B with non-actuating ribbon yarns.

Figure 6A:
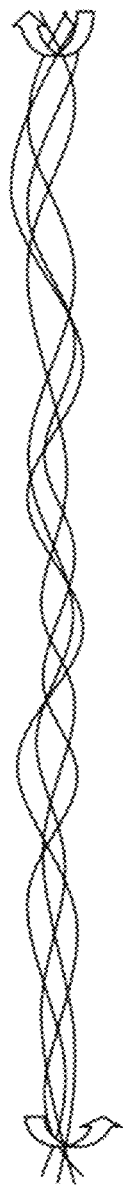
FIGS. 6A-6B are illustrations that show the multi-filament actuator that can change its diameter by twisting or untwisting with temperature change or moisture uptake, as these figures show the initial and actuated state of this yarn.
Figure 6B:

FIGS. 6A-6B show a multifilament actuator in its initial and actuated state, respectively. The described yarn can change its diameter by twisting or untwisting with changes in temperature or moisture absorption. This actuator is produced by using polymer multifilament yarn. The yarn is coiled and then thermally annealed to partially set the coiled structure. Thereafter, the coiled structure is untwisted until the coils disappear and then reappear with the opposite chirality. Finally, this coiled yarn is thermally annealed a second time to partially set the reversely coiled structure, and then untwisted to the point where the coils are completely removed and the resulting yarn contains little twist. This yarn process is generally applicable to the polymer fibers used to make artificial muscles, and has also been demonstrated for a commercially available nylon 6,6 yarn (Shieldex) in which the individual fibers within the yarn are coated with silver. Application of the above process for the Shieldex yarn resulted in an actuating yarn that reversibly changed diameter by 20% during heating. This 20% reduction in yarn diameter enables a thermally produced, reversible porosity increase of up to 36% for a textile that incorporates this actuating yarn.

Figure 7A:
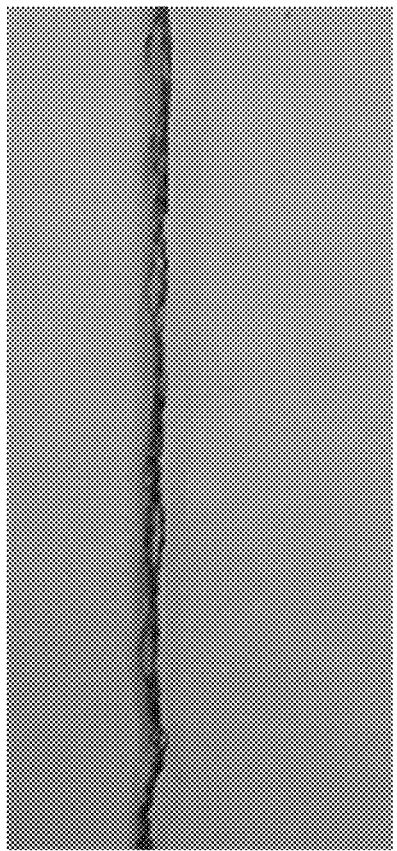
FIGS. 7A-7B show yarns made by loosely plying one S-twisted torsional polymer fiber actuator with a Z-twisted torsional polymer fiber actuator, as these figures show the initial and actuated state of these yarns.
Figure 7B:
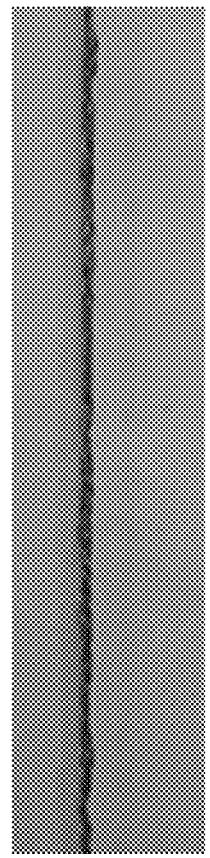
Figure 7C:
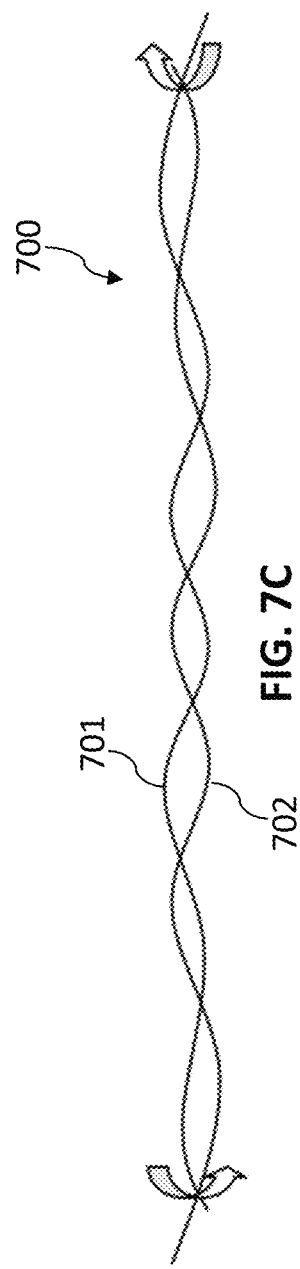
FIGS. 7C-7D are illustrations of these actuators.
Figure 7D:
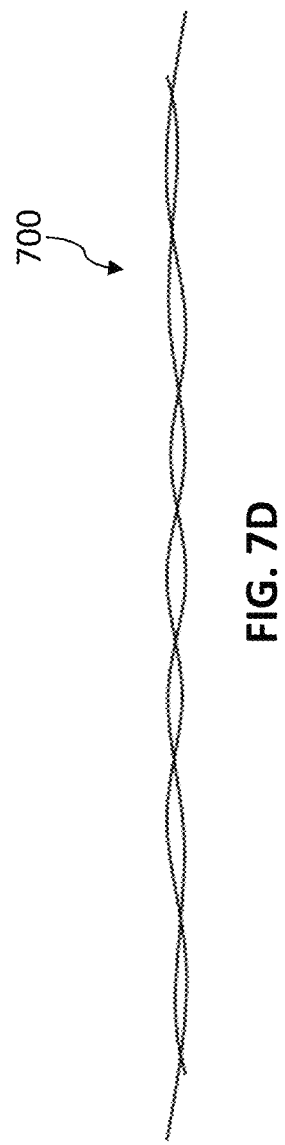

FIGS. 7A-7D show that fibers having opposite chiralities can be loosely plied together to make a yarn that decreases diameter when heated or exposed to moisture. FIG. 7A shows the non-thermally-actuated state and FIG. 7B shows the thermally-actuated state for a S-twisted nylon 6,6 polymer fiber actuator that has been loosely plied with a Z-twisted nylon 6,6 polymer fiber actuator. FIG. 7C and FIG. 7D are schematic illustrations of the structures pictured in FIGS. 7A-7B, respectively, where 700 is the plied yarn and 701 and 702 are fibers having opposite chiralities. An increase in temperature causes the actuators in the yarn to contract in length and rotate in opposite directions to thereby decrease the diameter of the plied yarn. This decrease in diameter during temperature increase can be used to increase the porosity of a textile that contains the two-ply actuating polymer fiber.

The key aspect that enables this invention embodiment is the existence of loose plying between actuating polymer fibers. Consequently, this invention embodiment can be practiced independent of the chirality of the actuating fibers and the number of actuating fibers that are plied together. However, if all actuating fibers within the yarn have the same chirality and are plied together using this chirality, the yarn will increase diameter when temperature increases or moisture content increases, thereby causing the porosity of a textile incorporating this yarn to decrease. Inversely, if all actuating fibers within the yarn have the same chirality and the chirality of plying is opposite to the chirality of the actuating fibers, the diameter of plied yarn will decrease with increasing temperature or increasing moisture content in the yarn. For cases of these embodiments where the temperature increase or moisture increase results in an increase in the yarn diameter, it is not necessary for the non-actuated state of the plied yarn to be loosely plied.

Figure 8A:
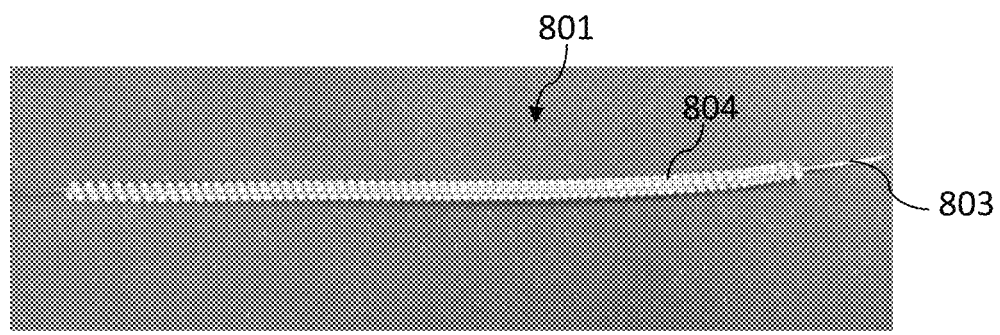
FIGS. 8A-8D show composite yarns made by inserting core wire/filament or yarn into a mandrel actuator. The mandrel actuator can be used either as continuous (FIGS. 8A, 8C) or segmented (cut into short lengths) form (FIGS. 8B, 8D).
Figure 8B:
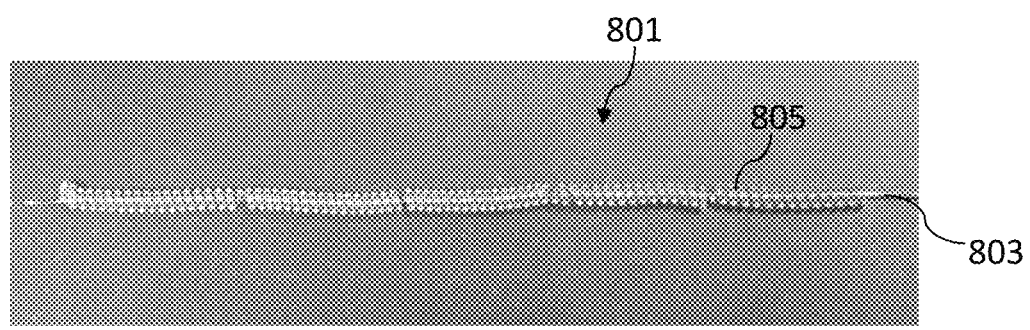
Figure 8C:
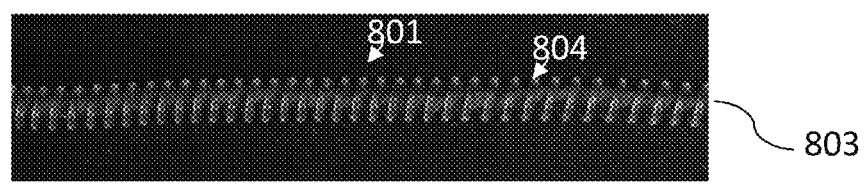
Figure 8D:
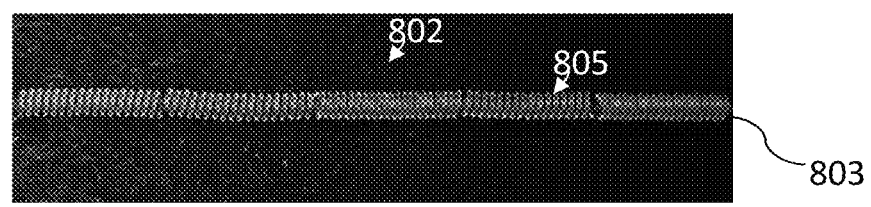

The next invention embodiment describes a composite fiber structure in which a coiled polymer fiber actuator is supported on a core fiber. FIGS. 8A-8B show a composite yarn (801 and 804, respectively) made by inserting a core fiber 803 into a mandrel actuator. The mandrel actuator can be used either as a continuous mandrel actuator (such as the homochiral mandrel actuator 804 in FIG. 8A) or in a segmented form (such as the segmented mandrel actuator 805 in FIG. 8B). The core fiber can be any polymer monofilament or conductive wire such as copper wire, if conductivity or electrothermal actuation is desired in the product. FIGS. 8C-8D show the same type of yarn with non-actuating core yarn.

Figure 9A:
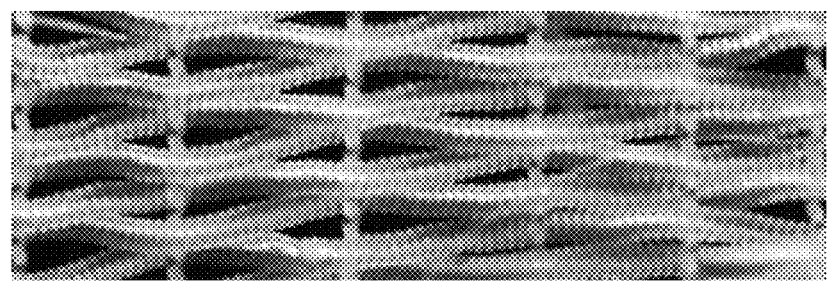
FIGS. 9A-9B show a woven fabric structures made using polymer fiber tensile actuators that contract to decrease textile porosity with increase of temperature.
Figure 9B:
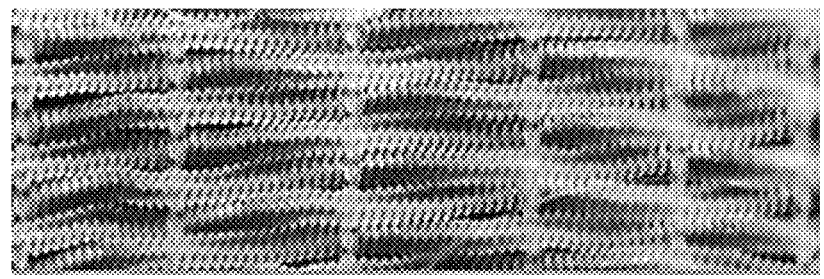
Figure 9C:
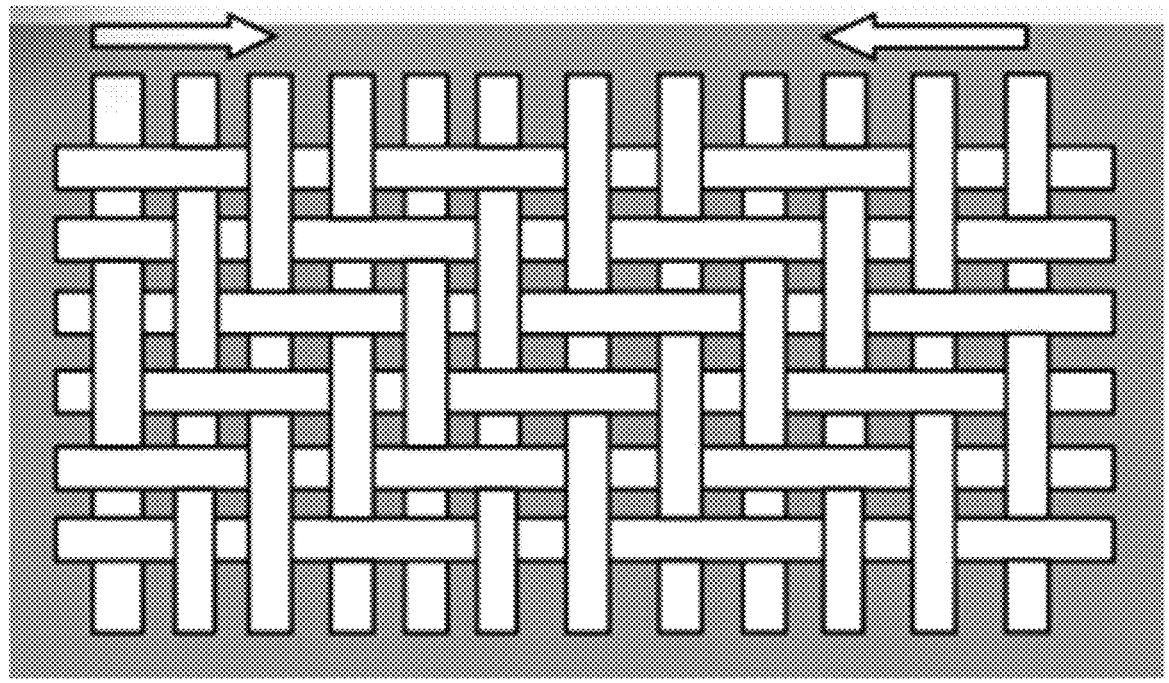
FIGS. 9C-9D are illustrations that correspond to the fabric structures shown in FIGS. 9A-9B, respectively.
Figure 9D:
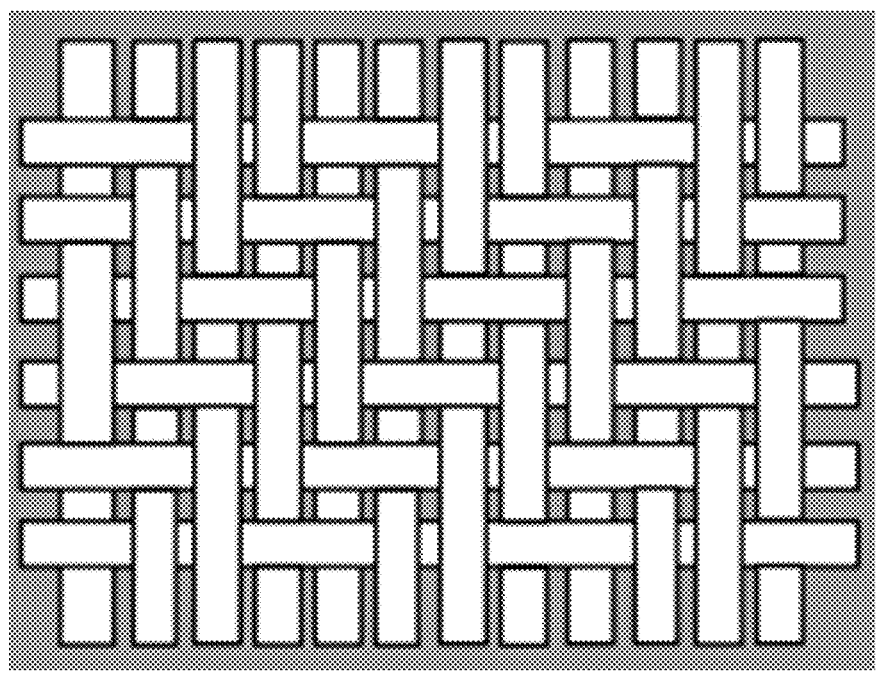

FIG. 9A shows a fabric woven by using homochiral polymer fiber actuators in both the warp and weft directions. These homochiral actuators contract and untwist when temperature increases, reducing the porosity of the resulting fabric, as shown in FIG. 9B. Subsequent temperature decrease causes the porosity to increase to its initial state. FIGS. 9C and 9D are illustrations that correspond to the fabric structures shown in FIGS. 9A and 9B, respectively.

Porosity change is defined by the equation:

$$\text{Porosity Change (\%)} = \frac{Af_2 - Af_1}{Af_1} \times 100 \quad [1]$$

where $Af_1$ is the projected area of the pores in the initial state and $Af_2$ is the projected area of the pores in the actuated state. In the fabric shown in FIGS. 9A-9B, the porosity decreased by 26% when the fabric was heated.

Figure 10A:
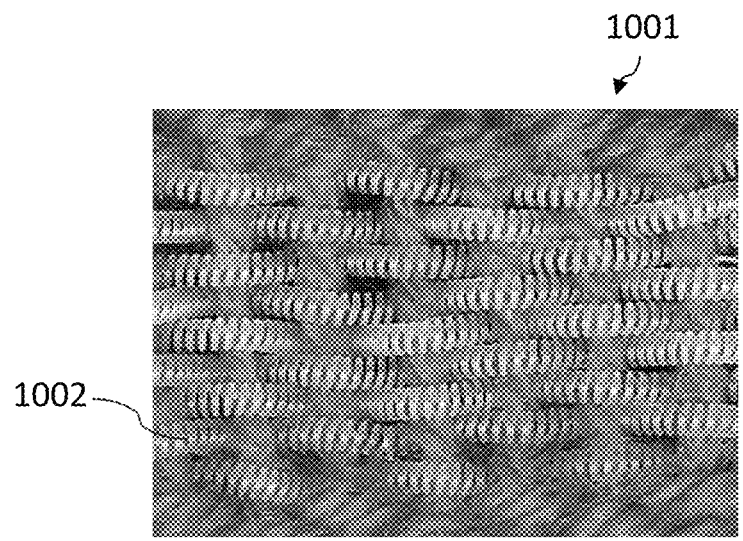
FIGS. 10A-10B show a basic plain-weave fabric structure made by incorporating homochiral mandrel-coiled actuators to decrease textile porosity with temperature increase.
Figure 10B:
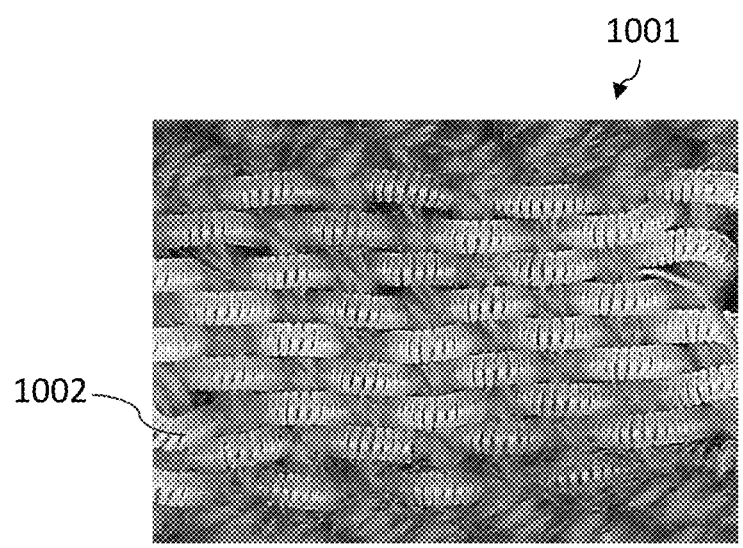

FIG. 10A shows an exemplary embodiment of a plain-weave fabric 1001 using homochiral mandrel-coiled actuators 1002 as warp fibers. With temperature increase, the actuators contract in the fabric, leading to a decrease in textile porosity of up to 88%, as shown in FIG. 10B.

Figure 10C:
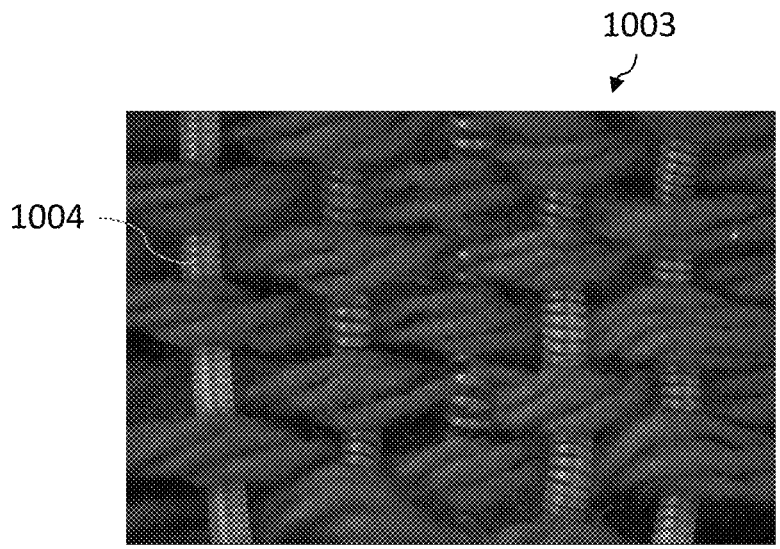
FIGS. 10C-10D show a plain-weave fabric structures made by incorporating heterochiral mandrel-coiled actuators to increase textile porosity with temperature increase.
Figure 10D:
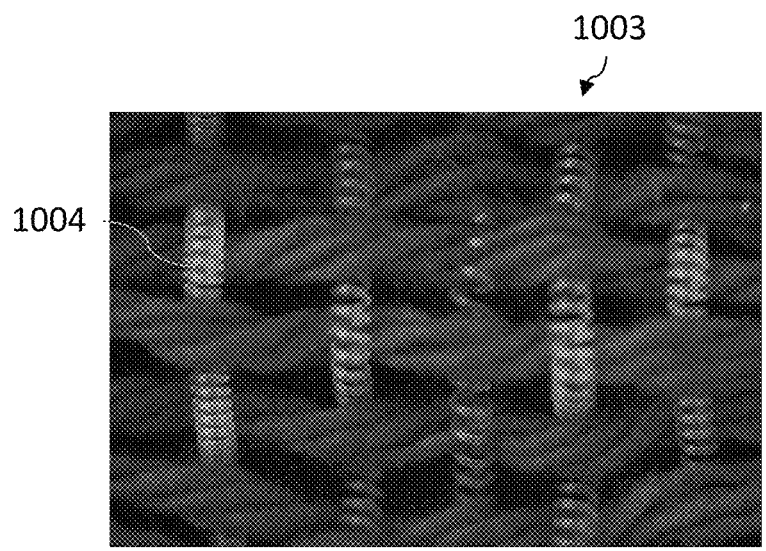

FIG. 10C shows a similar plain-weave fabric 1003 produced by using heterochiral mandrel-coiled actuators 1004 as weft fibers. With temperature increase, the actuators expand in the weft direction, leading to an increase in textile porosity of up to 88%, as shown in FIG. 10D.

Figure 10F:
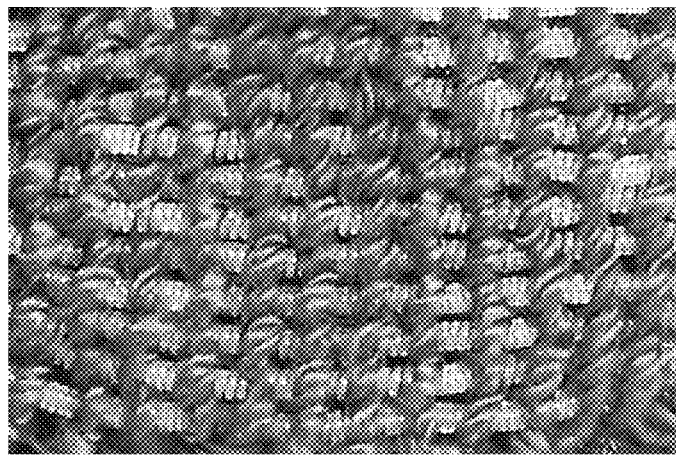
FIGS. 10E-10F show the initial and actuated state of a leno weave fabric produced by incorporating homochiral mandrel-coiled polymer actuator in the warp direction.
Figure 10E:
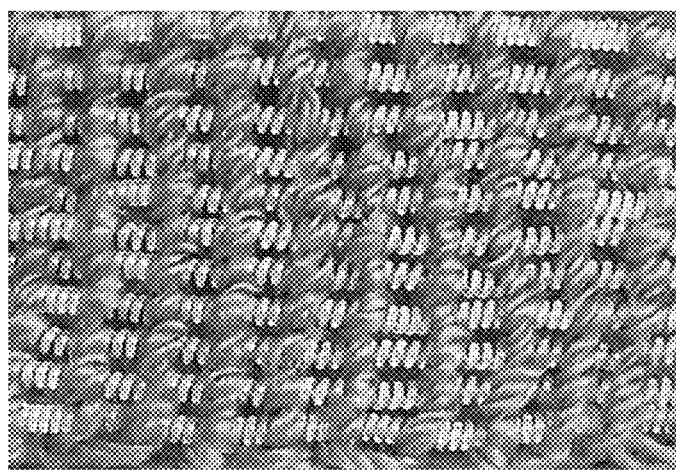
Figure 10G:
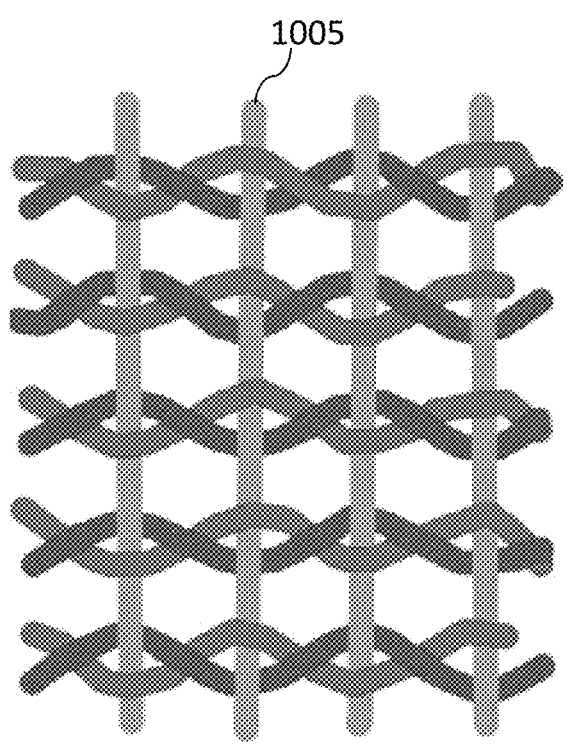
FIG. 10G shows an illustration of leno weave.

FIG. 10E shows a specific fabric structure, leno weave, produced by using parallel, weft-oriented, homochiral mandrel-coiled actuators that pass through pairs of non-actuating warp fibers, as illustrated by FIG. 10G (which shows mandrel-coiled actuators 1005). With temperature increase, the actuators contract, causing the porosity of the fabric to substantially decrease (up to 50%) as shown by FIG. 10F.

Actuating fibers can respond to changes in temperature or moisture uptake in order to open and close pores within a textile. However, it is often undesirable for this porosity change to cause corresponding changes in either the textile's overall width or length. This change in either textile width or length during actuation can be avoided by having textile regions which actuate to change shape, such as by changing the width of the region, but substantially leave at least one direction unchanged. For instance, the examples in FIGS. 15A-15I1 and FIGS. 16A-16F show textiles wherein homochiral, mandrel-coiled fiber actuators are woven into textile regions and textile structures to cause these woven elements to contract along the actuating fiber's direction when temperature increases. Within this textile element, the direction perpendicular to the actuating fiber is the direction which substantially defines the width and length of the overall textile, and does not change during actuation.

Textile elements that actuate to change their width or length can be incorporated into a non-actuating textile framework to open or close pores in response to a change in temperature or moisture uptake, without changing either the overall width or overall length of the textile. The methods to incorporate actuating textile elements, such as actuating ribbons, into non-actuating textiles include warp knitting, weft knitting, weaving, stitching, bonding, braiding and so on.

Figure 15A:
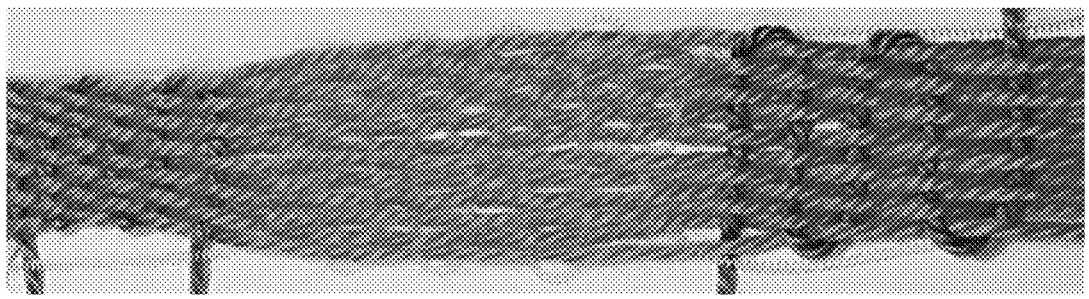
FIGS. 15A-15H show textiles wherein homochiral, mandrel-coiled fiber actuators are woven into textile regions and textile structures to cause these woven elements to contract along the actuating fiber's direction in response to changes in temperature or moisture absorption.
Figure 15B:
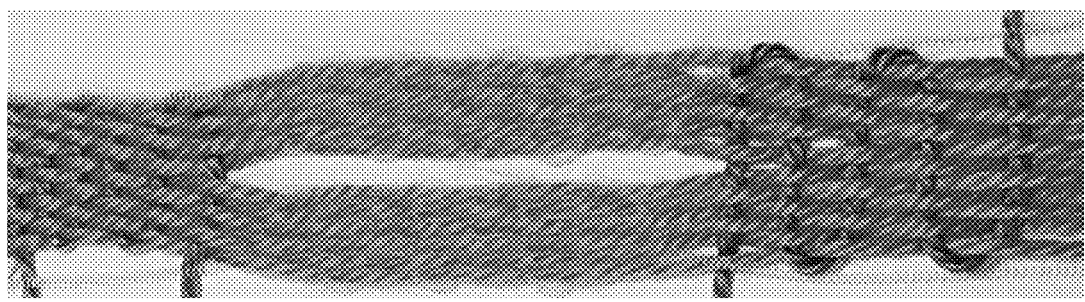
Figure 15C:
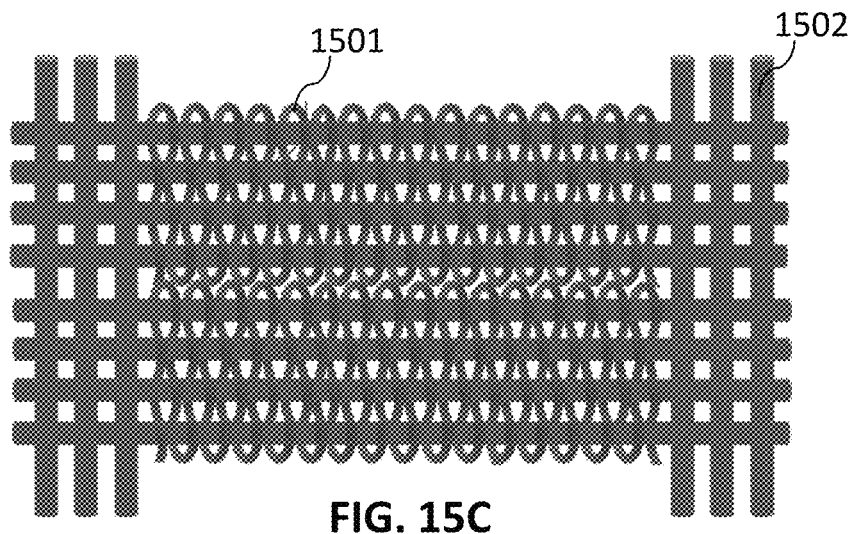
Figure 15D:
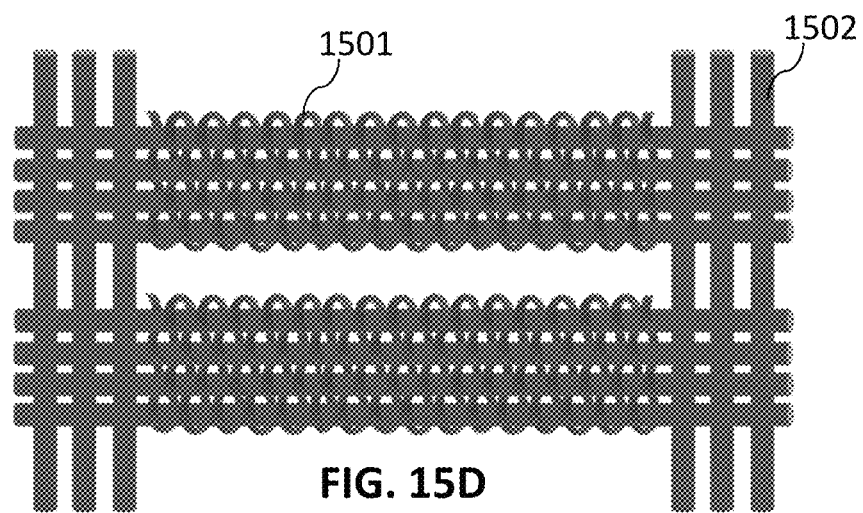

FIGS. 15A-15B show a woven fabric consisting of non-actuating regions and actuating regions. FIGS. 15C-15D illustrate textile configuration and actuation mechanism of FIGS. 15A-15B. The actuating regions are located in the middle of the textile, and comprise two separate elements made by weaving mandrel-coiled polymer fiber actuators (polymer fiber actuators 1501) as the weft yarns, together with non-actuating warp yarns (passive fibers 1502).

At room temperature, these two actuating textile elements are parallel and in contact with each other. When the temperature increases, the homochiral coiled weft yarns in FIG. 15A and FIG. 15C actuate to open a pore between the two textile elements, as shown in FIG. 15B and FIG. 15D.

Figure 15F:
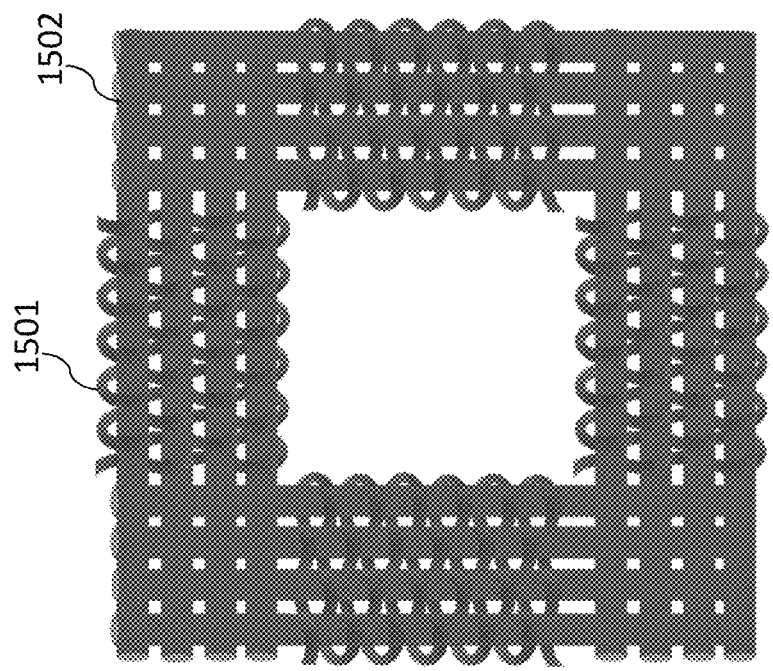
Figure 15E:
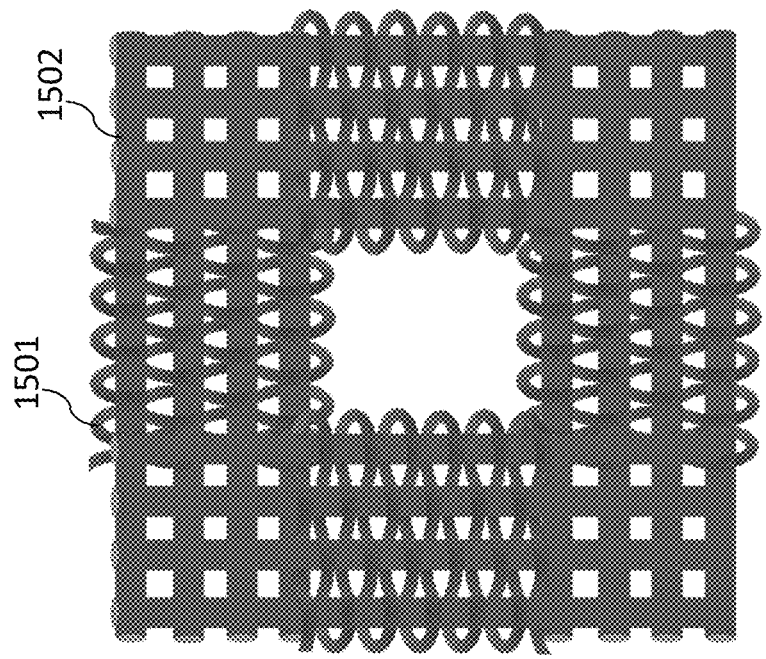
Figure 15H:
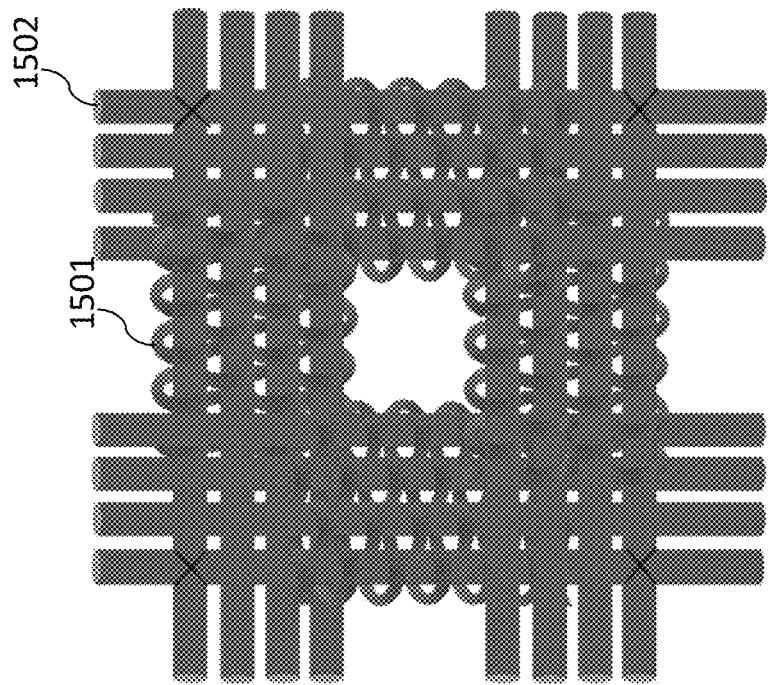

Other preferred embodiments utilizing width changing elements to cause reversible porosity change without changing overall textile width or length are illustrated in FIGS. 15E-15I1, which, also have polymer fiber actuators 1501 and passive fibers 1502. The textile structure illustrated in FIGS. 15G-15H, also shows bonding fiber 1503.

Figure 15G:
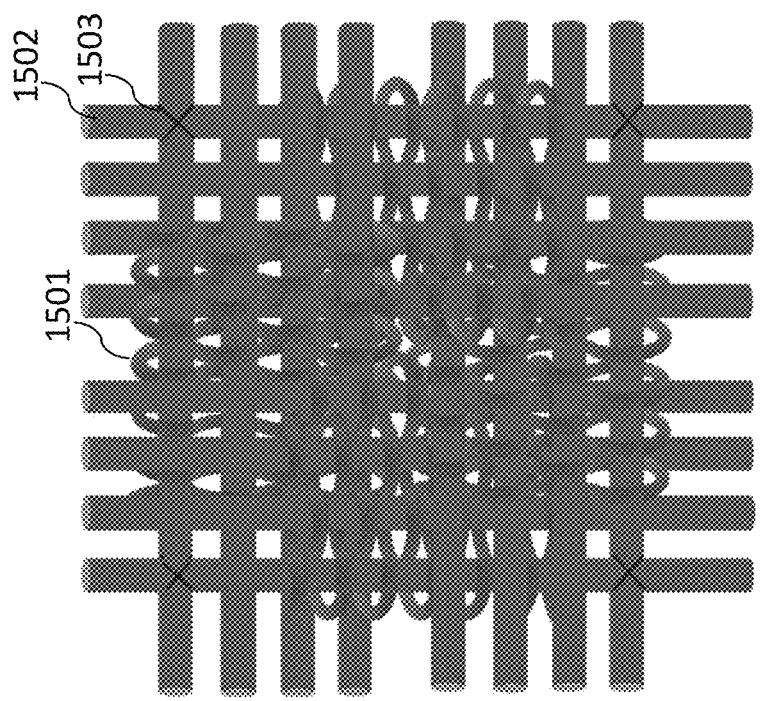

The initial textile structure of FIG. 15E and FIG. 15G increase porosity with increasing temperature or moisture uptake by either increasing the size of existing pores inside the textile, as shown in FIG. 15F or by creating new pores inside a textile, as shown in FIG. 15I1. Similar structures can also be fabricated using heterochiral coiled polymer fiber actuators to achieve decreased porosity with increasing temperature or moisture uptake, for example to provide more shade or shielding in desired applications.

It should be understood that, in these embodiments, the actuating region need not to be rectangular. Different shapes of the actuating region and different shapes of the created pores can easily be fabricated by persons skilled in the art, for instance, by choosing different weaving, stitching, knitting or braiding patterns to incorporate polymer fiber actuators.

FIGS. 16A-16D show a textile designed by using ribbon-like narrow woven fabrics, like that in FIGS. 14A-14B, in the weft and warp directions of the textile, i.e., ribbon-like narrow fabric 1601 in the warp direction (which fabric 1601 was woven by using polymer actuators in the weft direction) and ribbon-like narrow fabric 1602 in the weft direction (which fabric 1602 was woven by using polymer actuators in weft direction). The textile of FIGS. 16A-16D further include non-actuating ribbon-like narrow fabric, ribbon fibers, or yarns 1603.

Figure 16A:
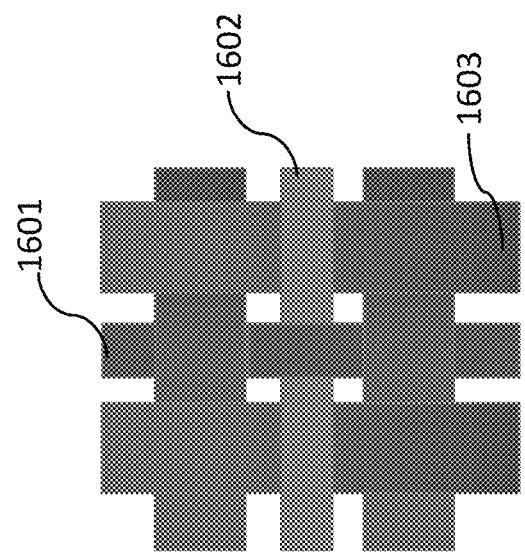
FIGS. 16A-16F show additional textiles wherein homochiral, mandrel-coiled fiber actuators are woven into textile regions and textile structures to cause these woven elements to contract along the actuating fiber's direction in response to changes in temperature or moisture absorption.
Figure 16B:
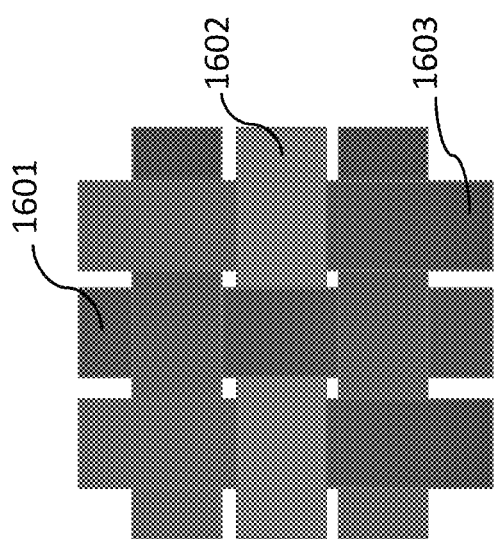
Figure 16D:
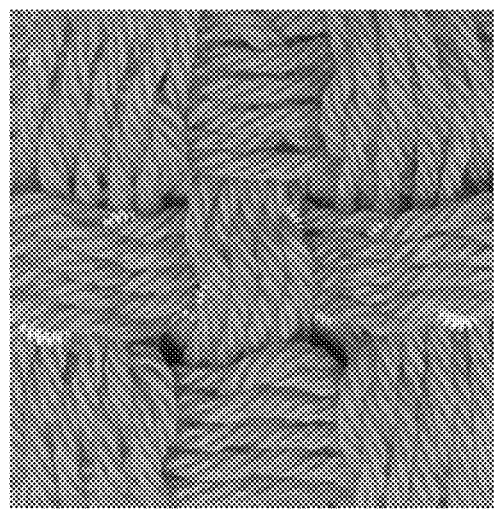
Figure 16C:
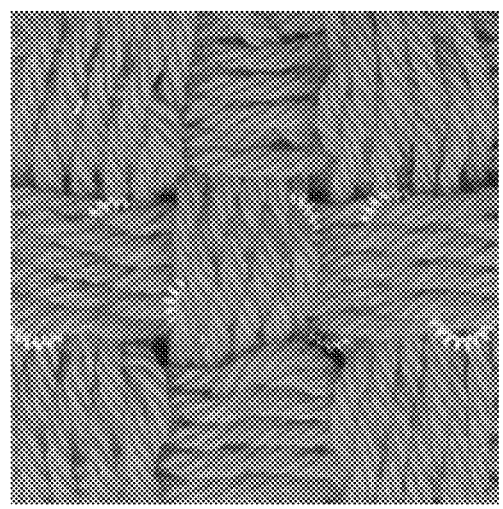

These ribbons are woven to incorporate homochiral mandrel-coiled actuators in the weft direction across the width of the ribbon. These individual ribbons act as elements that can change their width by actuating in response to a change in temperature or moisture uptake, without substantially changing in ribbon length. By weaving two such ribbons into a textile (as shown in FIG. 16A and FIG. 16C, the resulting textile can increase its porosity in response to an increase in temperature, as shown in FIG. 16B and FIG. 16D. This is enabled by each constituent ribbon decreasing in width to open pores within the textile, while the ribbon length stays unchanged, thereby preventing a change in either the overall width or length of the textile during actuation. When the temperature is decreased, the textile returns to its original low-porosity state.

Figure 16F:
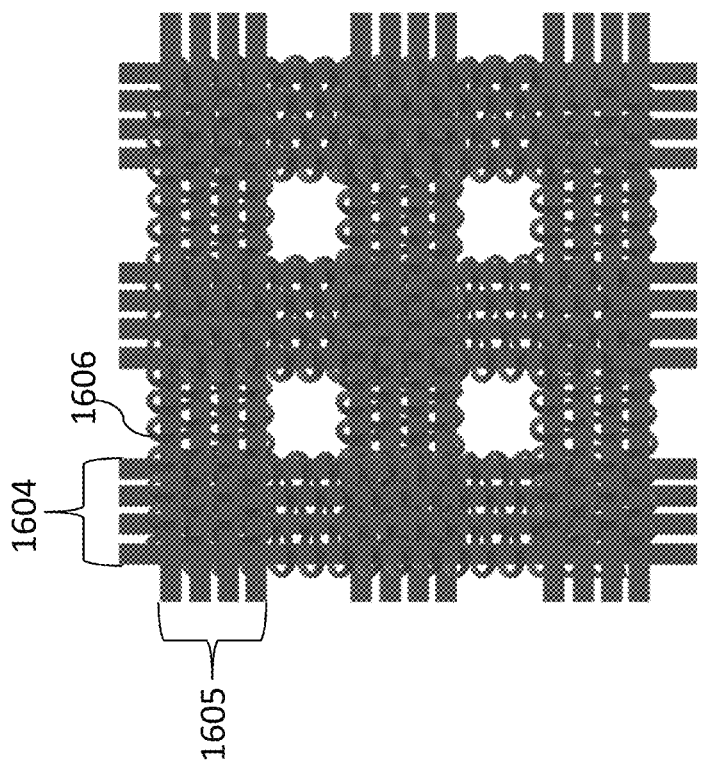
Figure 16E:
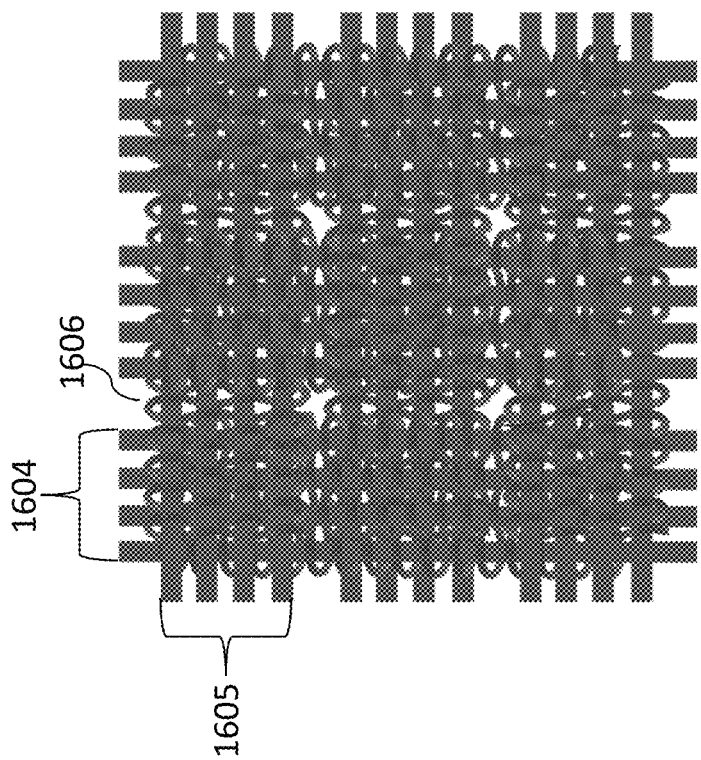

A woven textile made entirely from such actuating ribbons is shown in FIGS. 16E-16F (having actuating ribbons 1604 in the warp direction and actuating ribbons 1605 in the weft direction, as well as polymer fiber actuators 1606). Such woven textile shown in FIGS. 16E-16F would similarly actuate to change porosity without changing either overall textile width or textile length. Ribbons can also be fabricated using heterochiral coiled fiber actuators which expand in response to temperature increase or moisture uptake, for instance to provide smart packaging that increases insulation to shield from extreme temperatures.

For the purposes of this invention, it should be understood that actuating fibers can be elements of textile structures that are themselves woven, braided, knitted, or otherwise configured as elements of a larger actuating textile. For example, ribbon-shaped textiles can usefully be woven in a plain-weave structure to provide porosity-changing textiles.

Figure 11A:
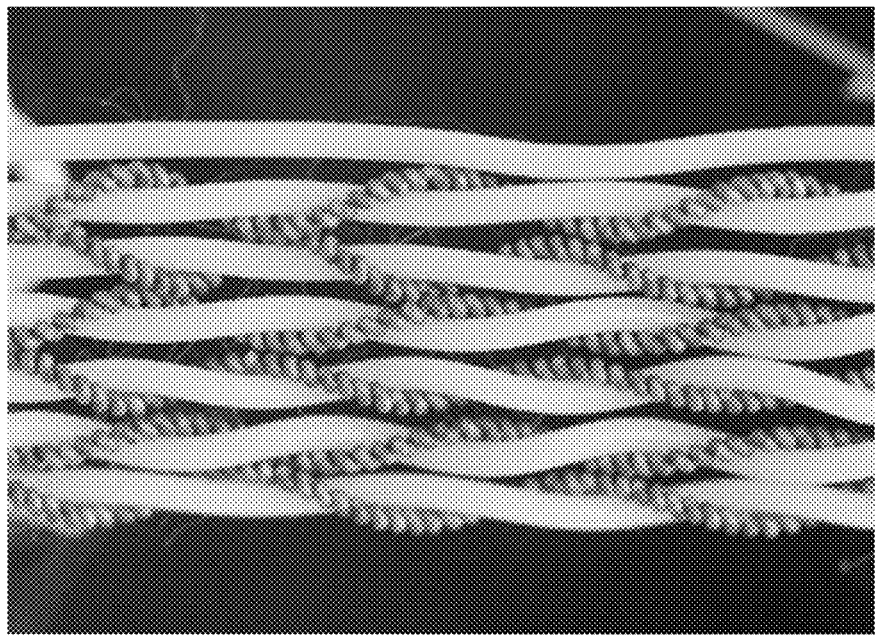
FIGS. 11A-11B show a fabric structure that can change its porosity in response to temperature change or moisture uptake by change of crimp due to rotation of polymer fiber actuators helically wrapped around warp and/or weft yarns.
Figure 11B:
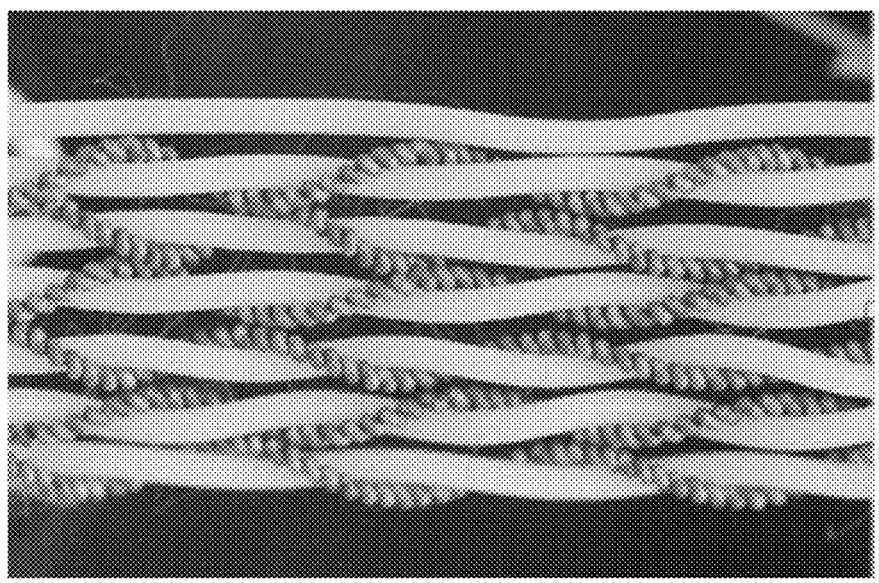
Figure 11C:
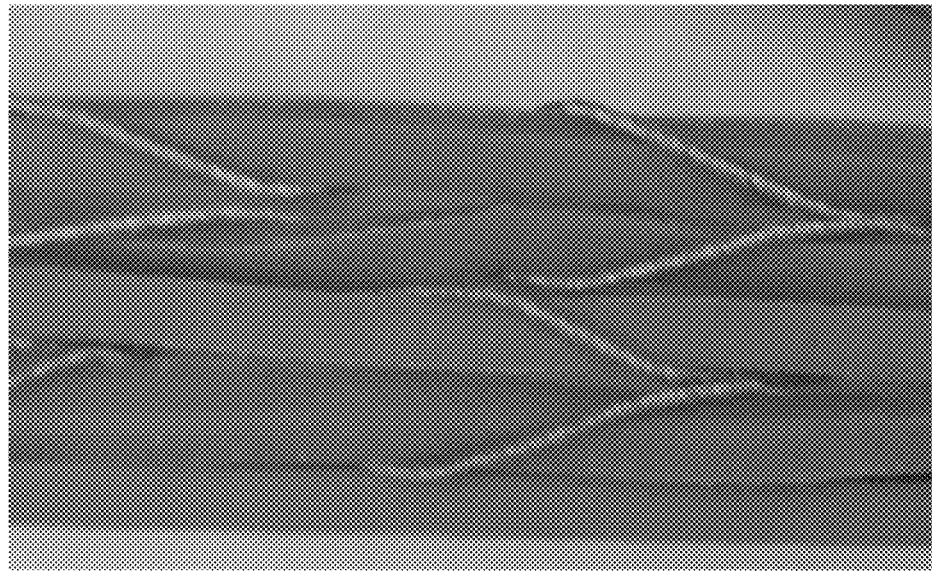
FIGS. 11C-11D show another fabric structure that can change its porosity by change of crimp due to rotation and contraction of polymer fiber actuators helically wrapped around warp and/or weft fibers in response to temperature changes or moisture uptake.
Figure 11D:
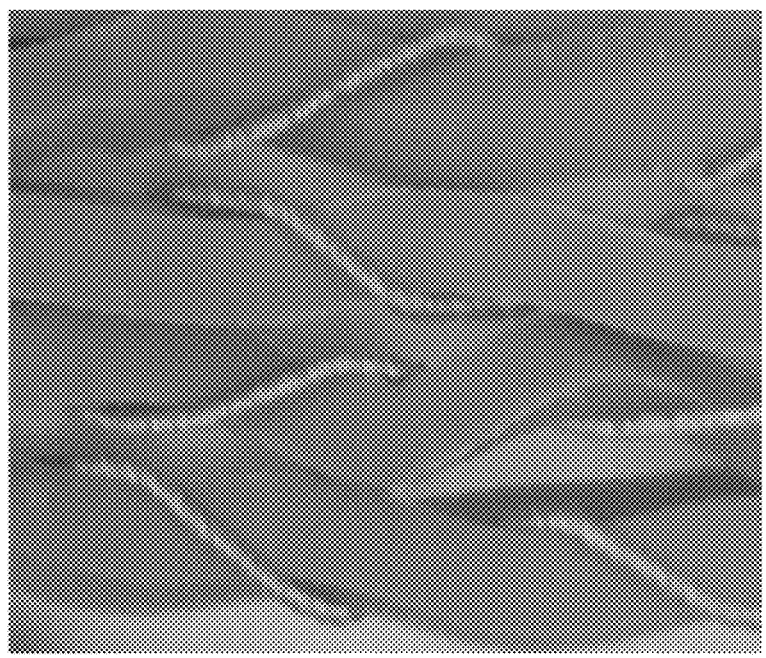

FIGS. 11A and 11C show exemplary embodiments of fabrics designed by using the composite yarns described in the discussion of FIGS. 3A-3F. In FIG. 11A, the actuator rotates around its axis (untwists) and contracts during temperature increase, while in FIG. 11C the actuator predominately untwists during temperature increase, causing a reduction in the helix diameter that forces the core fiber to buckle. This leads to a higher porosity in the actuated fabric, as shown by FIGS. 11B and 11D. When the temperature decreases, the actuation reverses, causing the core fiber to relax back into its initial, straight position. With temperature increase, the porosity increase of FIG. 11A to FIG. 11B is around 6%. With temperature increase, the porosity increase of FIG. 11C to FIG. 11D was around 35%.

Figure 12A:
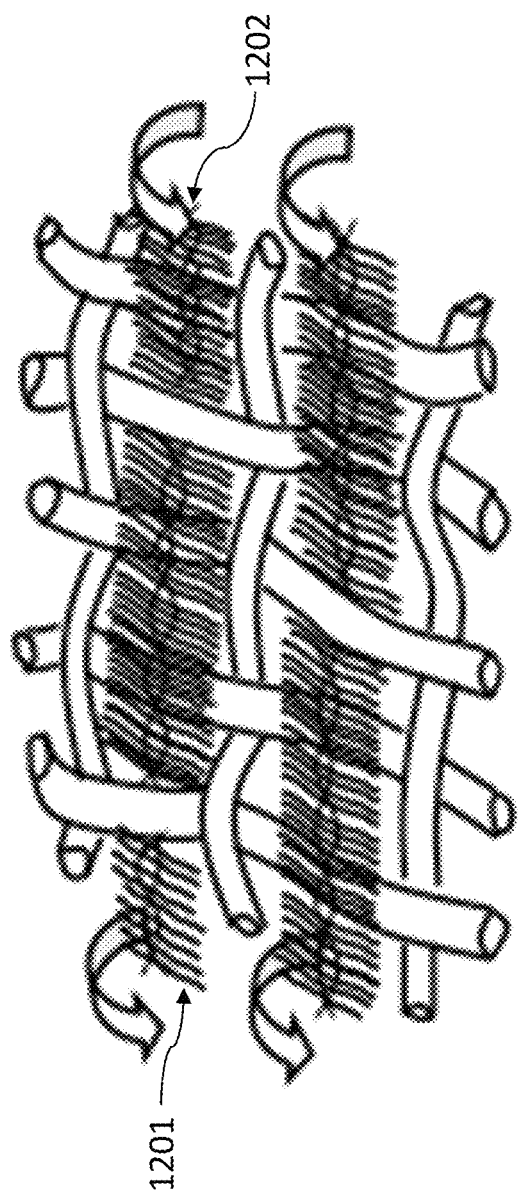
FIGS. 12A-12B are illustrations that show fabrics with chenille, wing-type fancy yarns that can change their porosity in response to temperature changes or moisture uptake by rotation driven by torsional polymer fiber actuators.

FIG. 12A shows an exemplary embodiment of a fabric made using chenille, wing-type yarns 1201, that can be used for porosity control in fabrics without changing either the overall width or length of the fabric. These wing-type yarns 1201, which comprise a core yarn 1202 containing both a torsional actuator 403 and monofilament yarn 404 twisted together (see FIG. 4B), can actuate to rotate the wings to change porosity in response to a change in temperature or water absorption, FIG. 12B. These yarns can return back to their initial position as temperature decreases. The actuating fiber used for this example is preferably segmented so that alternating segments reverse chirality as described in the discussion of FIGS. 4A-4B, to allow wings to rotate in unison. Alternatively, a torsionally-actuating fiber connected to the ends of the pictured chenille yarns could be used to cause the rotation of FIG. 12B.

The herein defined 'angular porosity change' depends on the rotation angle (α) of the fiber wings and is defined by the following equation:

$$\text{Angular Porosity Change (\%)} = (1 - (\cos(\alpha))) \times 100 \qquad [2]$$

with α being the rotation angle of the fiber wings in the fabric plane in response to a change in temperature or absorbed moisture. For the case where the only elements in the textile are non-overlapping wing-type actuating elements, and the dimension of the fiber wings does not change during fiber actuation, angular porosity is equivalent to the previously defined porosity change.

Figure 12B:
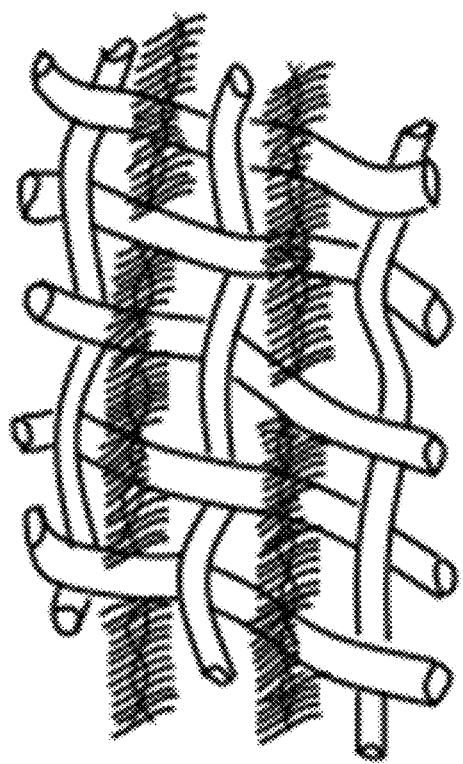

The rotation angle of the yarn in the fabric plane for the yarn illustrated in FIGS. 12A-12B is approximately 30°, yielding an angular porosity change of around 13%. These composite yarns can be used for porosity control in fabrics without changing either the overall width or length of the fabric.

Figure 13A:
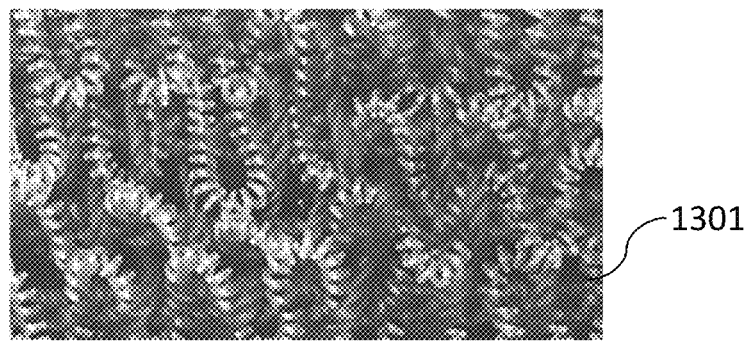
FIGS. 13A-13B show a fabric produced by wing-type fancy yarns, as in FIG. 4C, with mandrel-coiled actuator as wings or piles that can contract when heated to change textile porosity.
Figure 13B:
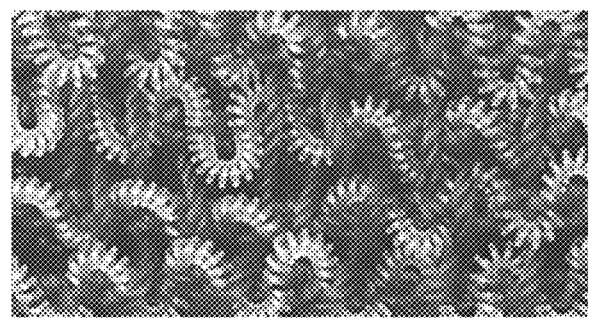

FIGS. 13A-13B show an exemplary embodiment of a fabric made using actuating wing-type yarn as in FIG. 4C, wherein actuation causes a change in wing shape (i.e. fancy yarns 1301 having homochiral mandrel actuator as pile). With temperature increase, the piles of these wing-type yarns contract, leading to an increase in porosity of around 33%.

Figure 13C:
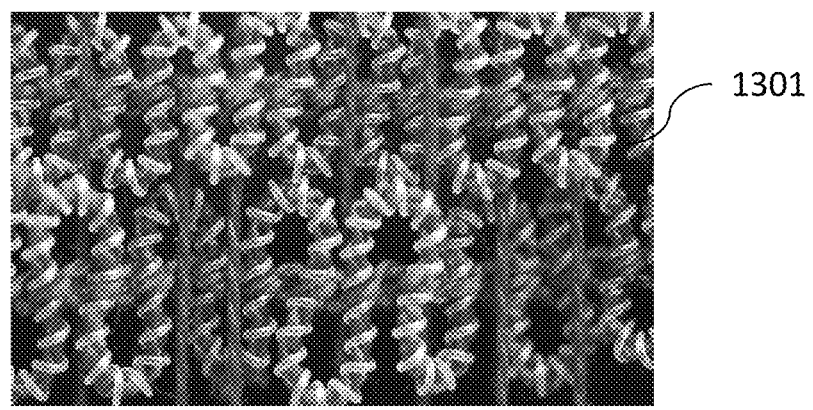
FIGS. 13C-13D show a fabric produced by similar wing-type fancy yarns to those shown in FIG. 4D, which have wing structures which consist of homochiral mandrel-coiled polymer actuator with core yarn inside.
Figure 13D:

FIGS. 13C-13D show an exemplary embodiment of a fabric made using yarn of similar type to the wing-type yarns shown in FIG. 4D, wherein homochiral mandrel-coiled actuators are external to a non-actuating core fiber (i.e., wing type yarns 1302 having a homochiral mandrel-coiled actuator that encloses a non-actuating yarn). This textile structure provides an increase in fabric porosity of around 45% with temperature increase. These types of actuating fabrics can be used for temperature-responsive or humidity-responsive porosity control in fabrics without changing either the overall length or overall width of the fabric.

Figure 17B:
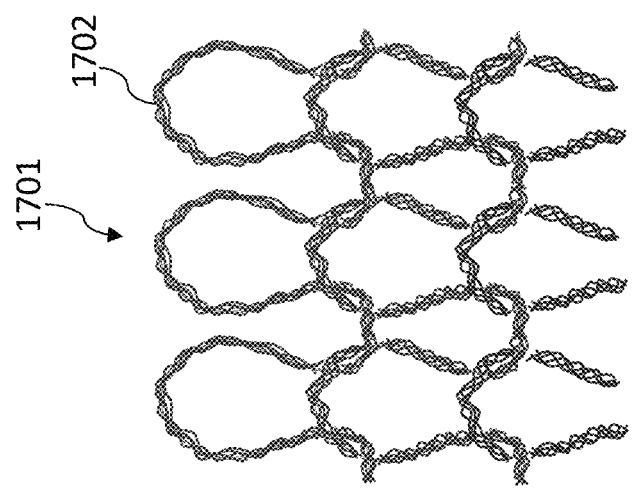
FIGS. 17A-17B show an illustration of a knitted textile made using diameter-changing fibers like those shown in FIGS. 6A-7D, wherein a change in fiber diameter causes a change in the overall porosity of the textile.
Figure 17A:
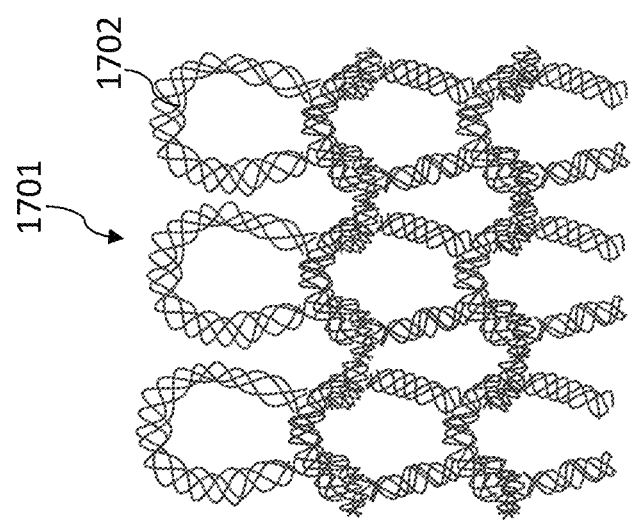

The use of fibers which change diameter in response to temperature change or moisture uptake allow textile structures to change porosity without a substantial change in either overall textile length or width. FIGS. 17A-17B show a schematic of a knitted textile 1701, wherein a change in diameter of fibers 1702 in knitted textile 1701 causes a change in the overall porosity of the textile. FIG. 17B reflects a decrease in the diameter of fibers 1702 (as compared to the diameter of fibers 1702) shown in FIG. 17A.

Figure 17C:
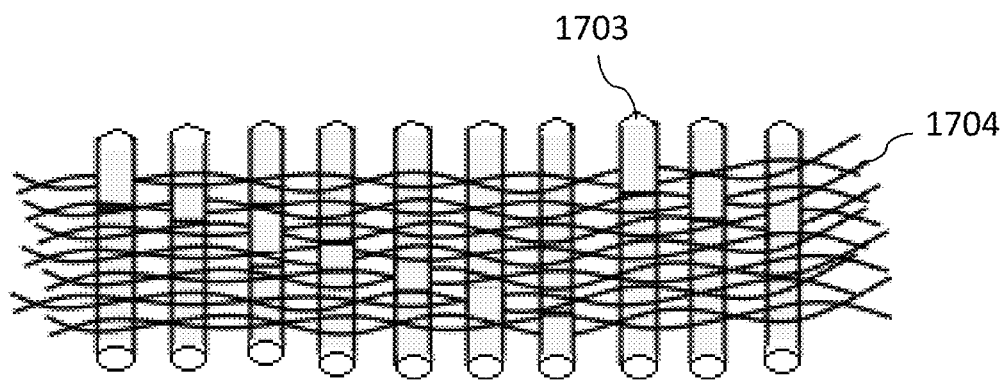
FIGS. 17C-17D show an illustration of a woven fabric structure with actuating weft yarns similar to those shown in FIGS. 7A-7D, where Z and S twisted actuators plied together such that the textile change its porosity by reduction in weft yarn diameter with temperature increase or moisture uptake.
Figure 17D:
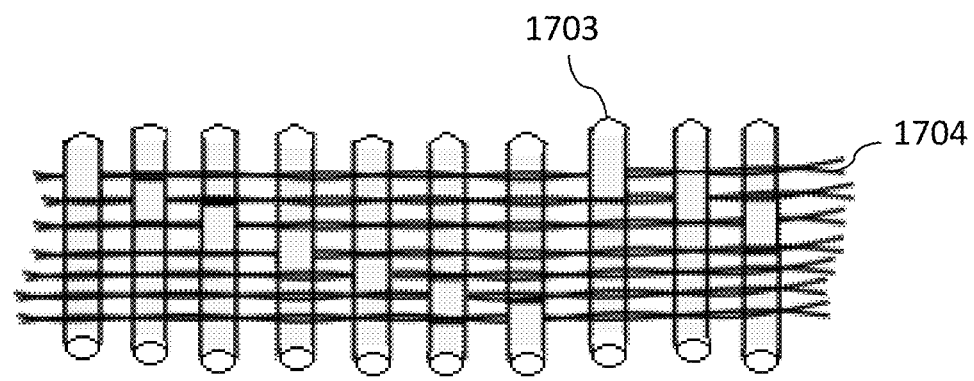

FIGS. 17C-17D show an example of the use of the fiber structures described in FIGS. 6A-7D for porosity changing textiles. These textiles (having non-actuator fiber 1703 and polymer fiber actuators 1704) change their porosity by reduction in yarn diameter with temperature increase or moisture absorption. FIGS. 17C and 17D show the textile structures before and after a temperature increase, respectively. The actuating yarns can be utilized in knitted structures or as warp or weft yarns or as both weft and warp yarns in woven textiles.

Figure 18B:
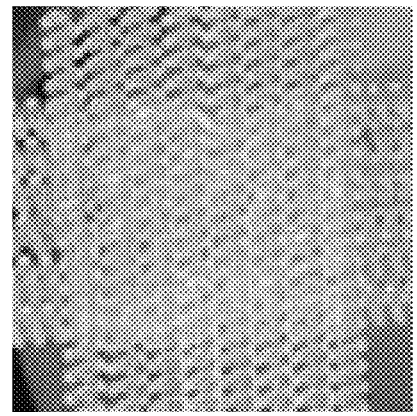
FIGS. 18A-18B show an actuating Malimo fabric structure including mandrel-coiled polymer fiber actuations in the initial and actuated state, respectively.
Figure 18A:
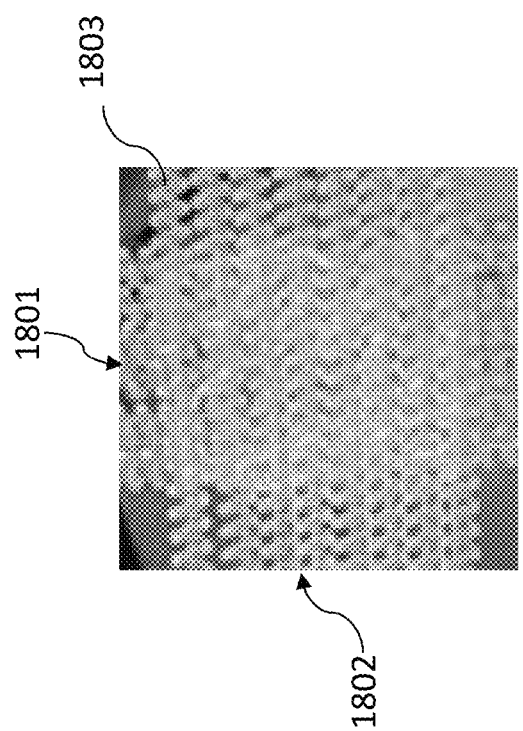
Figure 18C:
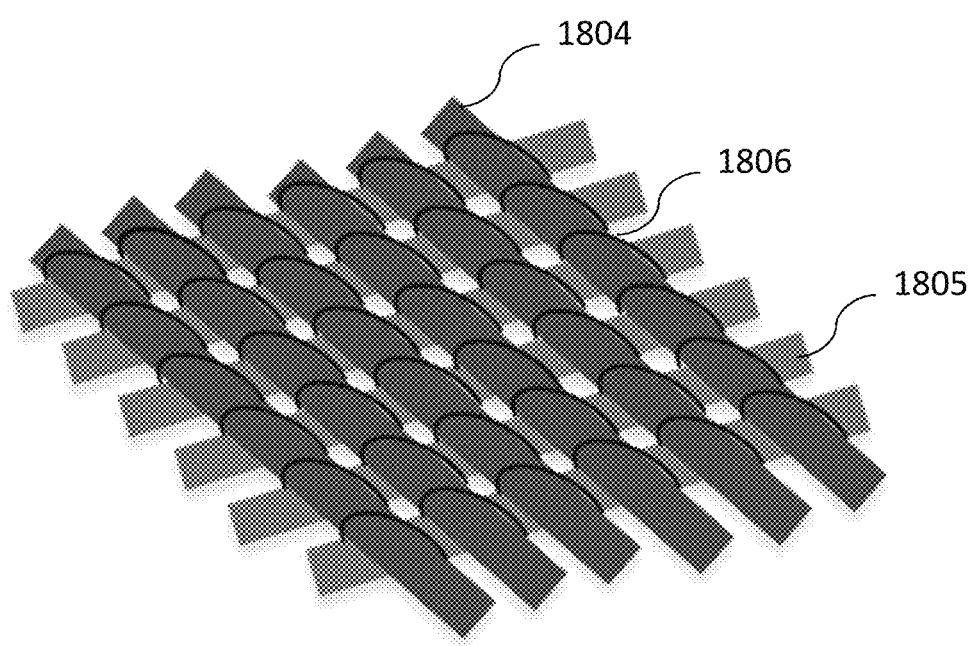
FIG. 18C is illustration of the Malimo fabric of FIGS. 18A-18B.

FIGS. 18A-18C show the application of Malimo-type structures to provide porosity changing textiles. In the Malimo-type textile structures, yarns are not interwoven. Instead, parallel fibers in one layer of the textile are bonded with parallel fibers in a second textile layer to provide the mechanical stability of the textile. Rather than using a bonding agent to connect these fibers in these different layers, a third fiber can provide this mechanical connection. While the orientation direction of one fiber layer with respect to a second fiber layer need not be orthogonal, the present illustration shows a case where this orthogonality exists. This fabric consists of two perpendicular layers (1801 and 1802) of homochiral mandrel-coiled actuators 1803. These two layers are then bonded together to mechanically stabilize the structure. FIGS. 18A and 18B show textile structure before and after a temperature increase, respectively. The homochiral mandrel-coiled actuators contract upon increasing temperature, which decreases textile porosity. To obtain increasing textile porosity with increasing temperature, heterochiral fiber actuators can be used instead of homochiral actuators. FIG. 18C is illustration of the Malimo fabric of FIGS. 18A-18B having top layer polymer actuators 1804, bottom layer of polymer actuators 1805, and binding yarn 1806.

Figure 19A:
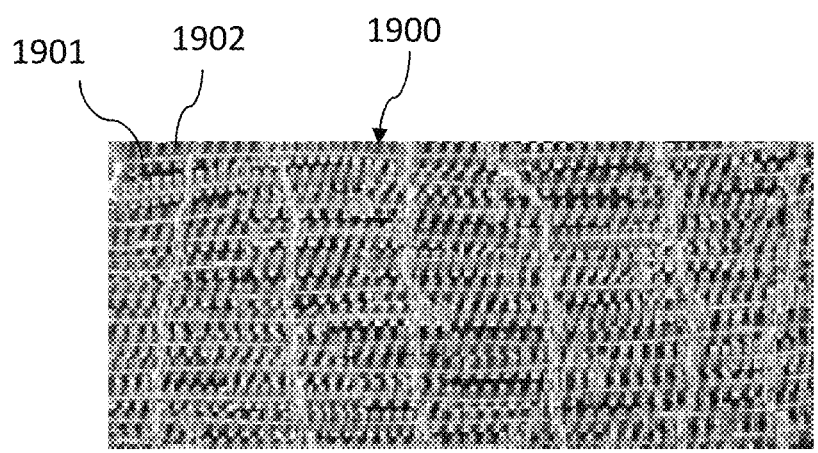
FIGS. 19A-19B show a fabric made using segmented mandrel-coiled polymer-actuators with wire or filament cores, in initial and actuated state, respectively.
Figure 19B:
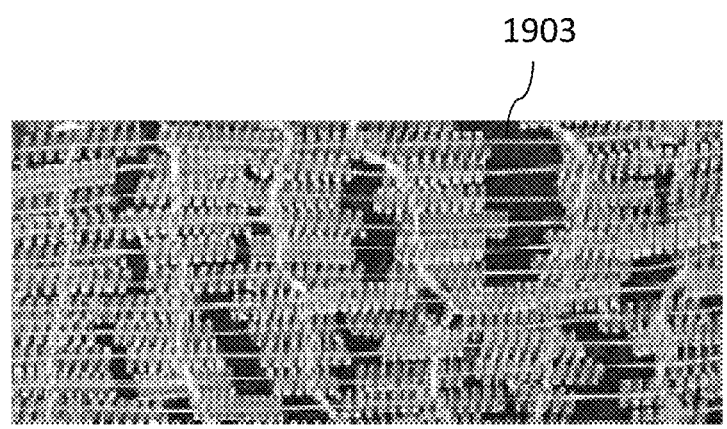
Figure 19C:
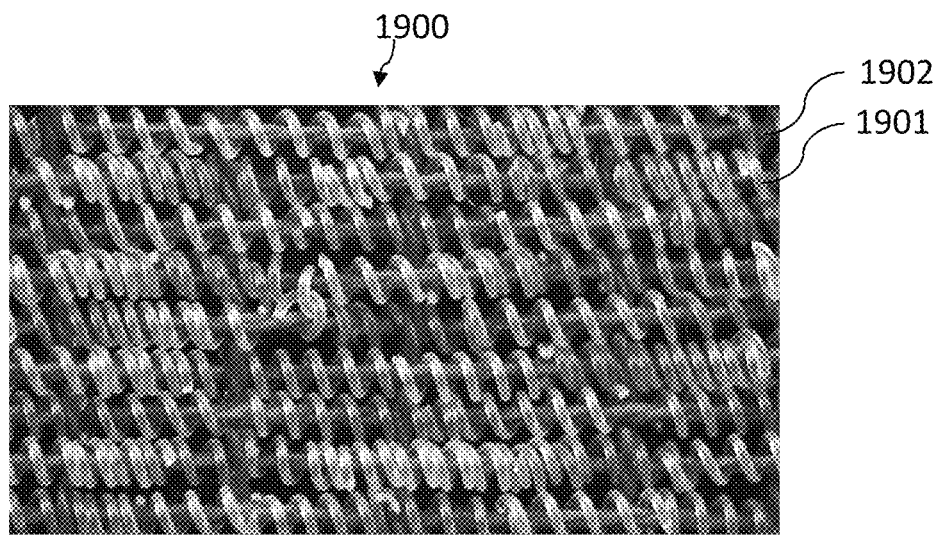
FIGS. 19C-19D show a similar fabric to that of FIGS. 19A-19B made by segmented mandrel-coiled actuators with regular yarn as the core fiber.
Figure 19D:
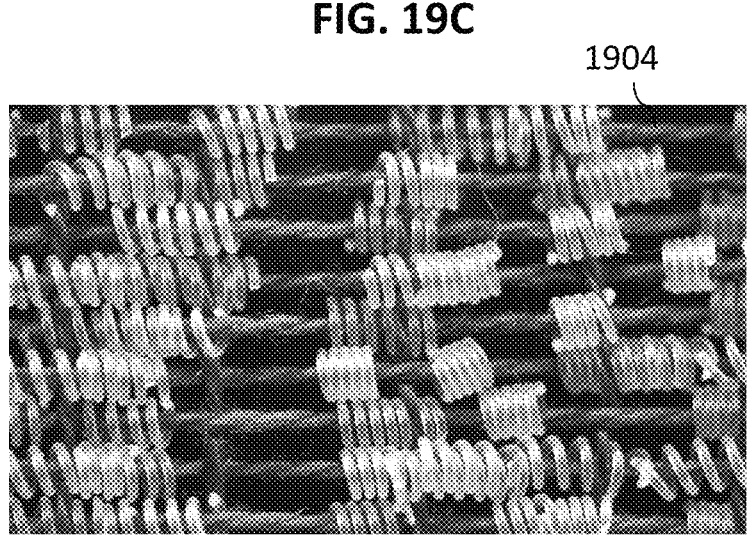

FIGS. 19A-19D show textiles 1900 made by segmented homochiral mandrel-coiled actuators 1901 with filament cores 1902 (with segmentation of the segmented homochiral mandrel-coiled actuators 1901 more readily shown in FIG. 8B and FIG. 8D). In these embodiments, homochiral mandrel-coiled actuators 1901 were cut into short lengths segments and placed around fibers, which in FIGS. 19A and 19B are copper wires 1903 and in FIGS. 19C and 19D are red non-actuating yarns 1904.

FIGS. 19A and 19B show textile structure before and during thermal actuation, respectively, which caused a porosity increase of 75% without changing either the overall textile width or length, when temperature was increased. FIGS. 19C-19D show a similar thermal actuation to change porosity for a textile in which the actuating coils are supported by a non-actuating polymer yarn. In order to make a textile that decreases porosity with increasing temperature, which could be useful as a technical textile that inhibits evaporation, heterochiral mandrel-coiled actuator can be used instead of homochiral actuators.

Figure 20A:
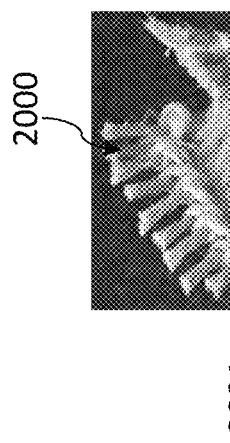
FIG. 20A shows a spacer fabric wherein two fabric layers are connected by homochiral mandrel-coiled actuators.
Figure 20C:
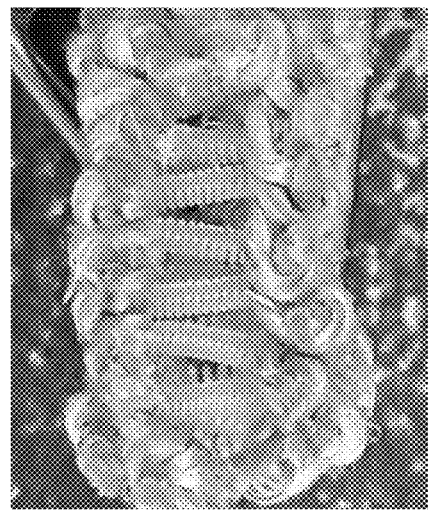
FIGS. 20B-20C show the cross-sectional view of this fabric in initial and actuated state, respectively.
Figure 20B:
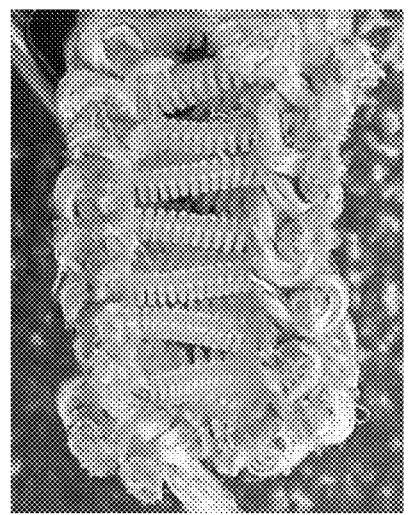

FIG. 20A shows a spacer fabric 2000 having a connecting layer made of homochiral mandrel-coiled actuators 2001. Both layers of the spacer fabric can comprise any natural or man-made fibers, though jute fiber was used in the present illustration. In this embodiment, the actuating fiber connects the layers of the spacer textile, but is not otherwise incorporated into these textile layers. More specifically, in order to minimize changes in both textile width and length during temperature change or moisture absorption, it is preferable that no more than 10% of the length of the actuating fiber is incorporated within either of the textile layers of the spacer fabric. It is also preferable (in order to minimize changes in both textile width and length during actuation) that the actuating fiber undergoes no more than 1 bend in a textile layer before migrating to the second textile layer. FIGS. 20B and 20C shows the cross-sectional view of this fabric 2000 before and after thermal actuation, respectively. With temperature increase, the homochiral mandrel actuators in connecting part substantially contracts, thereby decreasing, by up to 50%, the separation between the back and front faces of the fabric, as shown in FIG. 20C.

Figure 21A:
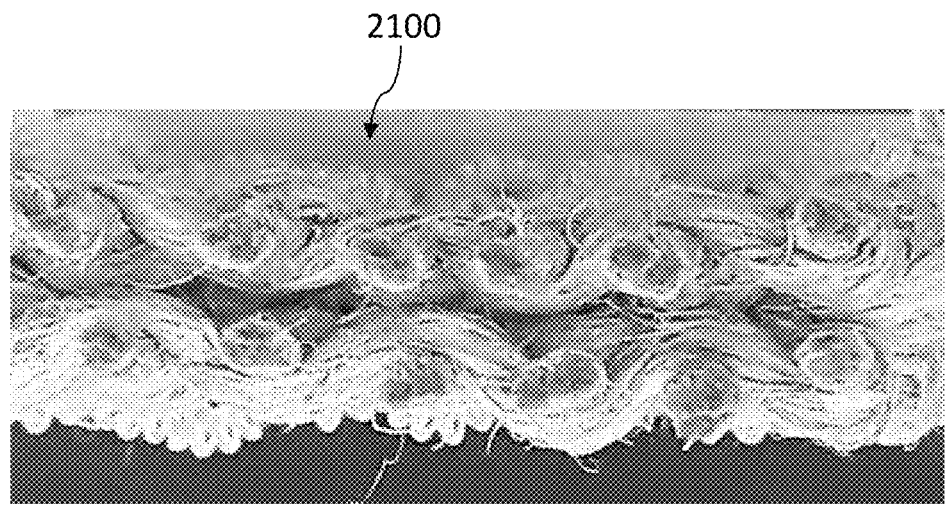
FIGS. 21A-21B show a spacer fabric wherein two fabric layers are connected by heterochiral mandrel-coiled actuators, depicted in the initial and actuated states, respectively.
Figure 21B:
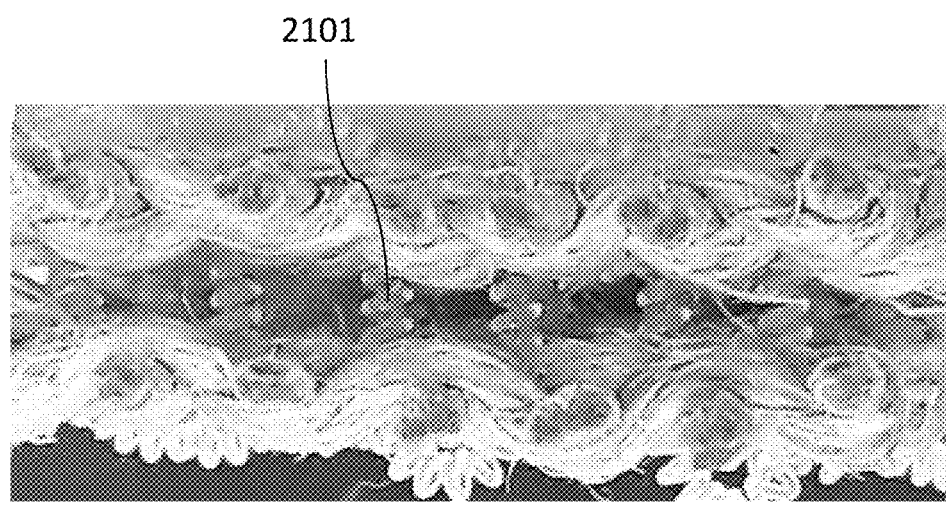

FIGS. 21A-21B show an embodiment of another type of spacer fabric wherein the layers are connected by heterochiral mandrel-coiled actuators 2101. FIG. 21A shows the cross-section of the fabric 2100 in the initial state. With temperature increase, the heterochiral mandrel-coiled actuators 2101 expand, increasing the separation (loft) between the back and front faces of the fabric by up to 70%, as shown in FIG. 21B.

Three-dimensional (3D) woven and knitted structures can also be produced by using weft and warp yarns made of tensile polymer actuators on textile layers, as well as for fibers that connect textile layers. This enables 3D woven or knitted textile based structures and composites that can exhibit volumetric expansion or contraction in response to temperature change or moisture absorption.

The next invention embodiment provides a single-layer textile that undergoes bending in alternating directions as a consequence of temperature change or moisture uptake. FIGS. 22A-22E show an example of this embodiment, where FIG. 22A is a morphing woven fabric made by the weave pattern shown in FIG. 22E. In FIG. 22E, the rows indicate, as a function of weft position, whether homochiral or heterochiral actuators are on the top or bottom of the textile. FIGS. 22B-22D show the progression of the bending actuation as temperature is increased for one part of the textile weave. The direction of bending is preferably reversed in transitioning to adjacent (morphing woven fabric 2200) as front surface and side-view, respectively. FIG. 22E shows the pattern report of this woven fabric. FIGS. 22B-22D show the bending position of the morphing fabric when temperature is increased. Note that the blue non-actuating yarns 2201 merely provide a frame used for weaving which need not be incorporated in the final textile.

Figure 23A:
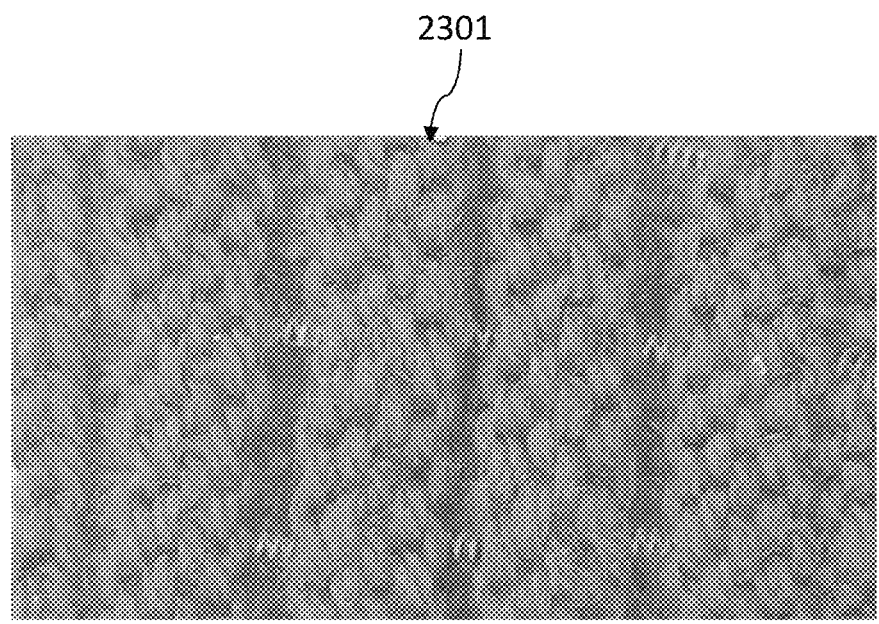
FIGS. 23A-23B show a morphing knitted fabric in initial and actuated state, respectively.
Figure 23B:
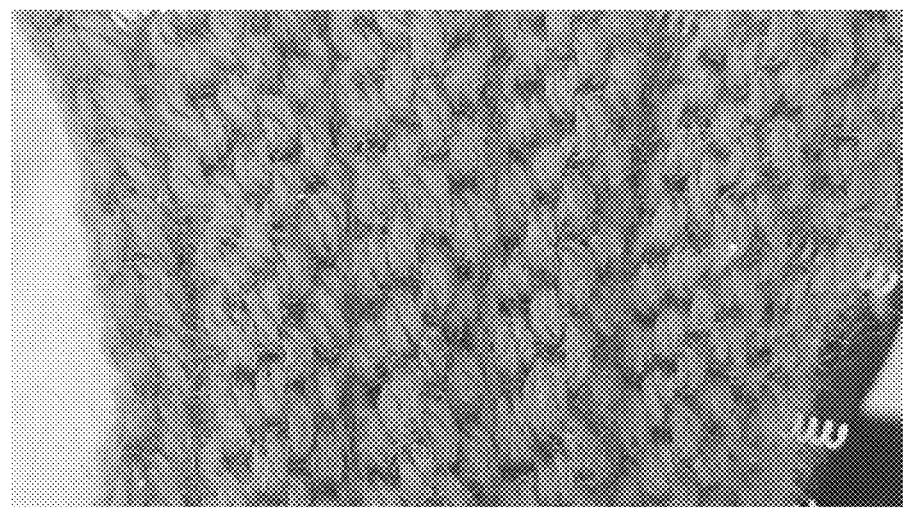
Figure 23C:
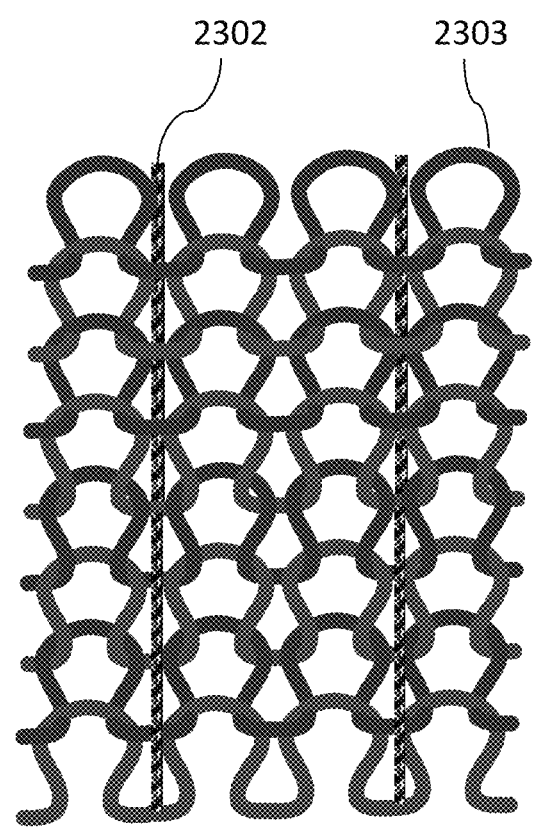
FIG. 23C is an illustration showing the structure of the fabric shown in FIGS. 23A-23B.

FIGS. 23A-23B show a morphing knitted fabric 2301 in the initial and actuated states, respectively. This structure was made by warp inserting actuators (polymer finer actuators 2302) into a 3×3 purl structure (having non-actuating fibers 2303) as illustrated in FIG. 23C. The inserted warp yarn is made of homochiral mandrel-coiled actuators that contract when heated, which leads to a significant change in fabric shape and morphology.

Figure 24A:
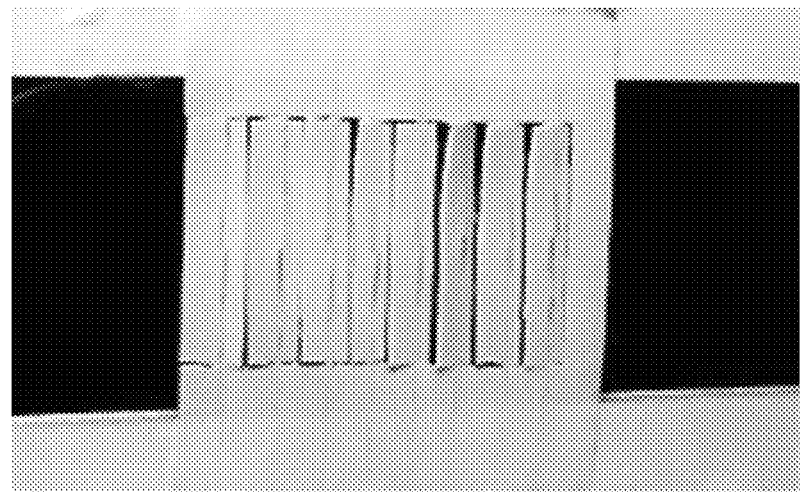
FIGS. 24A-24B show a composite patch made by torsional polymer muscles embedded inside a silicone rubber patch in the initial and activated state, respectively.
Figure 24B:
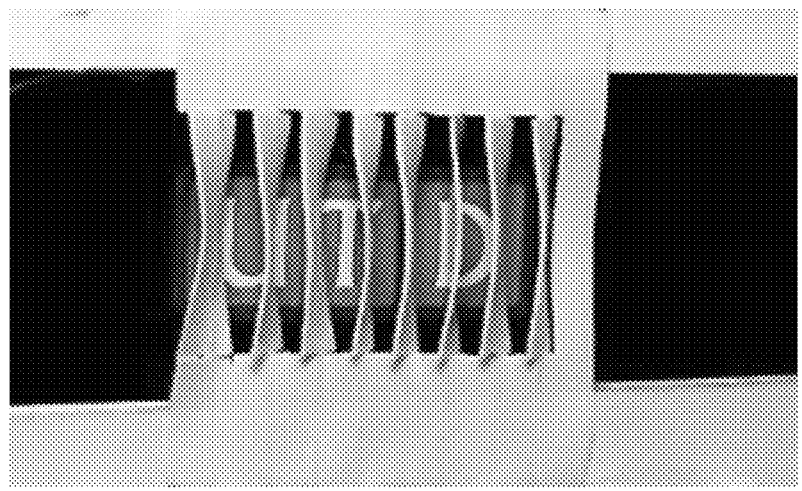
Figure 24C:
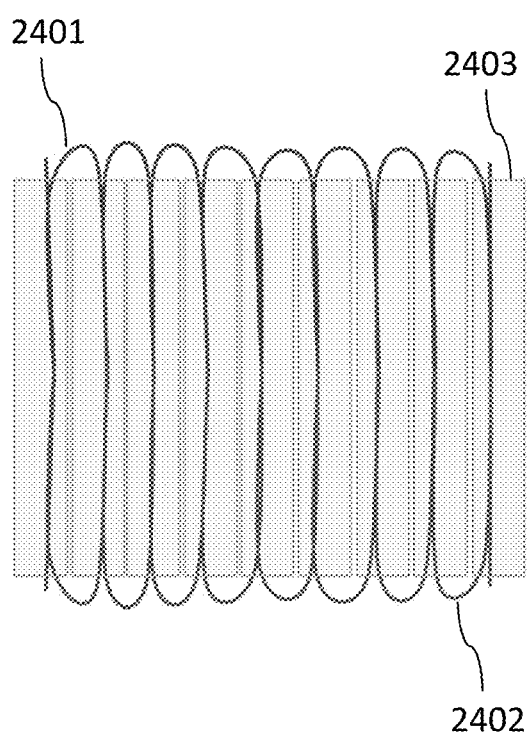
FIG. 24C is an illustration showing the structure of the composite patch shown in FIGS. 24A-24B.

Composite structures made from actuating fibers embedded into an elastomeric polymer matrix can actuate to cause in-plane and out-of-plane deformation of the composite. This is useful for producing patches and actuating elements which open pores and flaps without the overall composite changing either length or width. FIGS. 24A-24B show an example of a composite patch made using silicone rubber and torsional actuating yarns, wherein torsional rotation of a silicone rubber vane is driven by cooperatively-acting torsional actuators having opposite twist chiralities which are connected in the middle of each vane, as shown schematically in FIG. 24C. As shown in FIG. 24C, the composite patch includes actuating polymer fiber 2401 having one twist direction, actuating polymer fiber 2402 having the opposite twist direction or a non-actuating fiber, and composite flaps 2403 embedded with polymer fiber actuators. Upon temperature increase, these actuating fiber segments undergo opposite chirality torsional rotation, which operates to twist the rubber vane in the same direction, thereby generating porosity without changing either the overall length or width of the patch. A second layer underneath the patch could also be used to provide color or other aesthetic changes without cause the textile to become see-through during actuation.

Such changes can be driven by temperature changes or by moisture uptake, such as by having actuating fibers partially or fully embedded in the composite. These changes can be caused by torsional rotation of the fiber, tensile changes in length of the fiber, or combinations to cause bending, twisting and other deformation of the composite. In addition to smart textiles, such changes could be used to enable pumps, soft robotics, and other morphing structures that actuate by temperature or moisture.

Figure 25A:
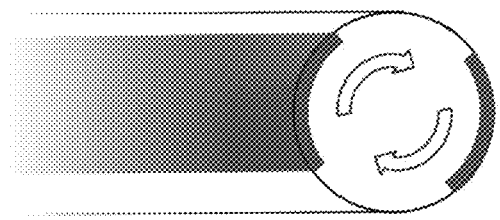
FIGS. 25A-25C show a color changing fiber panel made by torsional polymer muscles colored in segments in the initial state, and when it was differentially heated, respectively.
Figure 25B:
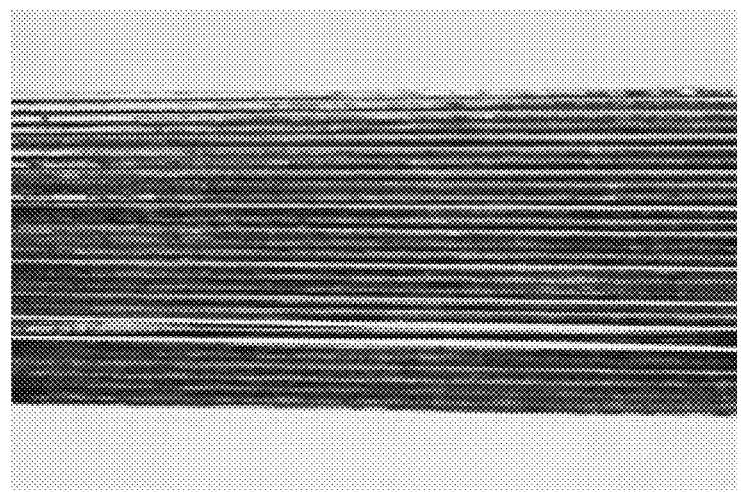
Figure 25C:
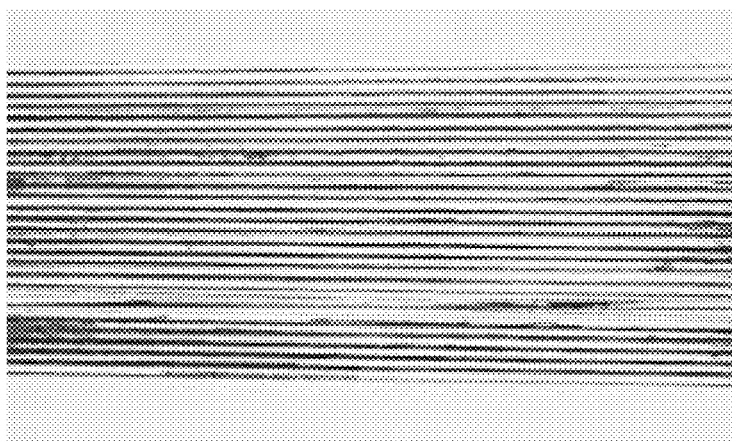

Twisted or coiled fiber actuators can be incorporated into textiles to change their color or appearance by adjusting the position of colored and/or translucent elements. This color or appearance change could alternatively be accomplished by actuating fibers which deform structurally-colored elements which derive their color from patterning on the micro- or nano-scale. FIGS. 25A-25C show an example of color-changing fiber panels using differentially colored polymer torsional muscle, wherein different coloration exists on different sides of the translucent actuating fiber, as shown in FIG. 25A. When the temperature over the whole panel is uniform, the panel appears purple in color, as shown in FIG. 25B. When the temperature increased on one side of the panel, the purple yarns rotated to reveal a transparent panel, as shown in FIG. 25C.

These fiber arrays can optionally be incorporated into a textile, such as by using these fibers as the warp yarns within a woven structure. Friction hindering rotation can be minimized by using long floats (i.e., long muscle lengths wherein the actuating warp fiber is not interwoven with a weft fiber) or by using actuating warp fibers having large diameter compared to the weft fiber. Alternatively, the color-changing fiber can comprise twisted, torsionally-actuating segments and non-actuating segments, wherein the non-actuating segments are woven into a textile and the actuating segments are free to rotate. If the coloration is on one side of the actuating fiber and the actuating fibers are torsionally tethered at opposite ends, this structure responds to temperature gradients along the length of the actuating color-change fiber. This response to temperature differentials may be used for real-time visualization of heat over a person's body or as a display for the conduction of heat in technical textiles. Alternatively, if the actuating fiber comprises alternating segments having opposite chiralities, the coloration of the actuating fiber array will depend upon temperature.

Figure 26A:
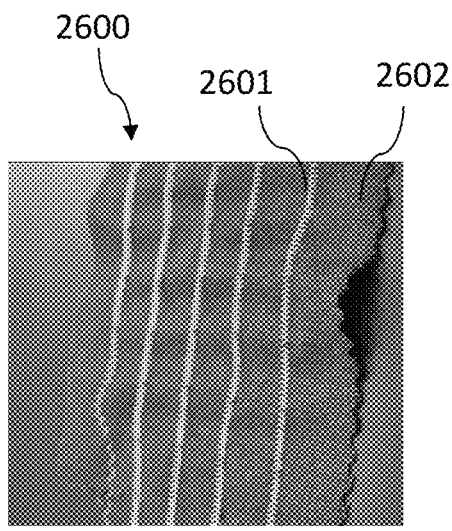
FIGS. 26A-26C show rolling stages of a morphing fabric. This fabric is produced by integrating polymer actuators onto fabric surface by suitable techniques such as sewing, bonding, fusing or embroidery.
Figure 26B:
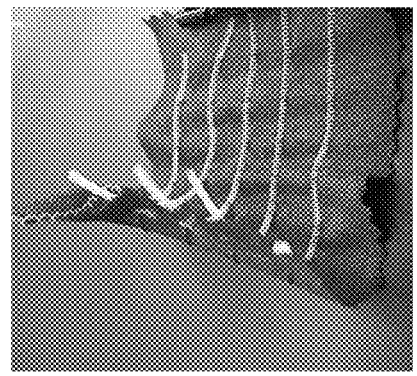
Figure 26C:
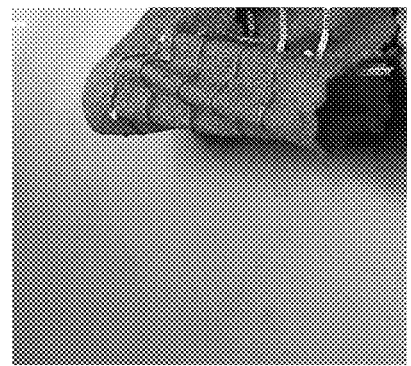

FIGS. 26A-26C show an embodiment of an actuating textile structure (morphing fabric 2600) that can bend and roll up with temperature increase. Fabric 2600 is produced by stitching mandrel-coiled, homochiral polymer fiber actuators 2601 onto a fabric surface 2602. FIG. 26A shows the initial state of structure 2600, and FIGS. 26B-26C show the actuation of structure 260 during heating. This reversible actuation can be used for morphing textiles, or to provide flaps that are integrated into a larger fabric such that the flaps bend upwards to expose porosity in response to a change in moisture or temperature, while the overall larger fabric maintains its original length and width. Such polymer actuators can be incorporated into fabric surfaces by many techniques, including sewing, bonding, fusing or embroidery, and the use of cooperatively-actuating homochiral and heterochiral muscles on opposite sides of the fabric can be used to increase the sensitivity of actuation to a change in temperature of moisture uptake.

FIGS. 27A-27B show an embodiment of a textile structure 2700 that can morph by folding with temperature increase. This fabric is produced by integrating homochiral polymer actuators 2701 into a pleated fabric surface 2702. FIG. 27A show the initial state of this structure while FIG. 27B show the actuated state. The actuation is totally reversible.

Figure 28A:
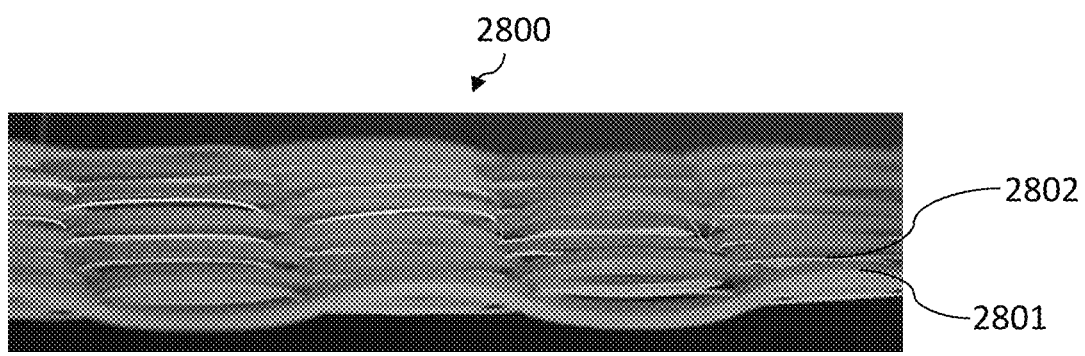
FIGS. 28A-28B show a fabric that can morph to change its porosity, loft, and texture.
Figure 28B:
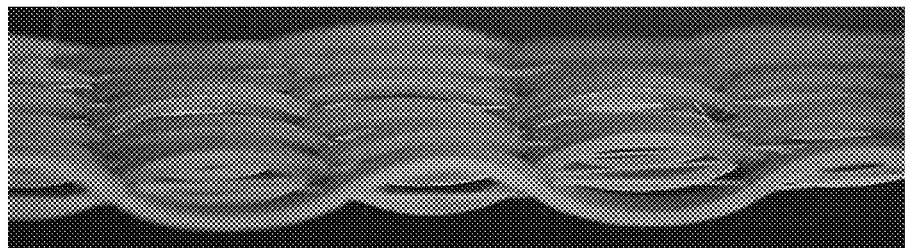
Figure 29:
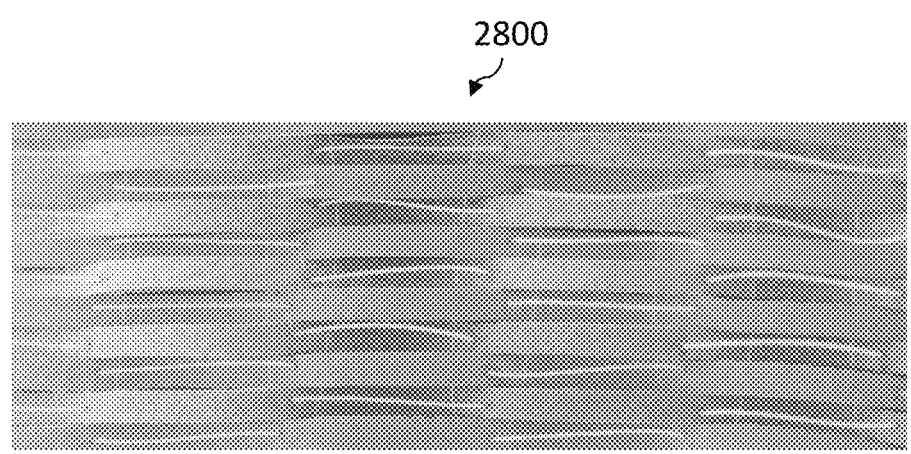
FIG. 29 is an overhead view of the fabric of FIGS. 28A-28B.

FIGS. 28A-28B show a fabric 2800 that can morph to change its porosity, loft, and texture in response to a change in temperature. The combination of elastomeric flat yarns 2801 and homochiral coiled polymer actuators 2802 buckle alternatively in opposite directions to create porosity, texture and loft change. FIG. 28A shows the initial state of this structure 2800 while FIG. 28B shows the actuated state. The obtained loft change obtained with temperature increase is around 90% and this change is fully reversible. FIG. 29 is an overhead view of structure 2800.

Figure 30B:
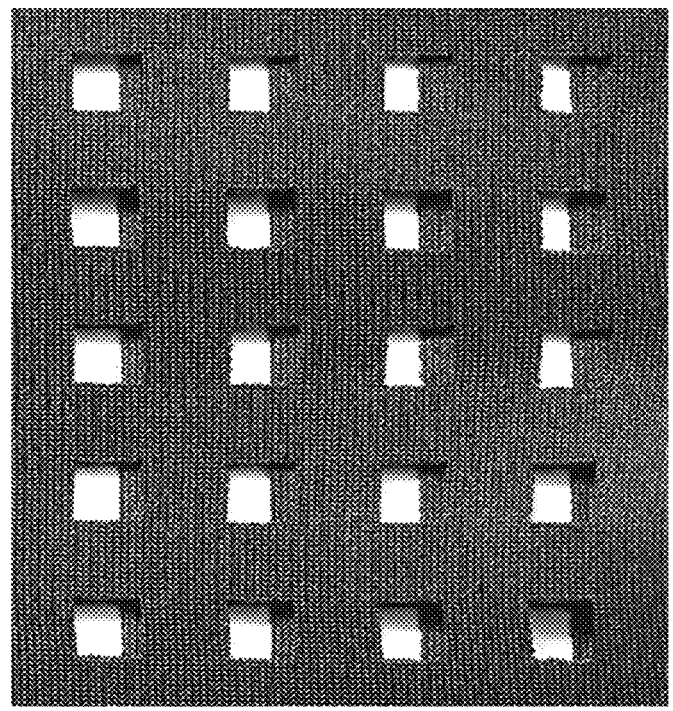
FIGS. 30A-30B show the use of a multi-layer textile to open and close passageways by using actuation to bring holes in each layer in and out of register.
Figure 30A:
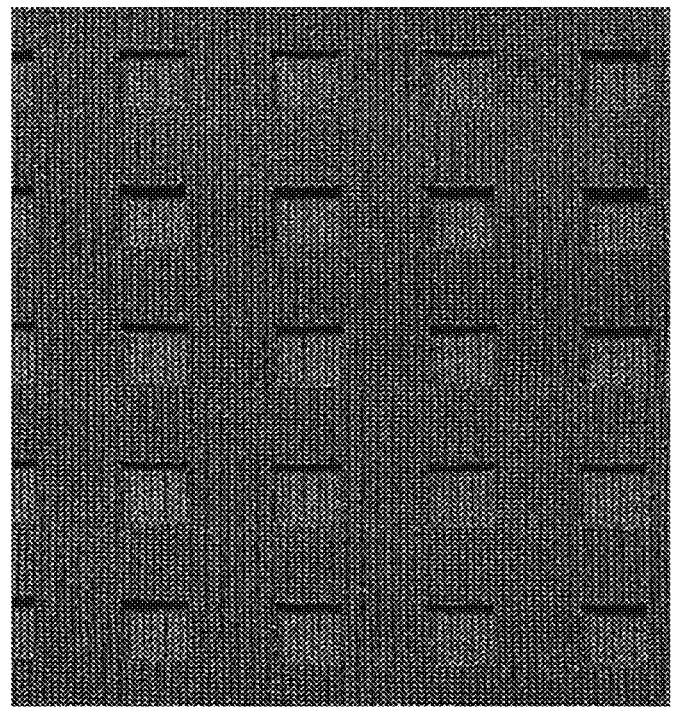

Actuating, multi-layer textiles can also be used for changing the porosity or the appearance of a textile by shifting the relative positions of the layers during actuation. For instance, FIGS. 30A-30B show an example of a textile consisting of two fabric layers that each have a regular array of holes. The base layer of this textile is held in place. The upper layer of this textile is attached by homochiral coiled polymer fiber actuators in one direction, and elastic fibers in the other direction, such that the fabric layers shift out of register at room temperature to block and pores through the textile, FIG. 30A.

When heated, the polymer fiber actuators contract to shift the upper fabric layer in register with the base layer, opening porosity through the textile, as depicted in FIG. 30B. In this case, the elastic fibers return the fabric layers to their original positions when cooled. However, similar functionality could be provided by pairs of homochiral and heterochiral coiled fiber actuators that are attached end-to-end, such that their attachment point changes position with changes in temperature or humidity, but the overall length does not change. In cases where little actuation is needed, such as when the pores in each fabric layer are small, or when large-stroke, mandrel-coiled fiber actuators are used, the fabric layers could be attached to each other by short lengths of actuating fibers to achieve this effect. In cases where larger displacements are needed during actuation to cause the layers to shift, fibers could be attached between the fabric layers over long lengths, such as by taking advantage of the long circumferential paths provided by tube-shaped areas of clothing like on the sleeves or around the waist.

Figure 31A:
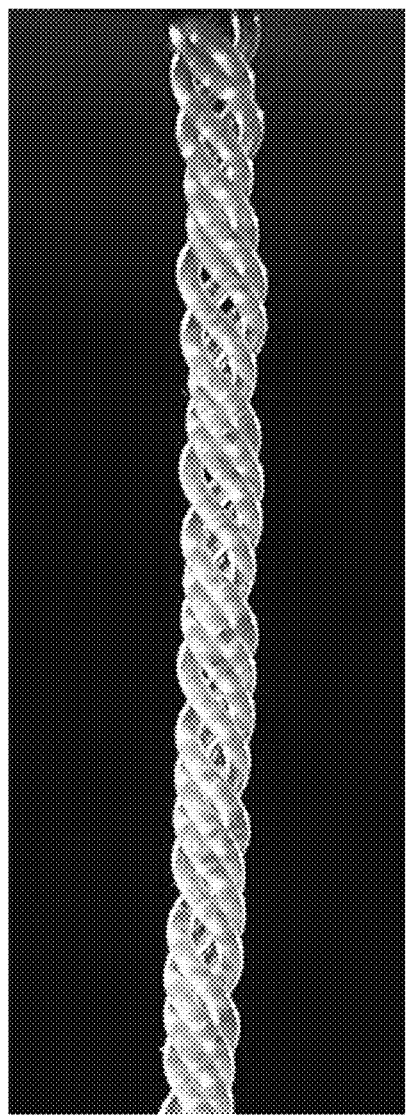
FIGS. 31A-31B show the use of a plied structure composed of several individual coiled actuators to change the diameter and porosity of the structure in response to temperature.
Figure 31B:
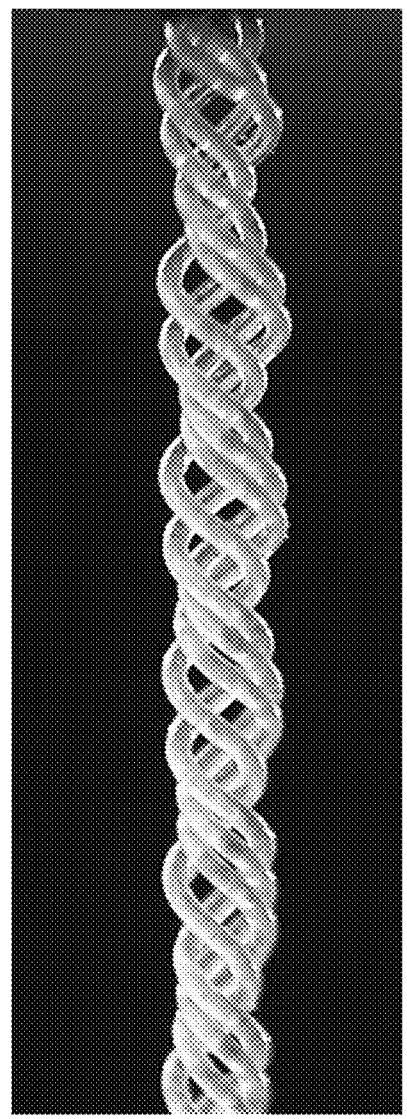

FIGS. 31A-31B show an example of a fiber that changes its diameter and porosity in response to a change in temperature. This fiber consists of several highly-twisted nylon fibers that have been annealed to form small-diameter coils with a large pitch between each coil. Compared to ordinary coiled fiber tensile actuators, which typically have a much shorter coil pitch length, these twisted and coiled elements provide diminished tensile actuation, but instead provide large radial expansion in respond to a change in temperature. The structure in FIG. 31A consists of 5 of such large-pitch, homochiral mandrel-coiled fiber actuators that have been plied together to form a yarn. When heated, this yarn reversibly increases in diameter, FIG. 31B, opening up internal volume and porosity within the yarn. Such changes could be used to control the porosity within a smart textile in response to changes in temperature or moisture uptake. Additionally, the change in enclosed volume of such large-pitch coiled fibers could be used to control the amount of water that can be retained in the yarn, or to make pumps and other devices that contract or expand in diameter, such as by using active electrothermal heating.

Non-Uniformly Coiled Artificial Muscles

Figure 32:
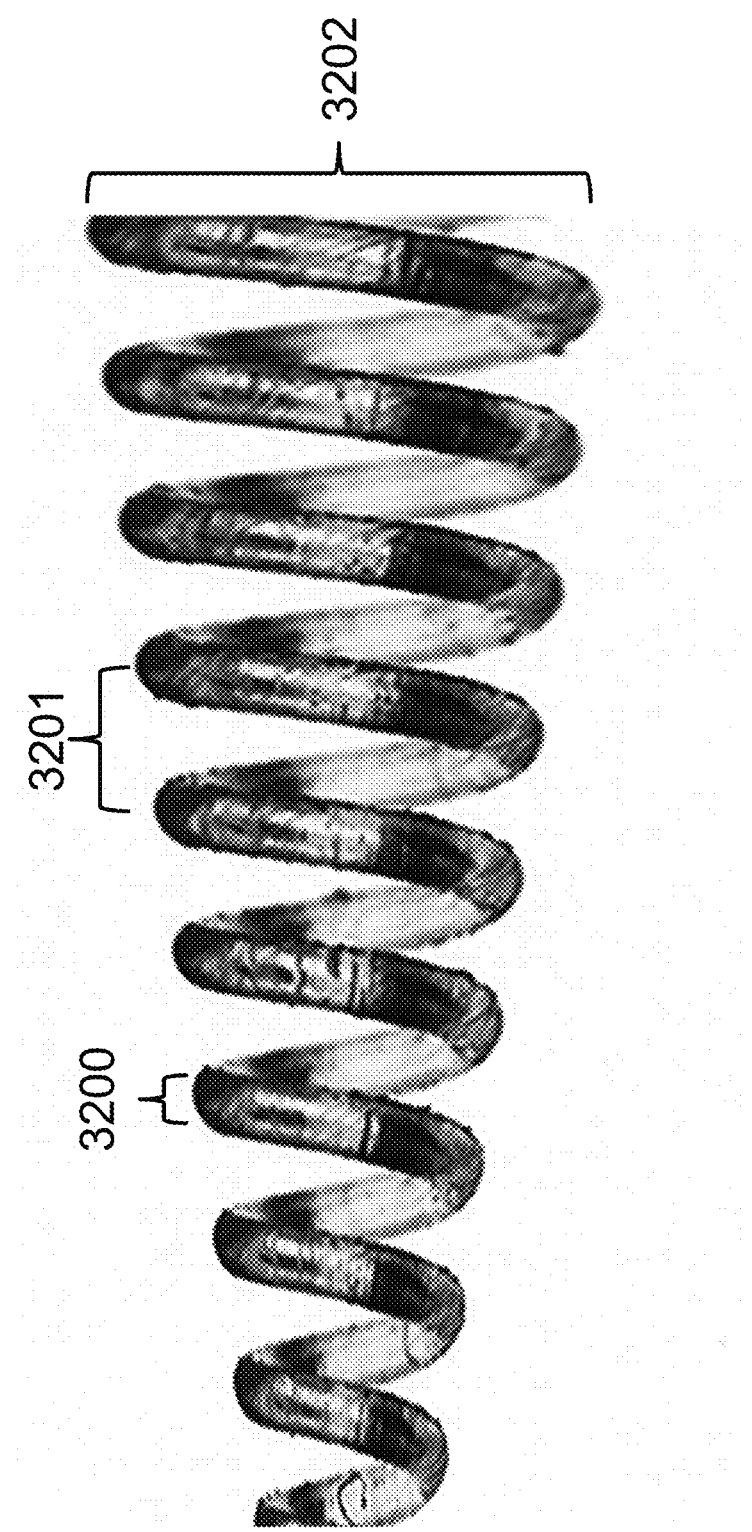
FIG. 32 diagrams several of the important parameters used to characterize a coiled actuator, such as the fiber diameter (3200), coil pitch (3201) and coil diameter (3202)

FIG. 32 diagrams several key properties of coiled actuators, including the fiber diameter (3200), coil pitch (3201), and coil diameter (3202). Additional properties include the magnitude and direction of fiber twist and fiber coiling. Ordinary methods for making coiled actuators can produce different coil geometries, but these geometries are traditionally uniform over the length of the actuator.

Figure 33A:
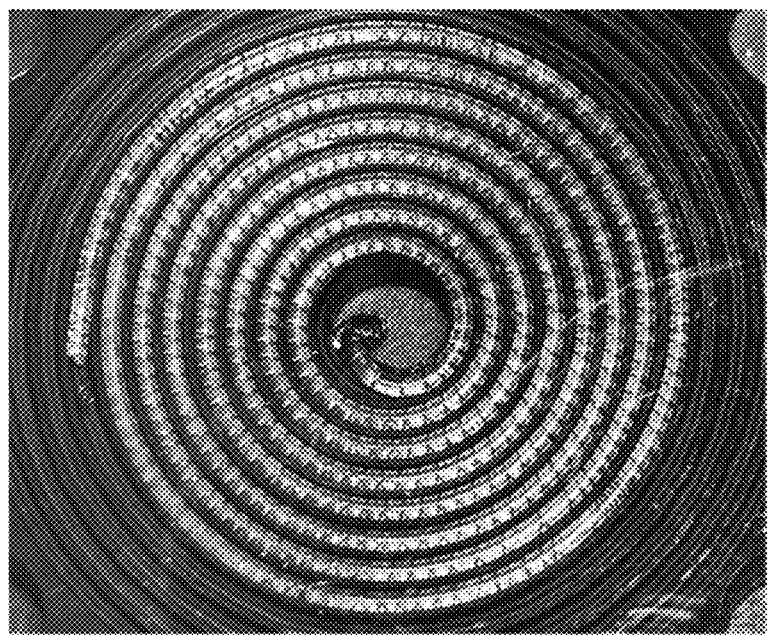
FIGS. 33A-33B show the forming of a coil with variable coil diameter along its length.
Figure 33B:
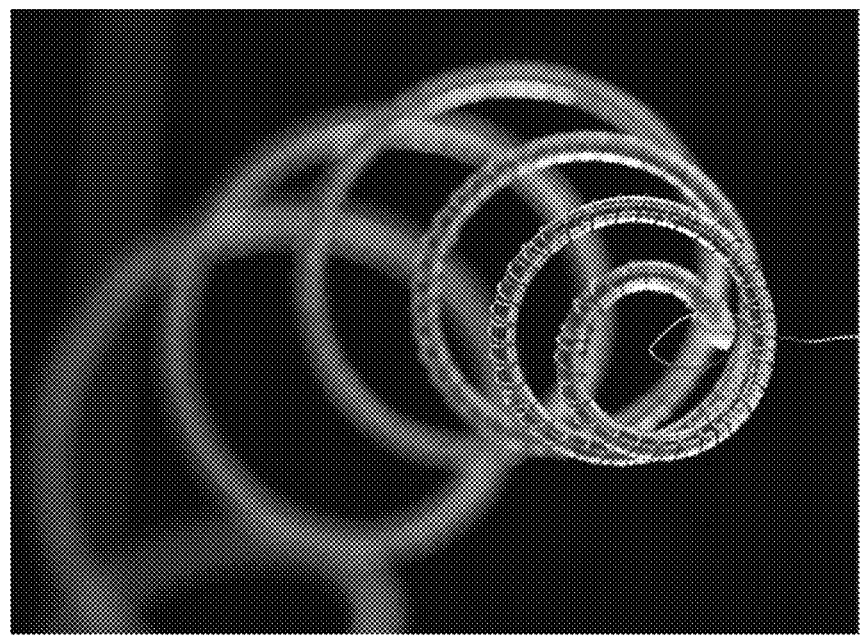

FIG. 33B depicts a non-uniform coil produced by high-temperature annealing a highly-twisted, wire-wrapped nylon 6 monofilament in the spiral mold of FIG. 33A at 180° C. for 2 hours in a vacuum environment. The wire-wrapping allowed to convenient electrothermal heating of the fiber to cause actuation. Although the coil was initially annealed into a flat shape at high temperature, the actuation of the coil during cooling causes the flat structure to elongate to its final room-temperature length. The conical structure of this resulting coil varied in both diameter and pitch length over the length of the coiled fiber actuator, resulting in substantially different thermal actuation than coils with constant coil diameter over their length.

FIGS. 34A-34E show the actuation of the variable-coil-diameter actuator of FIG. 33B. During initial heating from 30° C. to 70° C. (FIGS. 34A-34C), the coil contracts, as expected for traditional homochiral coiled actuators. However, unlike for traditional homochiral coiled actuators of a fixed diameter, the coils within this structure are able to pass through each other, allowing the structure to contract into a flat spiral without being blocked by contact between adjacent coils. At higher temperatures beyond 70° C. (FIGS. 34D-34E), the coil inverts, switching from a homochiral to a heterochiral coil, and begins expanding in the opposite direction. During cooling the process reverses, with the coil initially shortening, and then returning to its original length after inverting through its center.

Figure 35:
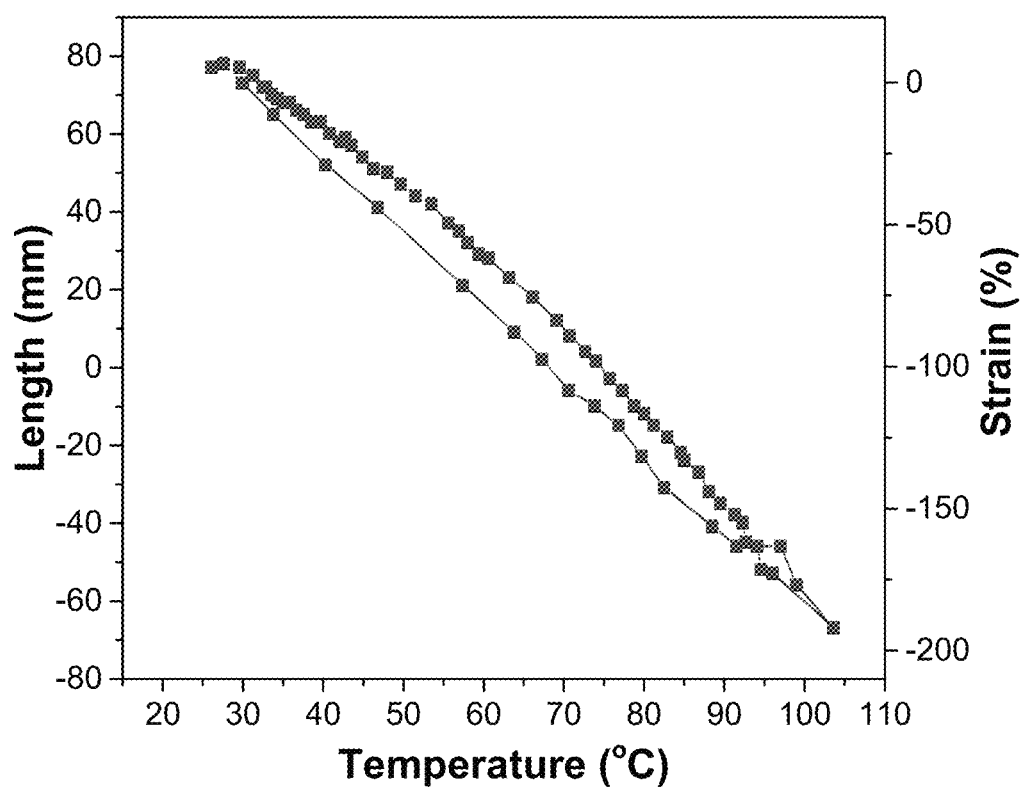
FIG. 35 plots the thermal actuation of the coil of FIG. 33.

FIG. 35 plots the actuation of the variable coil diameter actuator of FIG. 33B as a function of temperature. As seen in FIGS. 34A-34E, during heating, the coil initially shortens to nearly zero length, and upon further heating the coil begins lengthening in the opposite direction. The actuation strain, as calculated by normalizing relative to the initial coil length at 30° C., is also plotted. By this normalization, the maximum actuation strain is nearly −200% between 30° C. and 105° C. By instead normalizing strain to the minimum possible coil length, which is the diameter of its constituent fiber, ~860 μm, tensile strains exceeding +8000% and −8000% were delivered by this coil.

These non-uniform coils, which provide large reversible length changes in response to small temperature changes, could be used as filling between two fabric layers to change the thickness and insulating qualities of the textile as a function of temperature. Similarly, coils could be attached perpendicular to fabric layers to provide maximal thickness change without causing area change of the textile in response to temperature changes or moisture absorption. Although the coil of FIG. 33B initially started in an elongated homochiral state, these coils could also be made to start from a flat position at room temperature, either by mechanical constraints which block the coil at this resting length, or by annealing the coil with different constraints to train its room temperature structure to any desired configuration. Such non-uniform coils having variable diameter or pitch over their length also have the property that their stiffness can vary significantly over its strain range. This allows pairs of non-linearly-elastic actuating fibers to be used to both control position and stiffness as a function of the temperature of both fibers, or to enable mechanical-energy-absorbing structures and textiles that can vary their stiffness during an impact to profile the deceleration.

In addition to changing properties like coil diameter, coil pitch, and fiber twist along the length of a coiled fiber actuator, secondary coiled structures can be made, wherein coiled fibers are themselves formed into coils. Such secondary coiling can be useful for modifying the stroke of these secondary coils, since the primary coiled fibers can provide greater length changes than twisted fibers, which can complement or oppose torsional actuation in producing tensile actuation of the secondary coil.

While homochiral coiled fiber actuators can be easily made by inserting twist into a fiber under tension, this process is not suitable for producing heterochiral coiled fibers. The process for making heterochiral coils has therefore been to: (1) highly twist a fiber in one chirality, (2) wrap the twisted around a mandrel in the opposite chirality, and (3) anneal the coil on the mandrel to retain its shape. This longer process is cumbersome and does not lend itself readily to high-volume production. As an alternative method to produce heterochiral coiled fibers with opposite twist and coil chiralities, we have developed a method to convert a homochiral coiled fiber into a heterochiral coiled fiber by untwisting the homochiral fiber until the coils spontaneously flip into a heterochiral arrangement.

Figure 36C:
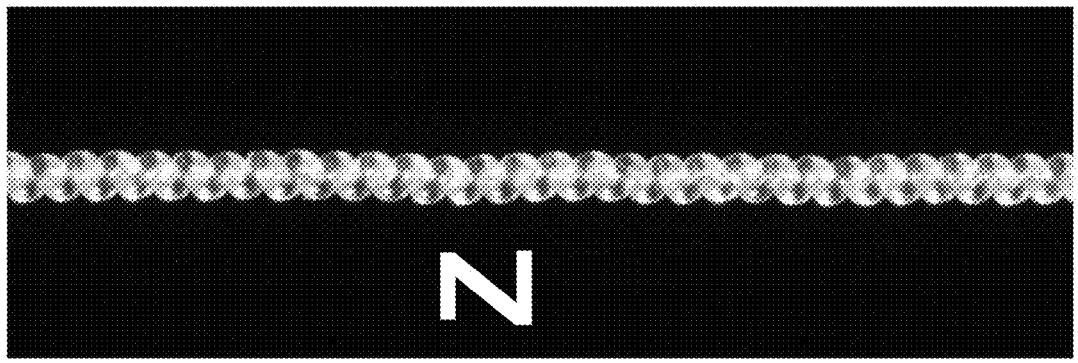
FIGS. 36A-36C show the progression of coil geometry during twist-induced conversion from a homochiral to a heterochiral twisted coil.
Figure 36B:
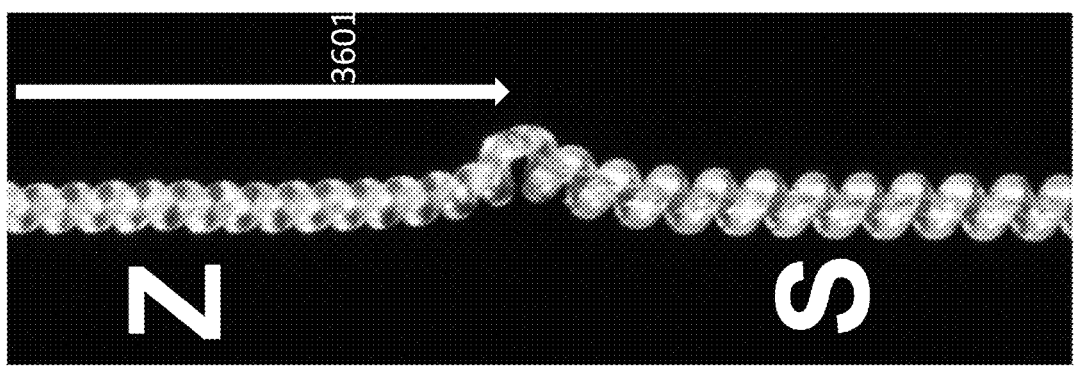
Figure 36A:
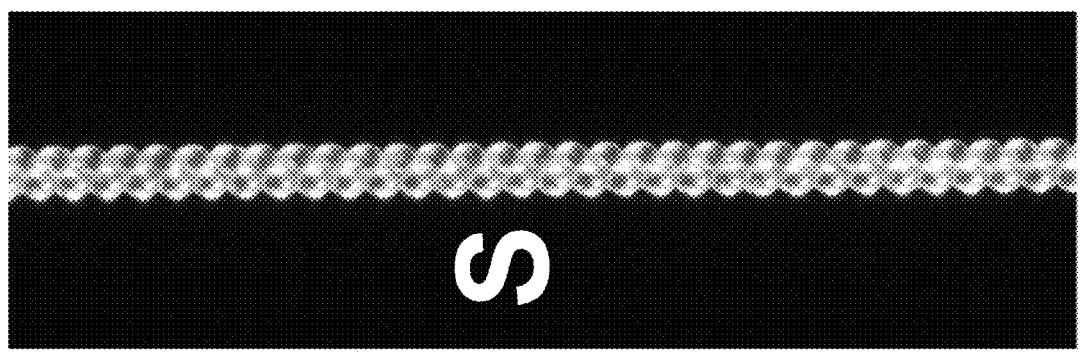

FIGS. 36A-36C show the progression of a tightly-coiled homochiral actuator during untwist to produce a heterochiral coiled actuator. In FIG. 36A, a tightly coiled nylon fiber has been annealed to retain its structure. FIG. 36B shows the coil in the middle of the transformation, after the coil of FIG. 36A has been untwisted so as cause the coils to flip (as shown by flip propagation arrow 3601). In FIG. 36C, the flipping process has fully converted the initial S chirality coil into a Z chirality coil. Since the coil loses twist during the chirality reversal process, the heterochiral actuator of FIG. 36C is typically annealed and then partially retwisted to restore some of the initial twist and improve actuation.

Further information regarding the present invention is set forth in the excerpts from the unpublished presentation on the inventors and the unpublished paper of the inventors (entitled "What Limits Muscle Stroke?"), attached hereto at Appendices 1-3, respectively. Further information relative to the present invention is also set forth in U.S. Patent Appl. Ser. No. 62/311,274, which is attached hereto at Appendices 3 (including figures and Attachment A thereto). The materials of Appendices 1-3 are hereby incorporated by reference in their entirety of all purposes.

High-Temperature Annealing of Coiled Actuators

The use of high-temperature annealing processes has been found to dramatically affect the properties and performance of coiled polymer actuators. Whereas previous low-temperature-annealed coiled fiber actuators required a torsional tether to prevent the fiber from irreversibly losing twist during actuation, and typically required a non-zero tensile load to separate coils to allow for actuation, the present high-temperature-annealed coils offer highly-reversible actuation without the need for any tethering or loading. This is enabled by the discovery that these higher annealing temperatures not only better set the twisted structure within the fiber, but that they predominately set the twist and length state of the coiled fiber at the shape it is confined to a high temperature. The consequence of this is that, during cooling, the muscle will actuate in reverse from its set high-temperature length into a different room-temperature length. This phenomenon is especially useful for setting coiled muscles into new shapes that were previously difficult to achieve. For instance, during cooling after high-temperature annealing, homochiral coiled fibers, which contract during heating, actuate in reverse to lengthen and separate space in between adjacent coils. Previous low-temperature-annealed homochiral coiled actuators would pull together because of the large twist on the fiber, and therefore required a tensile load to separate the coils at room temperature to allow for actuation. This high-temperature annealing process eliminates this restriction, and enables the easy preparation of conical coiled structures, such as the coil in FIG. 33B, which was produced by high-temperature annealing in the planar configuration of FIG. 33A.

Figure 37A:
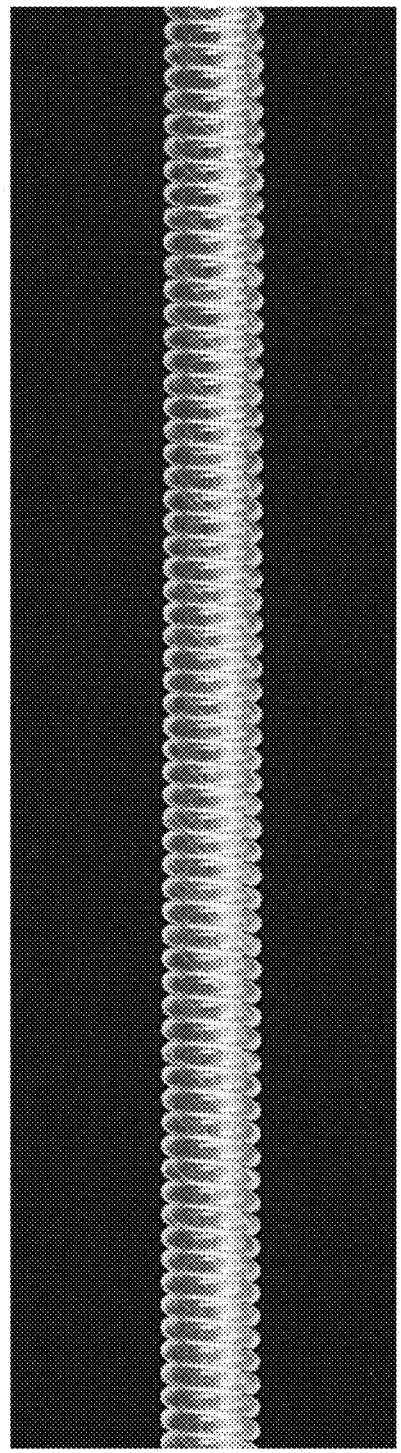
FIGS. 37A-37B show a homochiral coiled polymer fiber before (FIG. 37A) and after (FIG. 37B) high-temperature annealing.
Figure 37B:
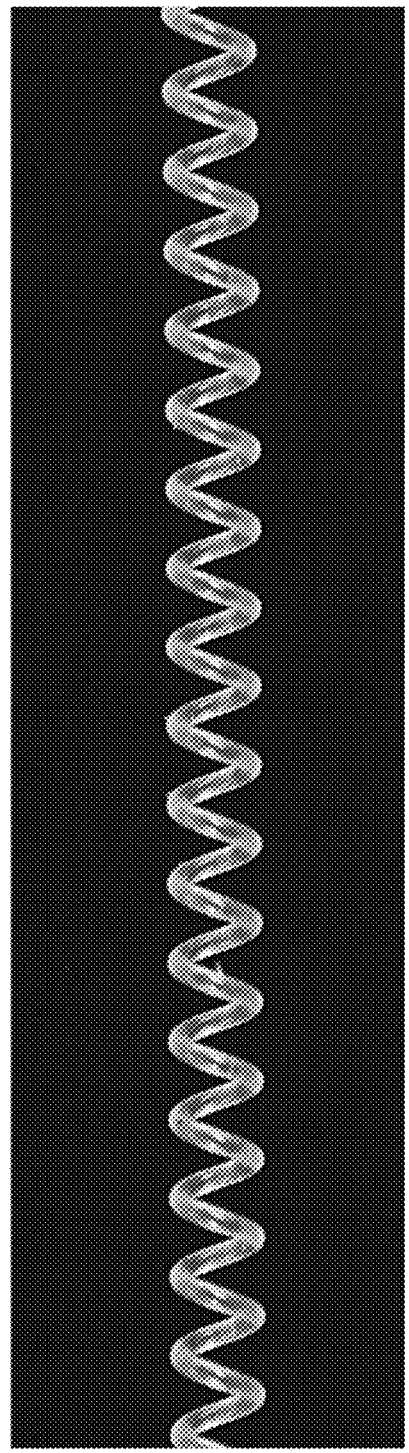

FIGS. 37A-37B show the progression of making a homochiral coiled polymer fiber muscle which has space between adjacent coils at room temperature to allow contractile actuation during heating. In FIG. 37A a highly-twisted, 305-μm-diameter nylon 6,6 fiber is shown wrapped around a metal wire mandrel with no space between adjacent coils. This structure was fixed on both ends to prevent torsional or translational movement, and annealed at 220° C. in vacuum for 2 hours. When cooled to room temperature and removed from the mandrel, the structure in FIG. 37B resulted.

This structure could be reversibly actuated thermally or electrothermally, without the need for a torsional tether or tensile loading. In a similar process, self-coiled fibers can be annealed at high temperature to separate space between adjacent coils. Although such coils are initially tightly held together by internal twist, the high-temperature of annealing tries to bring coils even closer together. Since the coiled structure provides a lower limit on coil length, at high-temperature, the coils are annealed into the length where coils are in full contact. When the coiled fiber is subsequently cooled and removed from the annealing oven, the coils actuate to separate space between adjacent coils. This enables a simple means to prepare self-coiled fiber actuators which reversibly actuate without needing a torsional tether or tensile load, which is a desired property for use in smart clothing textiles that actuate in response to a change in temperature or moisture absorption.

Figure 38A:
FIGS. 38A-38B show a heterochiral coiled polymer fiber before (FIG. 38A) and after (FIG. 38B) high-temperature annealing.
Figure 38B:
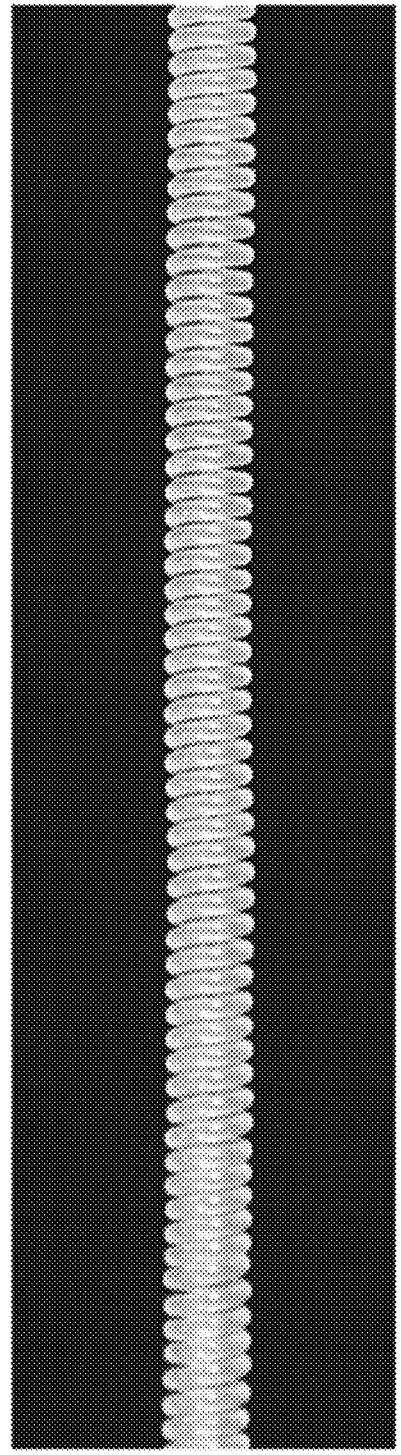

FIGS. 38A-38B show the progression of making a heterochiral coiled polymer fiber muscle which has almost no space between adjacent coils at room temperature. In FIG. 38A, a highly-twisted, 305-μm-diameter nylon 6, 6 fiber is shown wrapped around a metal wire mandrel such that adjacent coils are spaced with roughly 600 μm of additional separation. This structure was fixed on both ends to prevent torsional or translational movement, and annealed at 220° C. in vacuum for 2 hours. When cooled to room temperature and removed from the mandrel, the structure in FIG. 38B resulted.

This structure could be reversibly actuated thermally or electrothermally, without the need for a torsional tether or tensile loading. The annealing temperature and coil spacing during annealing in this example were chosen such that the final coil would have nearly zero spacing between adjacent coils. This minimal spacing prevents adjacent coils from being in tight contact at room temperature, thus allowing the coil to expand when heated, while keeping the initial length at a minimum to yield the greatest expansion stroke.

Figure 39:
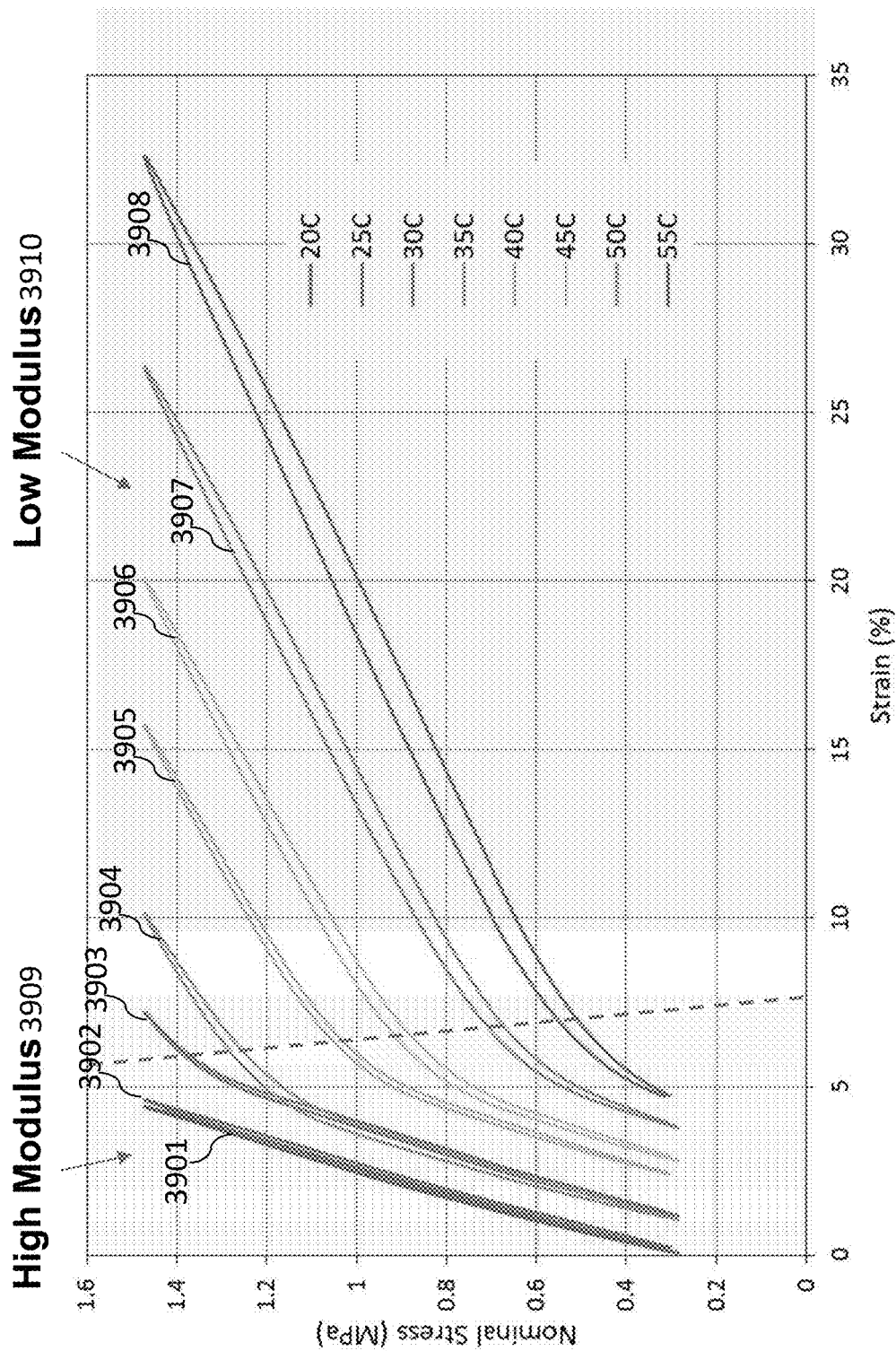
FIG. 39 shows stress-strain curves for a heterochiral coiled polymer fiber at different temperatures, namely (A) 20° C. (curve 3901), (B) 25° C. (curve 3902), (C) 30° C. (curve 3903), (D) 35° C. (curve 3904), (E) 40° C. (curve 3905), (F) 45° C. (curve 3906), (G) 50° C. (curve 3907), and (H) 55° C. (curve 3908). The graph of FIG. 39 also reflects high modulus region 3903 and low modulus region 3904.

FIG. 39 shows the mechanical properties of a heterochiral coiled fiber actuator which was produced similarly to the coil in FIG. 38B, but with less space between adjacent coils such that the final structure was held together tightly by internal compressive stress at room temperature. When stretched at 20° C. up to a stress of around 1.5 MPa (curve 3901), this internal compressive force was sufficient to prevent adjacent coils from separating, resulting in a region of relative high stiffness. However, when heated, the expansile actuation of the heterochiral coil counteracted some fraction of this internal force. As a consequence, when the applied tensile stress was increased, the effective stiffness dropped precipitously beyond a specific stress. This transition from stiff to soft coils occurs at the strain at which adjacent coils become separated, and the stress at which this transition occurs decreases with increasing temperature for heterochiral coils. Such highly-non-linear and temperature-tunable stress-strain responses could be useful for actuators that can vary both their position and stiffness during actuation, or for smart latches or packaging that respond to changes in temperature. Similarly, the ability to tune the transition temperature at which the onset of actuation occurs enables smart textiles that maintain a constant structure up until a desired transition temperature, and thermally-actuated fibers which can effectively cool to their non-actuated length in shorter time periods.

Tuning inter-coil contact during temperature changes or moisture absorption provides a particularly useful mechanism for changing the stiffness of a textile. Depending upon the textile structure and the heat-setting conditions used for producing the coiled fiber actuator or the actuating textile, and the resulting coil diameter, coil pitch and coil spring index, small changes in temperature or absorbed moisture can cause textile stiffness in one or more directions to either increase or decrease as coils become contacting or non-contacting, respectively.

Examples of the use of such stiffness-changing textiles that employ inter-coil contact to change stiffness include: (a) bra-straps that become stiffer during exposure to perspiration or temperature increases, thereby increasing breast support during physical activity; (b) protective garments that change from flexible to stiff in response to a threat; and (c) textiles that absorb mechanical energy in a controllable manner, such as for seat belts and other harnesses, by profiling length and stiffness during actuation. This change in inter-coil contact can occur as a consequence of a change in ambient temperature, moisture absorption, electrothermal heating, or combinations thereof. Electrothermal heating is especially preferred for threat protection, such as for protective clothing or seat belts, since the protective textile stiffness can be modified in an area-selective manner to optimally provide protection according to dynamic sensor feedback on the nature of the threat.

Uses of Fabric Structures

Fabric structures, such as those described above, can be used in various textiles, and can be utilized in an advantageous way in response to changes in temperature or moisture absorption. The uses include providing textiles that change porosity, wickability, stiffness, appearance, and/or thickness.

Textile uses can include (a) comfort-adjusting clothing, i.e., to regulate thermal properties to improve comfort; (b) protective clothing; (c) athletic apparel; (d) parachutes, sails, and airfoils, such as to control air-flow; (e) textile filters, such as to control flow-rate of fluids in technical applications; (f) spacer fabrics to regulate the fabric loft; (g) morphing surfaces; (h) color changing textiles; (i) morphing wings; (j) controllable compression garments; (k) 3D woven or knitted fabrics that can exhibit volumetric expansion or contraction in response to temperature change; (l) smart hoses and pipes; (m) smart packages; (n) smart curtains, smart agricultural coverings, smart green houses, smart tents, smart sunshades and smart architectural textiles (canopies, awnings, and tarpaulins); (o) bandages and coverings that actuate to accelerate healing; (p) textiles with tunable hydrophobicity as a result of changing structure; (q) smart bras and other undergarments that adjust stiffness to provide enhanced support, or that actuate to restore their shape during washing and drying cycles; (r) comfort-adjusting clothing for ballistic protection that changes stiffness in response to a threat; (s) smart textiles that actuate and/or adjust stiffness to optimize the absorption of mechanical energy; and (t) smart packaging materials and structures that respond to environmental changes.

For instance, embodiments include an article of apparel that includes a smart (intelligent) textile of the present invention, which changes structure upon a change in temperature or moisture absorption. The structure of the article is modified from a first configuration to a second configuration as a result of a change in temperature or absorbed moisture to change the property of the textile. Reinforcing structures, incisions, partial incisions, and coatings may also be utilized to enhance the textile's (and article's) structures.

Other uses of this include variable filtering, environmental protection and packaging. For instance, a separation process can be enhanced by being able to change the porosity of the filter during use by a simple change in the ambient or fluid temperature. Such uses also include agricultural applications.

These fabrics can be used in morphing wings or similar surfaces that can change their shape by external stimulus.

Also these actuating fabrics can be used in controllable compression garments for space suits or similar applications.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above.

The disclosures of all patents, patent applications, and publications cited herein are hereby incorporated herein by reference in their entirety, to the extent that they provide exemplary, procedural, or other details supplementary to those set forth herein.

REFERENCES

U.S. Pat. No. 8,555,414, "Article of Apparel Utilizing Zoned Venting and/or Other Body Cooling Features or Methods," issued Oct. 15, 2013 to C. L. Davis et al. ("Davis '414 patent").

U.S. Pat. No. 7,437,774, "Article of Apparel Incorporating a Zoned Modifiable Textile Structure," issued Oct. 21, 2008, to M. R. Baron et al. ("Baron '774 patent").

U.S. Pat. No. 6,514,362, "Fabric Coating Containing Energy Absorbing Phase Change Material and Method of Manufacturing Same" issued to J. L. Zuckerman et al. Feb. 4, 2003 ("Zuckerman '362 patent").

U.S. Patent Appl. Pub. No. 2011/0039088, "Moisture Sensitive Auxetic Material," to W. D. Lee et al., filed Oct. 28, 2010 ("Lee '088 application").

U.S. Patent Appl. Publ. No. 20050204448, "Article of Apparel Incorporating a Modifiable Textile Structure," filed Mar. 19, 2004 to L. M. Wise et al. ("Wise '448 application").

J. Hu et al., "A Review of Stimuli Responsive Polymers for Smart Textile Applications," *Smart Mater. Struc.*, 21, (2012) ("Hu 2012").

J. Hu, Adaptive and Functional Polymers, Textiles and Their Applications, Imperial College Press, UK (2011) ("Hu 2011").

S. H. Kim et al., "Bio-inspired, Moisture-Powered Hybrid Carbon Nanotube Yarn Muscles," *Sci. Rep.*, 6, 23016 (2016) ("Kim 2015").

Y. Li et al., "Characterization of Shape Memory Fabrics," *Textile Asia*, 35, (2004) ("Li 2004").

X. Liu et al., "Elasticity and Shape Memory Effect of Shape Memory Fabrics," *Textile Res.* 1, 78(12) (2008) ("Liu 2008").

L. D. Peel et al., "Development of a Simple Morphing Wing Using Elastomeric Composites as Skins and Actuators", *J. of Mechanical Design*, Vol. 131, 091003-1-4, (2009).

M. Serra, "Adaptable Skin-hydrogel Gives Wetsuit Protection," *Smart Mater. Bull.*, (8), (2002) ("Serra 2002").

Y. Shin et al., "Development of Thermoregulating Textile Materials with Microencapsulated Phase Change Materials," *J. of Applied Polymer Science*, 97 (3), (2005) ("Shin 2005").

T. L. Vigo et al. "Temperature-adaptable Hollow Fibers Containing Polyethylene Glycols," *J. of Coated Fabrics*, 12 (4), (1983) ("Vigo 1983").

What is claimed is:

1. A textile that is a woven structure, wherein the woven structure is comprising at least one twisted or coiled polymer fiber actuator that is operable to reversibly change either (1) the porosity of at least one single layer of the textile, (2) textile coloration, or (3) combinations thereof, in response to a change in temperature or moisture absorption, without substantially changing overall textile width and length, wherein the at least one twisted or coiled polymer fiber actuator comprises at least one twisted or coiled polymer fiber having a degree of twist in which the product of (a) the degree of twist per unit length multiplied by (b) average diameter of the at least one twisted or coiled polymer fiber is at least 50°.

2. The textile of claim 1, wherein the textile is a single-layer textile.

3. The textile of claim 1, wherein the product of (a) the degree of twist per unit length multiplied by (b) the average diameter of the at least one twisted or coiled polymer fiber is at least 90°.

4. The textile of claim 1, wherein
(a) the textile comprises a plurality of coiled fiber actuator surrounding a core yarn, and
(b) the inner diameter of the coiled fiber actuators are sufficiently large to allow the coiled fiber actuators to change length, largely independent of the length of the core yarn.

5. The textile of claim 1, wherein the textile comprises a chenille-type yarn structure comprising at least one actuating core fiber and one or more pile fibers, wherein
(a) the one or more pile fibers are locked into a yarn body by the at least one actuating core fiber,
(b) the at least one actuating core fiber comprises a torsional polymer fiber actuator comprising at least one of the at least one twisted or coiled polymer fiber actuator, and
(c) the one or more pile fibers are operable to rotate to change the textile structure.

6. The textile of claim 1, wherein the textile comprises a yarn structure comprising one or more core fiber and one or more actuating pile fibers, wherein
(a) the one or more actuating pile fibers are locked into a yarn body by the at least one core fiber,
(b) the one or more actuating pile fibers comprise at least one of the at least one twisted or coiled polymer fiber actuator, and
(c) the one or more pile fibers are operable to actuate to change the textile structure.

7. The textile of claim 1, wherein
(a) the textile comprises at least one fiber that is operable to rotate in response to a change in temperature or moisture absorption, and
(b) the rotation produces a change in porosity, color, or combinations thereof.

8. The textile of claim 7, wherein the the at least one fiber that is operable to rotate in response to a change in temperature or moisture absorption is operable to reversibly cause a change of rotational angle of the yarn of at least 10°.

9. The textile of claim 1, wherein the textile is an article of clothing.

10. The textile of claim 9, wherein the article of clothing is selected from the group consisting of (a) comfort-adjusting clothing, (b) protective clothing, (c) athletic apparel, (d) morphing clothing for aesthetic purposes, and (e) combinations thereof.

11. The textile of claim 1, wherein
(a) the textile comprises at least two fabric layers that are connected by the at least one twisted or coiled polymer fiber actuator, and
(b) the at least one twisted or coiled polymer fiber actuator is operable to shift the relative positions of the at least two fabric layers in response to a change in temperature or moisture absorption in order to change the textile porosity, coloration, or combinations thereof.

12. The textile of claim 1, wherein
(a) the textile can reversibly change textile coloration,
(b) the color change is achieved by a combination of the at least one twisted or coiled actuating polymer fiber and a color change element, and
(c) the at least one twisted or coiled actuating polymer fiber is selected from a group consisting of
  (i) actuating polymer fibers that operate by torsion to rotate a multi-colored element, and
  (ii) actuating polymer fibers that operate by tensile actuation and are joined to an element that changes color with stretch.

13. The textile of claim 12, wherein the color change element is selected from a group consisting of
(a) a synthetic film or fiber onto which a metallic layer has been deposited,
(b) a fiber which derives its optical properties from structural coloration, and
(c) combinations thereof.

14. The textile of claim 1 further comprises an element, wherein the at least one twisted or coiled polymer fiber actuator comprises at least two connected actuating polymer fibers or actuating polymer fiber segments that are operable to torsionally actuate in opposite chiral directions such that, at a point of connection of the at least two connected actuating polymer fibers or actuating polymer fiber segments, the at least two connected actuating polymer fibers or actuating polymer fiber segments cooperatively rotate the element of the textile in a same rotation direction.

* * * * *